(12) United States Patent
Ide

(10) Patent No.: US 7,218,302 B2
(45) Date of Patent: May 15, 2007

(54) LIQUID CRYSTAL OPTICAL MODULATOR AND DRIVE METHOD

(75) Inventor: Masafumi Ide, Saitama (JP)

(73) Assignee: Citizen Watch Co., Ltd., Tokyo (JP)

(*) Notice: Subject to any disclaimer, the term of this patent is extended or adjusted under 35 U.S.C. 154(b) by 626 days.

(21) Appl. No.: 10/784,823

(22) Filed: Feb. 24, 2004

(65) Prior Publication Data

US 2004/0169630 A1  Sep. 2, 2004

(30) Foreign Application Priority Data

Feb. 28, 2003  (JP)  ............................ 2003/054356

(51) Int. Cl.
  *G09G 3/36*  (2006.01)
  *G09G 5/00*  (2006.01)
(52) U.S. Cl. ............................ 345/96; 345/87; 345/94; 345/208; 345/209
(58) Field of Classification Search ............ 345/87–98, 345/204, 208–214, 690, 697; 349/100–121; 359/159–181
See application file for complete search history.

(56) References Cited

U.S. PATENT DOCUMENTS

| 5,982,539 | A  | * | 11/1999 | Shirasaki  | ..................... 359/484 |
| 6,356,578 | B1 | * | 3/2002  | Yin        | ............................. 372/107 |
| 6,600,582 | B1 | * | 7/2003  | Liu et al. | ....................... 398/79 |
| 6,735,017 | B1 | * | 5/2004  | Acosta et al. | ................ 359/497 |

* cited by examiner

*Primary Examiner*—Vijay Shankar
(74) *Attorney, Agent, or Firm*—Westerman, Hattori, Daniels & Adrian, LLP.

(57) ABSTRACT

A liquid crystal optical modulator is operated as a concave lens using a quadratic curve modulation area of a refractive index modulation area of a liquid crystal molecule layer, which is different from a conventional convex lens operation area, without changing the configuration of the liquid crystal optical modulator. In addition, the liquid crystal optical modulator is operated as a concave lens using a quadratic curve modulation area used by a conventional liquid crystal optical modulator as well as an area different from that area to enable the liquid crystal optical modulator to operate as a convex lens and as a concave lens. This makes it possible to perform the concave lens operation, to enlarge the variable focal range, and to form a micro-lens array of variable focal point type.

23 Claims, 36 Drawing Sheets (a)

(b)

(a)

(b)

(a)

(b)

(c)

(a)

(b)

(c)

(a)

(b)

(a)

(b)

LIQUID CRYSTAL OPTICAL MODULATOR AND DRIVE METHOD

BACKGROUND OF THE INVENTION

1. Field of the Invention

The present invention relates to a liquid crystal optical modulator, and more particularly to a liquid crystal optical modulator which allows an adaptive optics technology to be used for maintaining a reliable optical communication link in free space optical communication between satellites, between ground station and satellite, or between ground stations, which can operate as a concave lens or a convex lens, and which can vary the operation of a concave lens and a convex lens.

2. Description of the Prior Art

To increase the laser communication speed, it is necessary to keep a per-bit light volume constant and to increase the whole light volume. To do so, it is important to increase the antenna gain of a transmitter and a receiver. In a free space optical communication such as a communication between a ground station and a satellite, an atmospheric turbulence in an optical transmission line disturbs the wavefront of a laser beam that propagates through air. One solution to this problem is to increase the antenna diameter to increase the antenna gain. However, the problem is that, even if the antenna diameter is increased to some degree, a wavefront distortion due to an atmospheric turbulence prevents antenna directivity from being improved, and the antenna gain from exceeding a predetermined value.

Therefore, for a high-speed optical communication in a free space, it is necessary to compensate for an atmospheric turbulence. Recently, an optical communication technology for compensating for an atmospheric turbulence using the adaptive optics technology is under development.

In the optical communication technology based on the adaptive optics technology, a deformable mirror is controlled using wavefront distortion data, detected by a wavefront sensor, to reconstruct a wavefront free from an atmospheric turbulence.

As described above, detecting a wavefront distortion using the adaptive optics technology is an important factor. One example of wavefront detection sensors is a Shack Hartmann sensor. FIG. 32 shows the principle of the Shack Hertmann sensor. An incoming ray 2701, which has a wavefront distortion, is divided by a micro lens array 2703, and an image is formed at a focus 2707 on a CCD array 2705. The position of this focus 2707 can be calculated from the peak value of an intensity distribution curve 2709 obtained by calculating the light intensity detection value of the CCD array 2705. That is, the positional displacement of this focus 2707 is determined by detecting the light intensity.

This positional displacement corresponds to the wavefront tilt of each component of the incoming ray 2701 created by dividing by a small aperture of each micro lens. Because this tilt information is proportional to the linear differential of the wavefront, the calculation is performed based on the information for reconstructing the wavefront free from an atmospheric turbulence.

In this case, the diameter and the focal length of a micro lens affect the reconstruction precision of the wavefront. That is, the focal length determines the precision at which the wavefront tilt of the measuring system is detected. In addition, because the diameter of a micro lens affects the brightness at the focus and the spatial resolution of the wavefront tilt to be measured, a higher special resolution requires a smaller diameter.

The micro lens array 2703 described above is of fixed focus type. However, because the wavefront distortion depends largely on the measurement location and the season, multiple types of fixed-focus micro lens array must be prepared for exchange of the array according to the degree of a wavefront distortion to be measured. The problem with exchanging the lens array is that the device becomes large and the time is required for the exchange. It is therefore desirable that the micro lenses forming the micro lens array be of variable-focal length type.

As a method for implementing a micro lens array for use in the application described above, the inventor of the present invention has already proposed a technology for arranging liquid crystal optical modulators, each having the configuration described below for use as a lens, in an array form to allow the array to function as the micro lens array described above (for example, Japanese Patent Laid-Open Publication No. 2000-214429).

Unlike the liquid crystal optical modulator described above, a predetermined voltage is applied across a plurality of stripe electrodes in this configuration using a quadratic curve approximation area of a liquid crystal phase modulation area. This configuration allows the liquid crystal optical polarimeter to function as a convex lens. The configuration and the operation will be described below.

First, the following describes the configuration of a liquid crystal lens of the liquid crystal optical modulator in this system. FIG. 1 is a cross section diagram showing the configuration of a liquid crystal optical modulator used in a micro lens array of variable-focal length type.

As shown in FIG. 1, the liquid crystal optical modulator comprises a first substrate 103 on which a composite electrode 111 is formed; a second substrate 105 on which a full-area opposed electrode 113 is formed; and a nematic liquid crystal layer 101 held between the two substrates. The nematic liquid crystal layer 101 forms an alignment layer 117 on the composite electrode 111 of the first substrate and on the opposed electrode 113 of the second substrate. This alignment layer 117 homogeneously aligns directors 107 of p-type liquid crystal molecules, each with a tilt angle 109 of 0.5 to 20 degrees when no electric field is applied. A non-reflecting coating 115 for preventing reflection is provided on the opposite side of the liquid crystal layer of the first substrate 103 and the second substrate 105, respectively.

Conventionally, a configuration is known in which the liquid crystal optical modulator described above is used to form a cylindrical lens. With reference to FIG. 33, the structure of the composite electrode 111 for forming a cylindrical lens using a liquid crystal optical modulator will be described in detail.

FIG. 33 is a top view of the composite electrode 111. The composite electrode 111 has two lens areas in an active area 2871: first cylindrical lens area 2851 and second cylindrical lens area 2861.

The first cylindrical lens area 2851 and the second cylindrical lens region 2861 form a stripe electrode bundle composed of a first stripe electrode 2820 to the Nth stripe electrode 2829 (N=10 in FIG. 33) and from the (N+1)th stripe electrode 2830, which is the first electrode of the second cylindrical lens, to the 2Nth stripe electrode 2839, all of which are formed by a low-resistance polycrystalline transparent conductive film such as an ITO (Indium Tin Oxide) film. This stripe electrode bundle is connected by a first gradient potential electrode 2801. Although the first gradient potential electrode 2801 may be formed at the same time the stripe electrodes are formed using the same material, it is desirable that the gradient potential electrode be formed by an amorphous conductive material, which is transparent and has a resistance higher than the ITO film of the stripe electrodes, such as a material created by adding a predetermined amount of impurities to $In_2O_3$.

A signal electrode a 2811, a signal electrode b 2813, and a signal electrode c 2815, each composed of low-resistance metal materials such as Mo and Ag alloy, are connected to the both ends and to the center of the first gradient potential electrode 2801, respectively. The opposed electrode (not shown) is a full-area electrode formed by an ITO film.

FIG. 34(*a*) is a perspective view showing an example of the configuration of a cylindrical lens. The composite electrode 111 provided on the first substrate 103 and the full-area opposed electrode 113 provided on the second substrate 105 hold the nematic liquid crystal layer 101 between them and refract the light passing through the electrodes and liquid crystal to form a lens.

In this configuration, AC pulse signals, with equal amplitude and frequency but 180 degrees out of phase to one another, are applied to the signal electrode a 2811 and c 2815 provided on the gradient potential electrode 2801 in the liquid crystal optical modulator described above, and 0[V] is applied to the signal electrode b 2813. This causes the gradient potential electrode 2801 to create a linear potential gradient. This linear potential gradient allows each two neighboring stripe electrodes to have incremental potential gradients. FIG. 35(*a*) shows a gradient potential formed among signal electrodes a, b, and c. In this way, the stripe electrode bundle generates a potential distribution with a linear gradient in the liquid crystal optical modulator.

Thus, for example, when two lens areas are used for one lens, a convex lens area can be formed by the two lens areas: first cylindrical lens 2851 and second cylindrical lens 2861. The numeral 2901 in FIG. 34(*a*) schematically illustrates this convex lens area.

Next, the characteristics of the conventional liquid crystal layer and the operation area of a liquid crystal optical modulator will be described. The wavefront of an incoming linearly polarized light received by a liquid crystal optical modulator, which employs homogeneous alignment, is modulated according to the characteristics of applied voltages versus effective birefringences such as the one shown in FIG. 5.

In FIG. 5, the horizontal axis indicates the voltage V applied to the liquid crystal layer, and the vertical axis indicates the effective birefringence Δn. The shape of the electro-optic response curve shown here depends on such factors as the elastic constant of the liquid crystal that is used, the dielectric anisotropy, and the pre-tilt angle determined by the alignment layer when no electric field is applied. In addition, because the refractive index and the birefringence of the liquid crystal layer depend on the wavelength, the electro-optic response curve also varies according to the wavelength of the light source.

With reference to the characteristic diagram shown in FIG. 5, the operation areas will be described wherein the area from the liquid crystal voltage 0 [Vrms] to the first inflection point is a first linear area 521, the curve area from the first inflection point to the second inflection point is a first quadratic curve approximation area 520, the curve area from the second inflection point to the third inflection point is a second quadratic curve approximation area 522, and the area from the third inflection point to the high-voltage side area is a second linear area. Note that the second linear area is not shown in FIG. 5.

The conventional liquid crystal optical modulator performs the convex lens operation with the vicinity of the first quadratic curve approximation area 520 as the convex lens curve area.

FIG. 5 shows the electro-optic response curves generated by setting the pre-tilt angle to 10°, 5.0°, 2.0°, and 0.5°, respectively. As shown in FIG. 5, when the pre-tilt angle is set to 0.5°, the area from the liquid crystal voltage from 0 to 1 [Vrms] is the first linear area 521. Therefore, in this voltage range, it is difficult to use the liquid crystal optical modulator as a spherical lens.

On the other hand, for the characteristic curves of other pre-tilt angles, the figure shows that the liquid crystal optical modulator can be best used as a spherical lens approximately in the liquid crystal voltage range 0–2[Vrms]. This characteristic curve varies according to the material of the liquid crystal or the liquid crystal film thickness. In any case, the liquid crystal advantageously operates as a phase modulation layer except for the pre-tilt angle of 0.5°, especially in the first quadratic curve approximation area indicated by the numeral 520 in FIG. 5. Preferably, the pre-tilt angle at this time should be 2 to 10 degrees.

The following describes an example of the operation of a convex lens made of a liquid crystal lens in the first quadratic curve approximation area described above. For example, assume that the opposed electrode 113 in FIG. 1, which is a full-area electrode, and the signal electrode b 2813 are set to 0[V], that +V[V] that is the voltage of the first quadratic curve approximation area 520 is applied to the signal electrode a 2811, and that −V[V] is applied to the signal electrode c 2815. Then, as shown in FIG. 35(*a*), the first gradient potential electrode 2801 provided on the composite electrode 111 has a potential gradient.

The stripe electrode bundle, to which a ramped potential gradient is applied, forms a linearly ramped potential distribution in the liquid crystal layer 101. Because of this potential distribution, the value of the effective refractive index of the liquid crystal layer is an electrode-position dependent value that varies according to the characteristic curve of the effective birefringence, and the curve has a convex shape as shown in FIG. 35(*b*). Therefore, the phase modulation amount of a light passing through this liquid crystal layer depends on the effective refractive index and, therefore, the light refracts. In this way, by applying a voltage to each signal electrode, the phase modulation amount of a light entering the liquid crystal optical modulator can be controlled and therefore this liquid crystal optical modulator can function as a convex lens.

The composite electrode 111 of this liquid crystal optical modulator, if configured as a circular electrode pattern, can be configured as a spherical lens. In FIG. 36, many semicircular stripe electrodes 3001–3008 are electrically connected by one gradient potential electrode 3010 with the center electrode 3009 as the center. The both ends of the gradient potential electrode 3010 are connected, respectively, to a first signal electrode 3031 and a second signal electrode 3033 that also function as a circular aperture. The stripe electrodes and the signal electrodes are separated into two areas by a first slit 3021 and a second slit 3023.

The operation of a spherical convex lens is the same as described above. In addition, by placing the gradient potential electrode along the diagonal line of the circular electrode pattern, a spherical lens with a rectangle aperture can be configured. In addition, a plurality of circular electrode patterns are arranged as an array to configure a micro lens array of variable-focal length type.

However, for the conventional liquid crystal optical modulator that employs a homogeneous alignment, the effective voltage applied to the liquid crystal is the lowest drive voltage in the vicinity of the center of the gradient potential electrode and, therefore, only the convex lens operation can be implemented in principle, especially for a spherical lens. In addition, when there is a need for the modulator to be included into a combination lens system, it is desirable that the focal point variable range be as large as possible. The problem with the conventional configuration is that the modulator finds uses only in an application where a narrow focal point range is acceptable because the operation is limited to the convex lens operation.

OBJECT AND SUMMARY OF THE INVENTION

It is an object of the present invention to provide a liquid crystal optical modulator that solves the problems described above and to provide a liquid crystal optical modulator and its drive method that make it possible to vary not only the conventional convex operation but also the concave operation.

It is another object of the present invention to provide a liquid crystal optical modulator and its drive method suitable for forming a high-aperture rate, simply structured, and easy-to-drive micro lens array.

The present invention uses the high voltage area of the curve of an effective birefringence versus voltage to perform the convex lens operation and to make the concave lens operation variable.

A first embodiment of the present invention is applicable to the configuration of a cylindrical lens.

A liquid crystal optical modulator of the present invention has a liquid crystal molecule layer between a first substrate having thereon a plurality of stripe electrodes arranged in a stripe pattern and a second substrate having thereon opposed electrodes, and is capable of causing a modulation in a refractive index of the liquid crystal molecule layer by applying different voltages to both ends of the stripe electrodes. The second substrate has divided opposed electrodes each corresponding to a predetermined area on the stripe electrodes. The voltages are applied to the stripe electrodes and the opposed electrodes to cause the liquid crystal optical modulator to use a curve modulation area indicating characteristics that a birefringence for the voltage applied to the liquid crystal molecule layer is downwardly convex, or a curve modulation area indicating characteristics that the birefringence is upwardly convex, as a modulation area of the refractive index of the liquid crystal molecule layer. This causes the liquid crystal optical modulator to operate as a concave lens or as a convex lens.

A liquid crystal optical modulator of the present invention has a liquid crystal molecule layer between a first substrate having thereon a plurality of stripe electrodes arranged in a stripe pattern and a second substrate having thereon opposed electrodes, and is capable of causing a modulation in a refractive index of the liquid crystal molecule layer by applying different voltages to both ends of the stripe electrodes. The second substrate has divided opposed electrodes each corresponding to a predetermined area on the stripe electrodes. An operation point on a phase modulation curve of the refractive index of the liquid crystal molecule layer is shifted under a phase control of a bias signal applied to the divided opposed electrodes and, at the same time, a focal length of a lens operation of the liquid crystal optical modulator is made variable by a control signal controlling the plurality of stripe electrodes.

In the configuration of the cylindrical lens of the liquid crystal optical modulator in the first embodiment of the present invention, the stripe electrodes are composed of a plurality of transparent electrodes arranged in parallel stripes. The liquid crystal optical modulator further comprises a connection stripe electrode for connecting the plurality of stripe electrodes. The connection stripe electrode has a sheet resistance equal to or higher than that of the stripe electrodes. Via this connection stripe electrode, a predetermined voltage is applied to the stripe electrodes. The connection conductive stripe electrode is composed of a transparent conductive electrode. The opposed electrodes provided on the second substrate are optically transparent.

Light refracts when it passes through the liquid crystal molecule layer of the liquid crystal optical modulator. At this time, light transmits through the stripe electrodes, connection stripe electrode, and opposed electrodes.

In this embodiment, for homogeneous alignment, the pre-tilt angle of the liquid crystal molecule layer is a predetermined value from 0.5 degrees to 20 degrees.

A liquid crystal optical modulator of the present invention is an optical modulator using liquid crystal comprising a first substrate having thereon a composite electrode in which a plurality of semicircular conductive electrodes are concentrically arranged and the plurality of concentrically-arranged conductive electrodes are electrically connected by one or more connection stripe electrodes; a second substrate having thereon divided opposed electrodes each corresponding to a predetermined area on the composite electrode; and an optical element including a liquid crystal molecule layer held between the first substrate and the second substrate.

The connection conductive electrode has signal electrodes at ends thereof to which a control signal is applied. By applying a predetermined voltage to the signal electrodes, a linear potential gradient is generated in the connection stripe electrode between the signal electrodes, and a predetermined opposed voltage is applied to the divided opposed electrodes. The applied voltages cause a modulation in a refractive index of the liquid crystal molecule layer. This modulation is performed in a curve modulation area of electro-optical characteristics of homogeneously aligned or homeotropically aligned liquid crystal.

An operation point on a phase modulation curve of the refractive index of the liquid crystal molecule layer is shifted under the phase control of a bias signal applied to the divided opposed electrodes and, at the same time, the focal length of a lens operation of the liquid crystal optical modulator is made variable by a control signal controlling the plurality of stripe electrodes. To perform the concave lens operation, a curve modulation area indicating characteristics that a birefringence for the voltage applied to the liquid crystal molecule layer is downwardly convex is used as a modulation area of the refractive index of the liquid crystal molecule layer.

To make the lens operation changeable between the convex lens operation and the concave lens operation, a first curve modulation area in which the birefringence for the voltages applied to the liquid crystal molecule layer is upwardly convex or a second curve modulation area indicating characteristics that the birefringence is downwardly convex are selectively used as the modulation area of the refractive index of the liquid crystal layer.

The plurality of semicircular conductive electrodes are composed of transparent conductive electrodes. The liquid crystal optical modulator further comprises a connection stripe electrode for connecting the plurality of semicircular conductive electrodes. The connection stripe electrode has a sheet resistance equal to or higher than that of the conductive electrodes. Via the connection stripe electrode, a predetermined voltage is applied to the stripe electrodes. The connection conductive electrode is composed of a transparent conductive electrode. The opposed electrodes provided on the second substrate are optically transparent.

Two connection stripe electrodes are formed along the diagonal lines of a square aperture. The plurality of concentrically-arranged semicircular conductive electrodes have a slit part therein and are divided by the slit part into at least two groups.

A conductive electrode group composed of the plurality of concentrically-arranged semicircular conductive electrodes further includes a plurality of segment stripe conductive electrodes.

In this embodiment, for homogeneous alignment, the pre-tilt angle of the liquid crystal molecule layer is a predetermined value from 0.5 degrees to 20 degrees. The director direction of the liquid crystal molecule layer is established in a direction at right angles to the slit part.

A plurality of liquid crystal optical modulators may be arranged adjacently in a two-dimensional form as an array.

A first drive method for the liquid crystal optical modulator of the present invention is a drive method for a cylindrical lens. The liquid crystal optical modulator comprises a first substrate having thereon a composite electrode in which a plurality of parallel stripe conductive electrodes are electrically connected by one or more connection conductive stripe electrodes; a second substrate having thereon divided opposed electrodes each corresponding to a predetermined area on the composite electrode; and an optical element including a liquid crystal molecule layer held between the first substrate and the second substrate, and the connection stripe electrode has signal electrodes at a predetermined interval to which a control signal is applied.

In the liquid crystal optical modulator, a linear potential gradient is generated in the connection stripe electrode between the signal electrodes by applying a predetermined voltage to the signal electrodes, a predetermined opposed voltage is applied to the divided opposed electrodes, and the applied voltages cause a modulation in a refractive index of the liquid crystal molecule layer via a curve modulation area of electro-optical characteristics of homogeneously aligned or homeotropically aligned liquid crystal. In the liquid crystal optical modulator with the configuration described above, two drive waveforms, with equal amplitude and equal frequency but 180 degrees out of phase to one another, are applied to the predetermined signal electrodes that receive drive waveforms.

A second drive method for the liquid crystal optical modulator of the present invention is a drive method for a spherical lens. The liquid crystal optical modulator comprises a first substrate having thereon a composite electrode in which a plurality of semicircular conductive electrodes are concentrically arranged and the plurality of concentrically-arranged conductive electrodes are electrically connected by one or more connection stripe electrodes; a second substrate having thereon divided opposed electrodes each corresponding to a predetermined area on the composite electrode; and an optical element including a liquid crystal molecule layer held between the first substrate and the second substrate, and the connection stripe electrode has signal electrodes at ends thereof to which a control signal is applied. In the liquid crystal optical modulator, a linear potential gradient is generated in the connection stripe electrode between the signal electrodes by applying a predetermined voltage to the signal electrodes, a predetermined opposed voltage is applied to the divided opposed electrodes, and the applied voltages cause a modulation in a refractive index of the liquid crystal molecule layer via a curve modulation area of electro-optical characteristics of homogeneously aligned or homeotropically aligned liquid crystal. In the liquid crystal optical modulator with the configuration described above, two drive waveforms, with equal amplitude and equal frequency but 180 degrees out of phase to one another, are applied to the predetermined signal electrodes that receive drive waveforms.

A third drive method for the liquid crystal optical modulator of the present invention is a drive method for a cylindrical lens. The liquid crystal optical modulator comprises a first substrate having thereon a composite electrode in which a plurality of parallel stripe conductive electrodes are arranged and the plurality of parallel stripe conductive electrodes are electrically connected by one or more connection stripe electrodes; a second substrate having thereon divided opposed electrodes each corresponding to a predetermined area on the composite electrode; and an optical element including a liquid crystal molecule layer held between the first substrate and the second substrate, and the connection stripe electrode has signal electrodes at a predetermined interval to which a control signal is applied. In this liquid crystal optical modulator, a linear potential gradient is generated in the connection stripe electrode between the signal electrodes by applying a predetermined voltage to the signal electrodes, a predetermined opposed voltage is applied to the divided opposed electrodes, and the applied voltages cause a modulation in a refractive index of the liquid crystal molecule layer via a curve modulation area of electro-optical characteristics of homogeneously aligned or homeotropically aligned liquid crystal. In the liquid crystal optical modulator with the configuration described above, there are a period in which two drive waveforms, with equal amplitude and equal frequency but 180 degrees out of phase to one another, are applied to the predetermined signal electrodes that receive drive waveforms and a period in which an ac bias is applied to the liquid crystal molecule layer.

A fourth drive method for the liquid crystal optical modulator of the present invention is a drive method for a spherical lens. The liquid crystal optical-modulator comprises a first substrate having thereon a composite electrode in which a plurality of semicircular conductive electrodes are concentrically arranged and the plurality of concentrically-arranged conductive electrodes are electrically connected by one or more connection stripe electrodes; a second substrate having thereon divided opposed electrodes each corresponding to a predetermined area on the composite electrode; and an optical element including a liquid crystal molecule layer held between the first substrate and the second substrate, and the connection stripe electrode has signal electrodes at ends thereof to which a control signal is applied. In the liquid crystal optical modulator, a linear potential gradient is generated in the connection stripe electrode between the signal electrodes by applying a predetermined voltage to the signal electrodes, a predetermined opposed voltage is applied to the divided opposed electrodes, and the applied voltages cause a modulation in a refractive index of the liquid crystal molecule layer via a curve modulation area of electro-optical characteristics of homogeneously aligned or homeotropically aligned liquid crystal. In the liquid crystal optical modulator with the configuration described above, there are a period in which two drive waveforms, with equal amplitude and equal frequency but 180 degrees out of phase to one another, are applied to the predetermined signal electrodes that receive drive waveforms and a period in which an ac bias is applied to the liquid crystal molecule layer.

In accordance the third drive method and the fourth drive method, an ac bias is applied to change the operation point in the curve modulation area of the electro-optical characteristics to allow the convex lens and the concave lens to be switched and the focal length of the lens to be adjusted.

It is one of the objects of the present invention to provide a liquid crystal optical modulator, which functions as a variable-focal length lens applicable to a wavefront sensor, and a method for driving the liquid crystal optical modulator. In addition, by changing the refractive index distribution, the liquid crystal optical modulator can function not only as a convex variable-focal length lens but also as a concave variable-focal length lens. It is to be understood that the scope of the present invention is not limited to the liquid crystal optical modulator described in this specification but includes a liquid crystal optical modulator for use in wavefront conversion used for controlling the beam width of a laser beam used, for example, in ground communication between buildings.

As apparent from the above description, the liquid crystal optical modulator of the present invention can perform the concave lens operation. In addition to the conventional convex lens operation, the concave lens operation can be made variable and its focal length can be made variable.

BRIEF DESCRIPTION OF THE DRAWINGS

The foregoing and other objections and features of the invention will become apparent from the following description of preferred embodiments of the invention with reference to the accompanying drawings, in which.

DETAILED DESCRIPTION OF THE PREFERRED EMBODIMENTS

The configuration of a liquid crystal optical modulator and the configuration of its drive method in preferred embodiments for carrying out the present invention will be described below with reference to the drawings.

Figure 1:
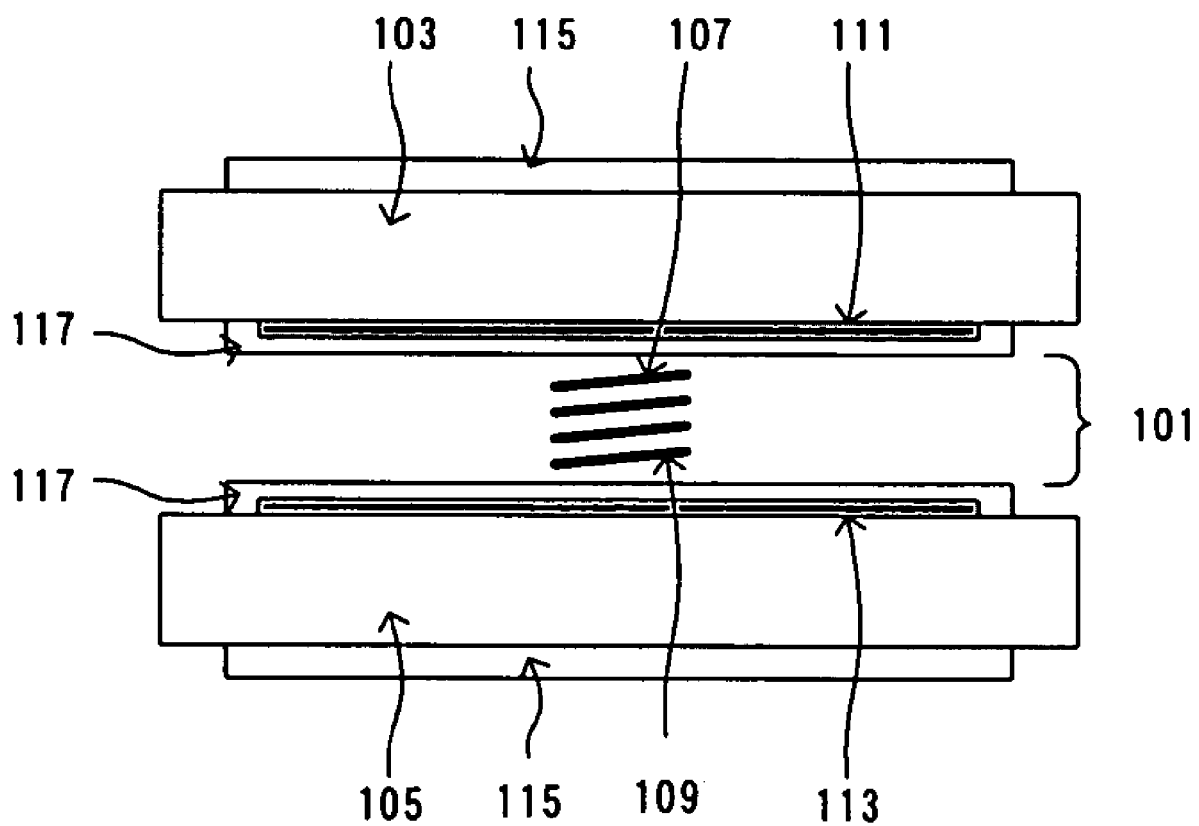
FIG. 1 is a cross section diagram showing the configuration of a liquid crystal optical modulator of the present invention.

First, the configuration of a liquid crystal optical modulator in a first embodiment of the present invention will be described with reference to the drawings. FIG. 1 is a cross section diagram showing the configuration of the liquid crystal optical modulator in the embodiment of the present invention. The cross section configuration is the same as that described in the description the prior art. Because the cross section configuration is the same as that of the liquid crystal optical modulator described in the prior art, the description is omitted here.

Figure 2:
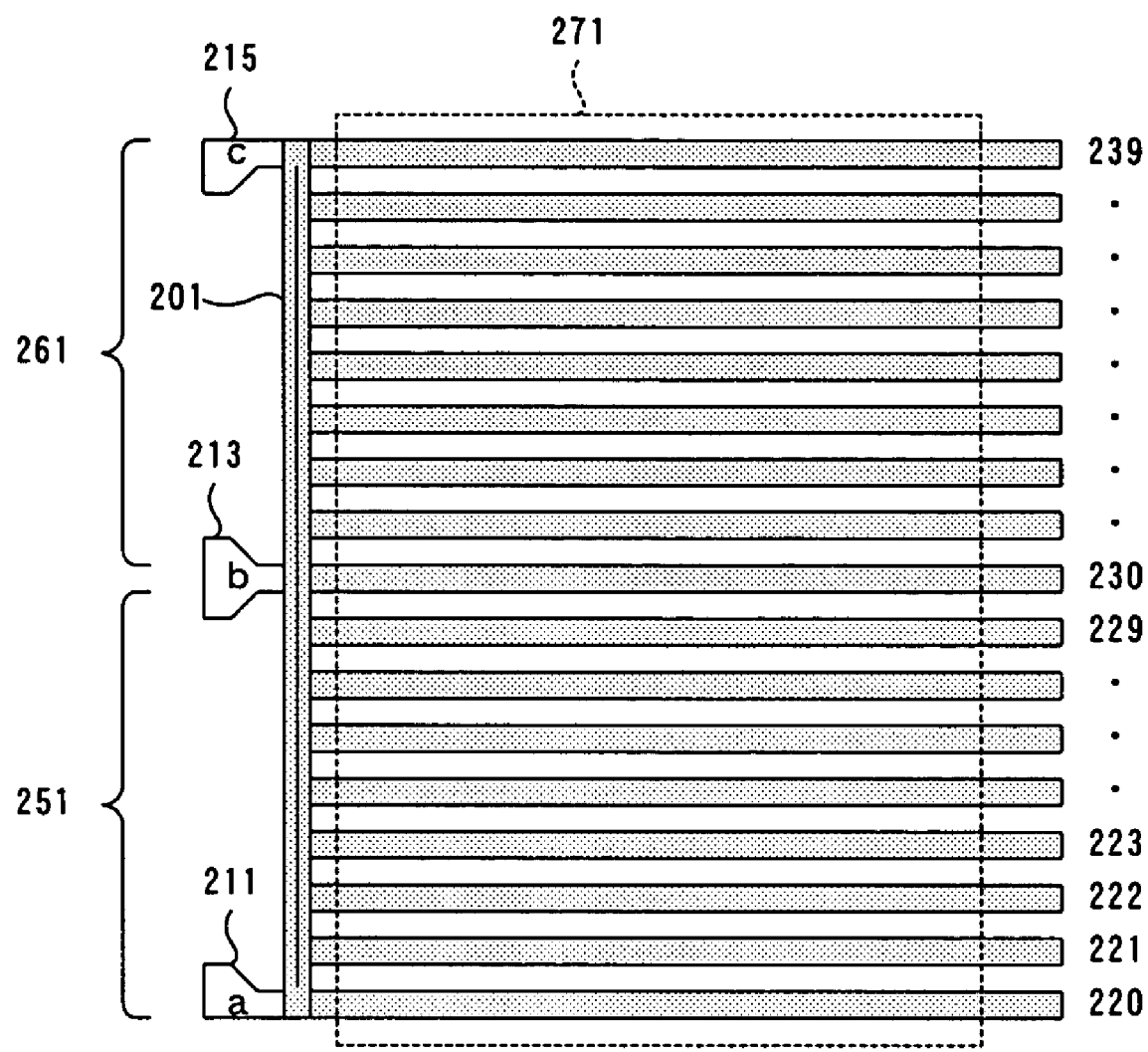
FIG. 2 is atop view of a composite electrode provided in the liquid crystal optical modulator of the present invention.
Figure 3:
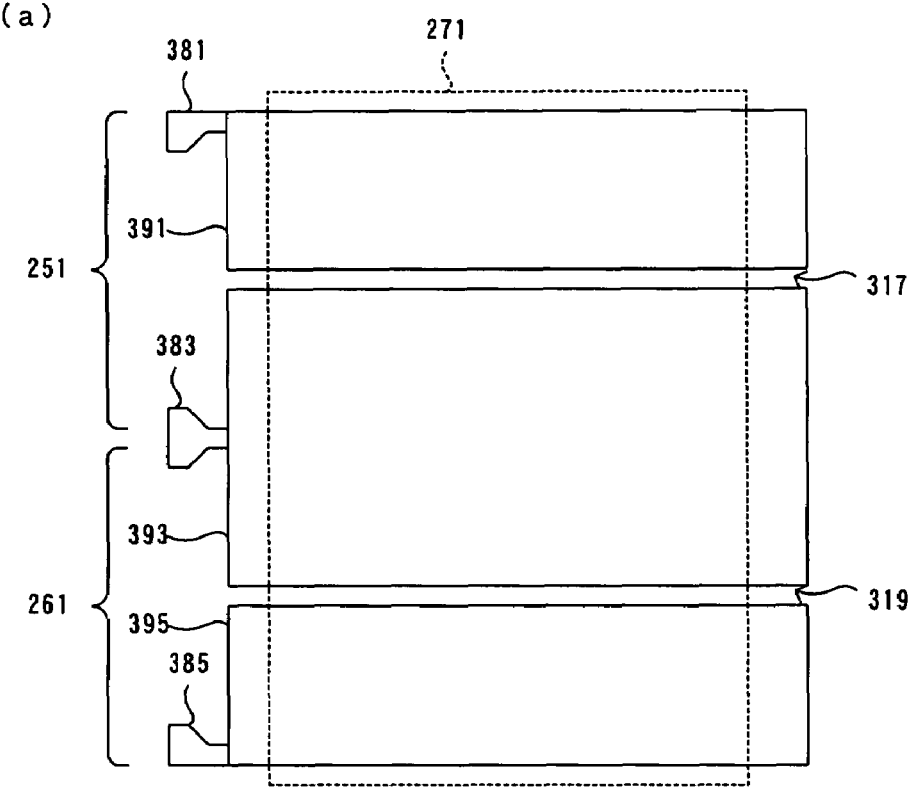
FIG. 3 is a top view of an opposed electrode provided in the liquid crystal optical modulator of the present invention.
Figure 3:
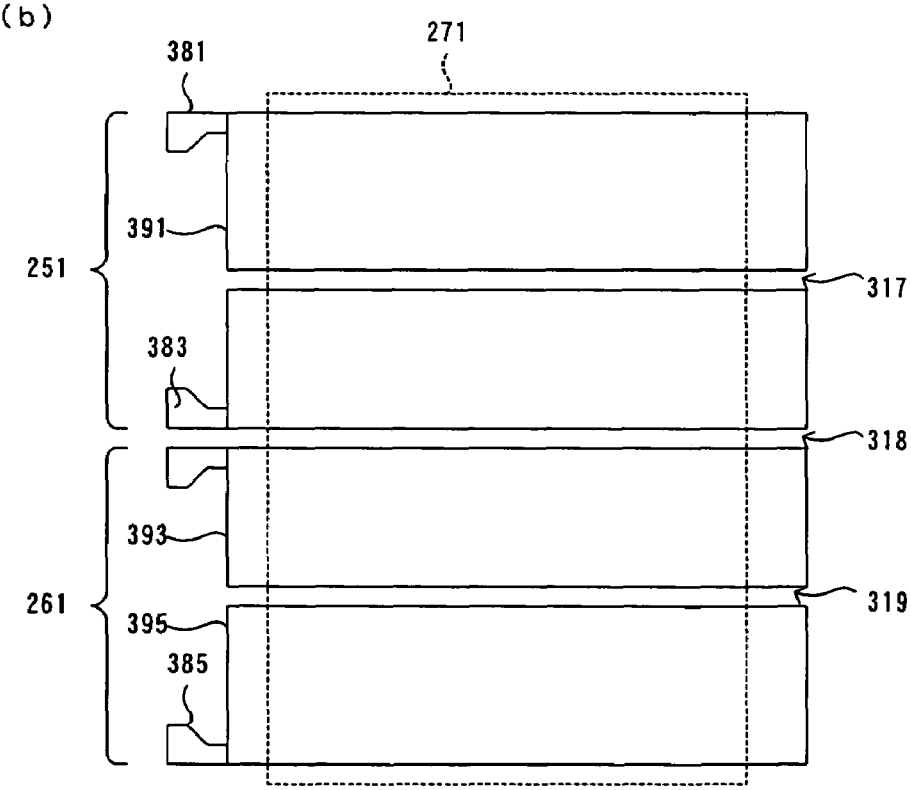

FIG. 2 is a top view of a composite electrode provided on the liquid crystal optical modulator, and FIG. 3 is a top view of an opposed electrode.

The configuration of the composite electrode 111 of the liquid crystal optical modulator of the present invention is the same as that for a method for implementing the conventional micro lens array of variable-focal length type. Only the configuration of the opposed electrode 113 (shown in FIG. 3) differs.

The composite electrode 111 has two lens areas in an active area 271: first cylindrical lens 251 and second cylindrical lens 261. The first cylindrical lens area 251 and the second cylindrical lens area 261 form a stripe electrode bundle composed of a first stripe electrode 220 to the Nth stripe electrode 229 (N=10 in FIG. 2) and from the (N+1)th stripe electrode 230, which is the first electrode of the second cylindrical lens area, to the 2Nth stripe electrode 239, all of which are formed with a low-resistance polycrystalline transparent conductive film such as an ITO film. This stripe electrode bundle is connected by a first gradient potential electrode 201. The first gradient potential electrode 201 has three control signal electrodes: a 211, b 213, and c 215. By applying a predetermined voltage to these electrodes, a gradient potential is applied to the stripe electrode bundle via the first gradient potential electrode 201.

The liquid crystal optical modulator of the present invention may employ a configuration in which a linear or circular stripe electrode bundle is electrically connected by a gradient potential electrode. Preferably, the liquid crystal optical modulator may employ a configuration in which the stripe electrode bundle, composed of a linear or circular transparent conductive film, is electrically connected by a gradient potential electrode formed by a stripe-shaped transparent conductive film having a resistance higher than that of the transparent conductive film of the stripe electrodes.

Although the metal material of the stripe-shaped transparent high-resistance conductive film, which has a resistance higher than that of the transparent conductive film of the stripe electrodes, may be the same as that used for the stripe electrodes, it is desirable that the metal material be an amorphous conductive material that is transparent and has a resistance higher than that of the ITO film of the stripe electrodes such as a material created by adding a predetermined amount of impurities to $In_2O_3$.

When a low aperture rate is acceptable, a non-transparent, relatively high resistance metal material may also be used for the gradient potential electrode. In this case, for the stripe electrodes, an electrode made of an ordinary metal material may be used. For example, titan (Ti), tantalum ($\alpha$-Ta or $\beta$-Ta, etc.), titan tungsten (Ti—W), nichrome (Ni—Cr), or nitrogen-doped titan (Ti), tantalum (($\alpha$-Ta or $\beta$-Ta, etc.), and titan tungsten (Ti—W) may be used.

The following describes the configuration of an opposed electrode. FIG. 3 shows the structure of an opposed electrode 113 opposed to the composite electrode 111. A first cylindrical lens 251 and a second cylindrical lens 261 are formed in an active area 271. The opposed electrode for the first cylindrical lens 251 is composed of a first opposed electrode 391 and a second opposed electrode 393 which are separated by a first division line 317. Similarly, the opposed electrode for the second cylindrical lens 261 is composed of a second opposed electrode 393 and a third opposed electrode 395 which are separated by a second division line 319. In this example, the division line dividing the opposed electrode is provided between the signal electrode a 211 and the signal electrode b 213 and between the signal electrode b 213 and the signal electrode c 215.

A predetermined voltage is applied to the first to third opposed electrodes 391, 393, and 395 via the first to third opposed signal electrodes 381, 383, and 385. Although the second opposed electrode 393 is shared by the first cylindrical lens 251 and the second cylindrical lens 261 in the embodiment shown in FIG. 3(a), the second opposed electrode 393 may be divided into the electrodes for the first and second cylindrical lenses 251 and 261 by a third division line 318 as in the embodiment shown in FIG. 3(b).

Figure 34:
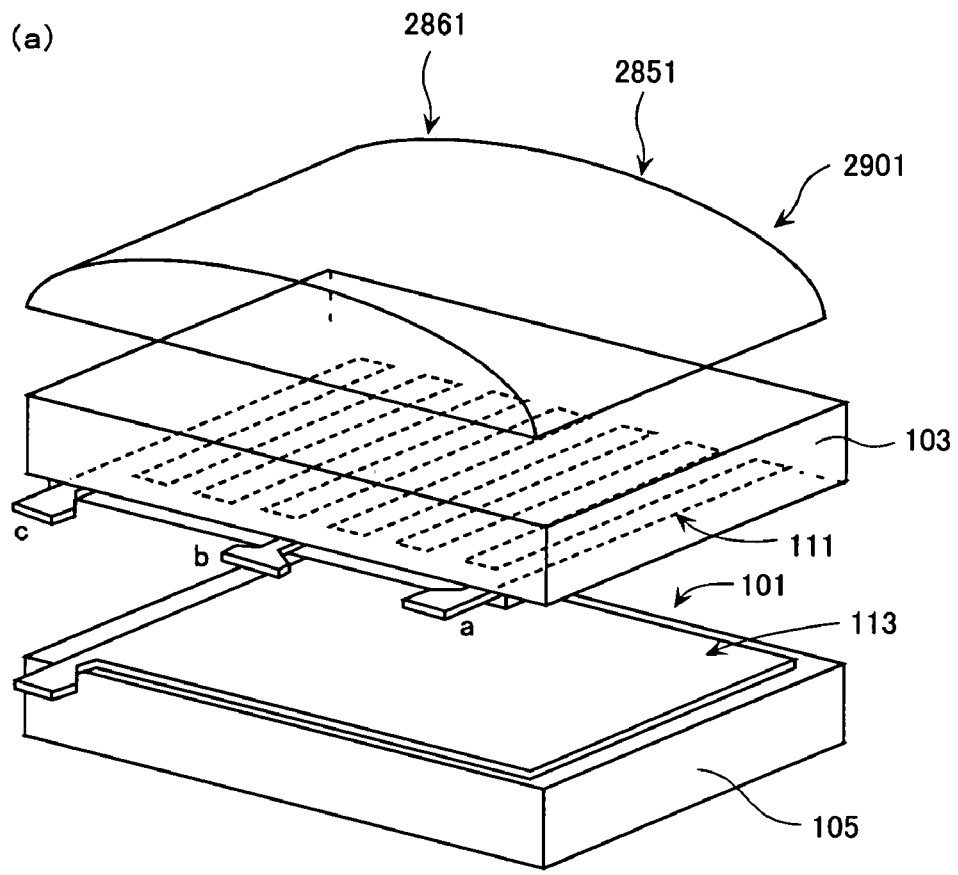
FIG. 34 is a perspective view of an example of cylindrical lens configuration.
Figure 34:
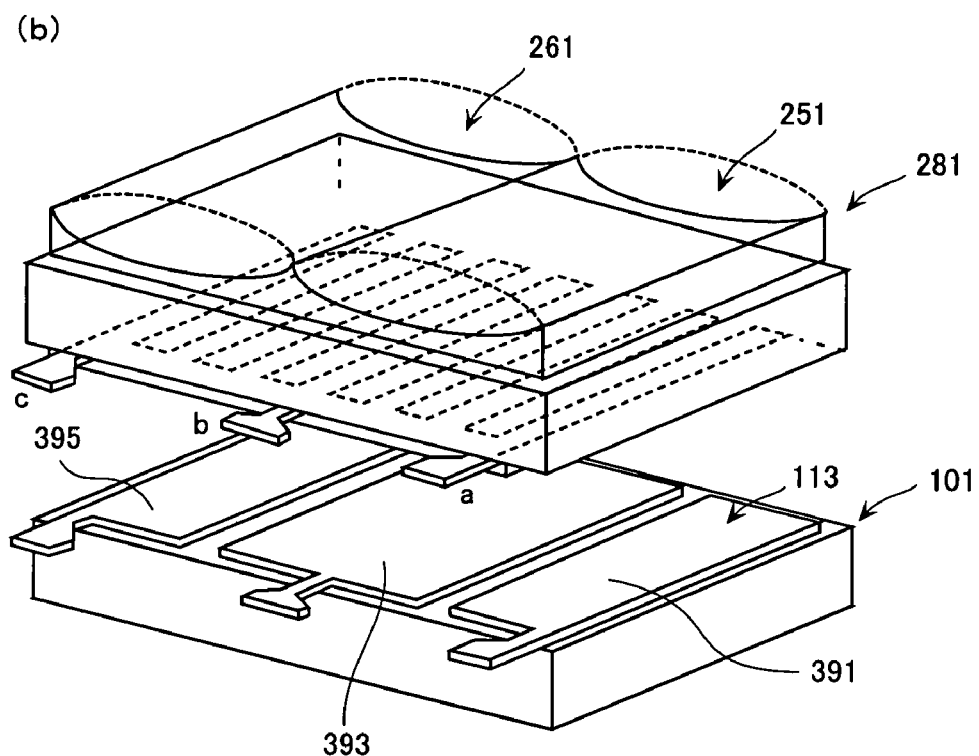
Figure 35:
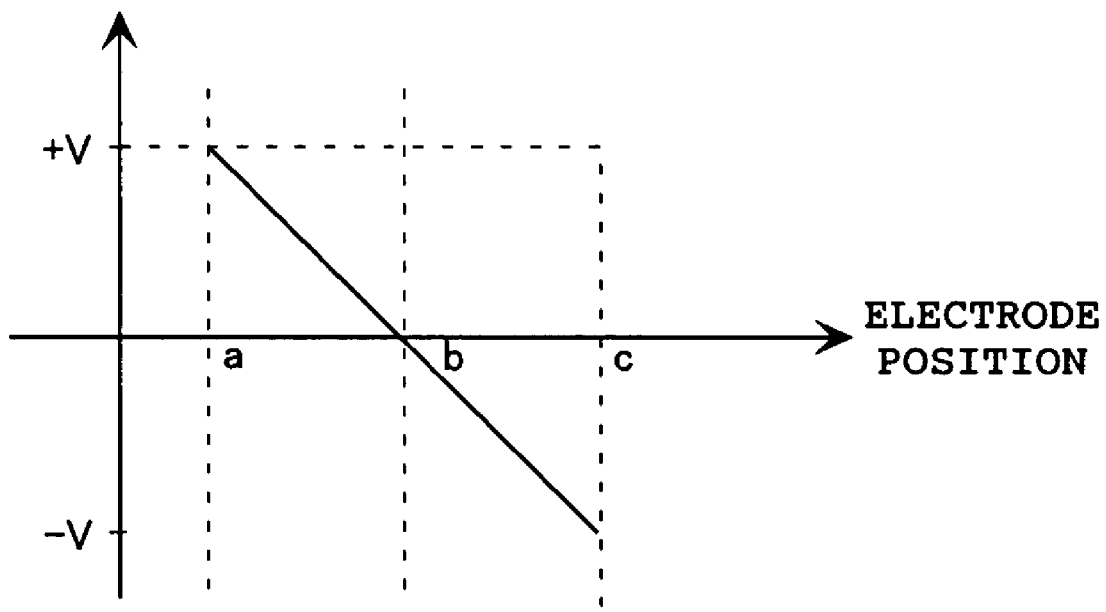
FIG. 35 is a diagram showing a gradient potential applied to a liquid crystal optical modulator.
Figure 35:
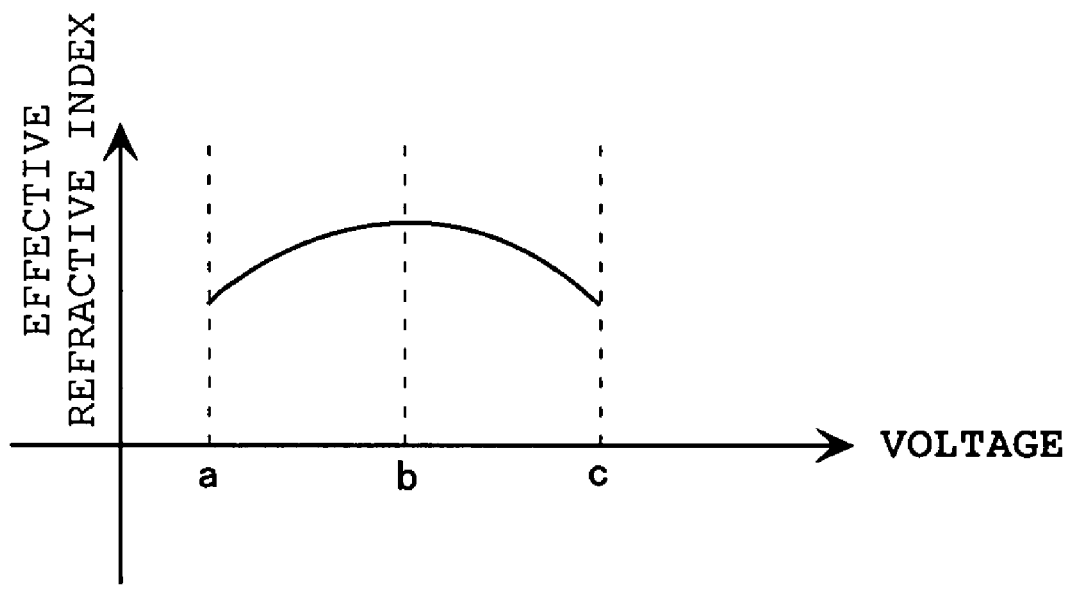
Figure 36:
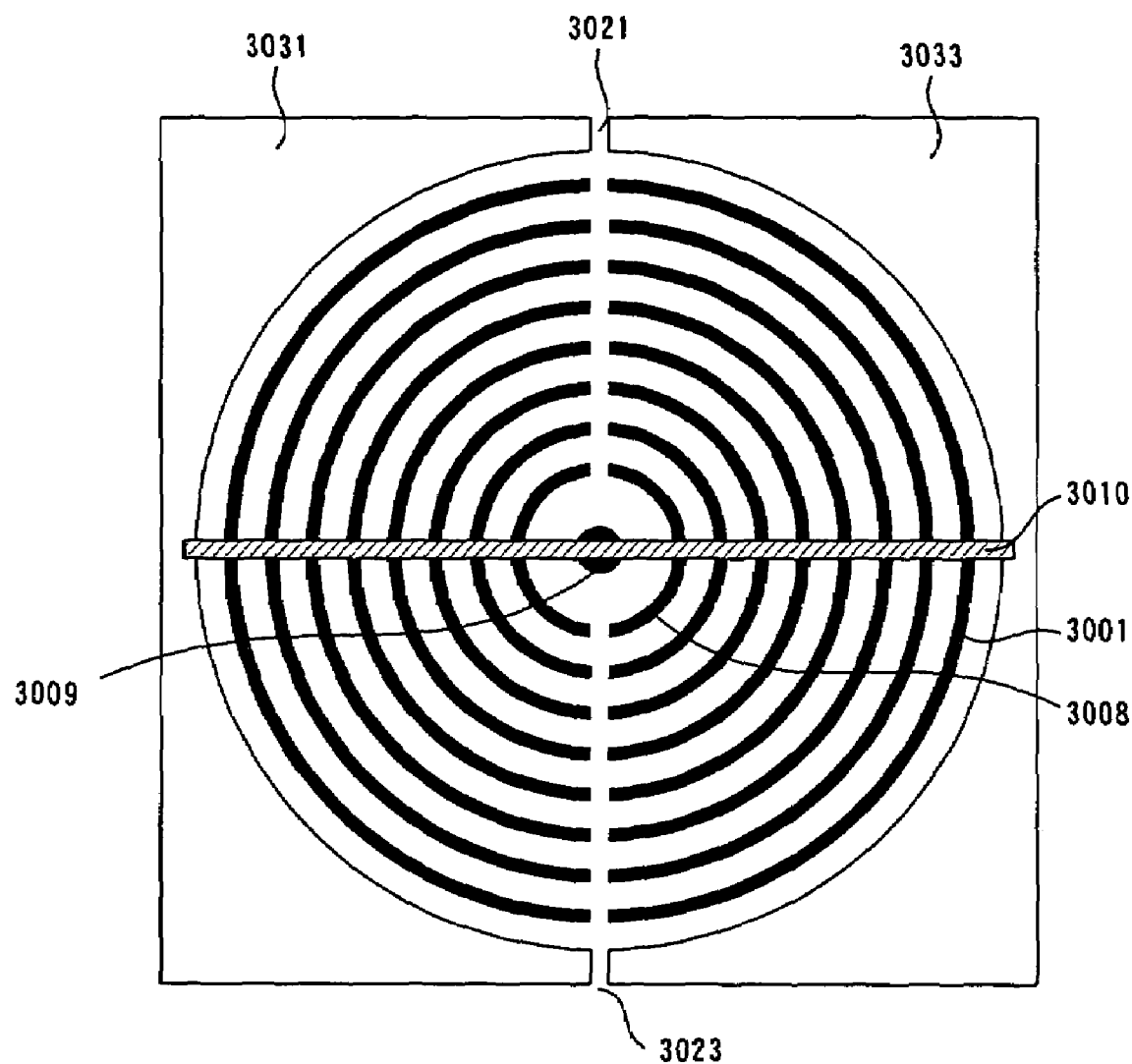
FIG. 36 is a top view of the structure of a composite electrode for configuring a spherical lens using a liquid crystal optical modulator.

The composite electrode 111 and the opposed electrode 113 in FIG. 1 form a liquid crystal cylindrical lens which are overlapped with the first cylindrical lens 251 and the second cylindrical lens 261 shown in FIG. 2 and FIG. 3. The perspective view in FIG. 34(b) schematically shows a liquid crystal cylindrical lens. The two lens areas, first cylindrical lens 251 and second cylindrical lens 261, form a convex lens area or a concave lens area 281.

As apparent from the above description, the liquid crystal optical modulator according to the present invention, which forms a cylindrical lens, requires only (M+1) connections from the drive circuit to the signal electrodes even when one cylindrical lens is composed of N stripe electrodes, where M is the number of cylindrical lenses. Therefore, the number of signal electrodes required for connection from the drive signal to all stripe electrodes, M×N, can be significantly reduced especially when the number of stripe electrodes increases.

The following describes how to drive the liquid crystal optical modulator according to the present invention. With the signal electrodes provided on the gradient potential electrode at a predetermined interval, AC pulse signals, with equal amplitude and frequency but 180 degrees out of phase to one another, are applied to the neighboring signal electrodes. This causes the gradient potential electrode to generate a linear potential gradient and causes the stripe electrode bundle to generate a linearly graded potential distribution in the liquid crystal optical modulator.

The liquid crystal optical modulator has the opposed electrode 113, formed with a transparent conductive file, such that the opposed electrode 113 is opposed to the stripe electrode bundle that is the composite electrode 111 on the first substrate 103. This opposed electrode 113 is composed of a predetermined number of areas corresponding to the groups, that is, first cylindrical lens 251 and second cylindrical lens 261, created by dividing the stripe electrode bundle. The homogeneously aligned liquid crystal layer 101, with a pre-tilt angle of 0.5 degree to 20 degrees, is held between the composite electrode 111 composed of a stripe electrode bundle and the opposed electrode 113.

Figure 5:
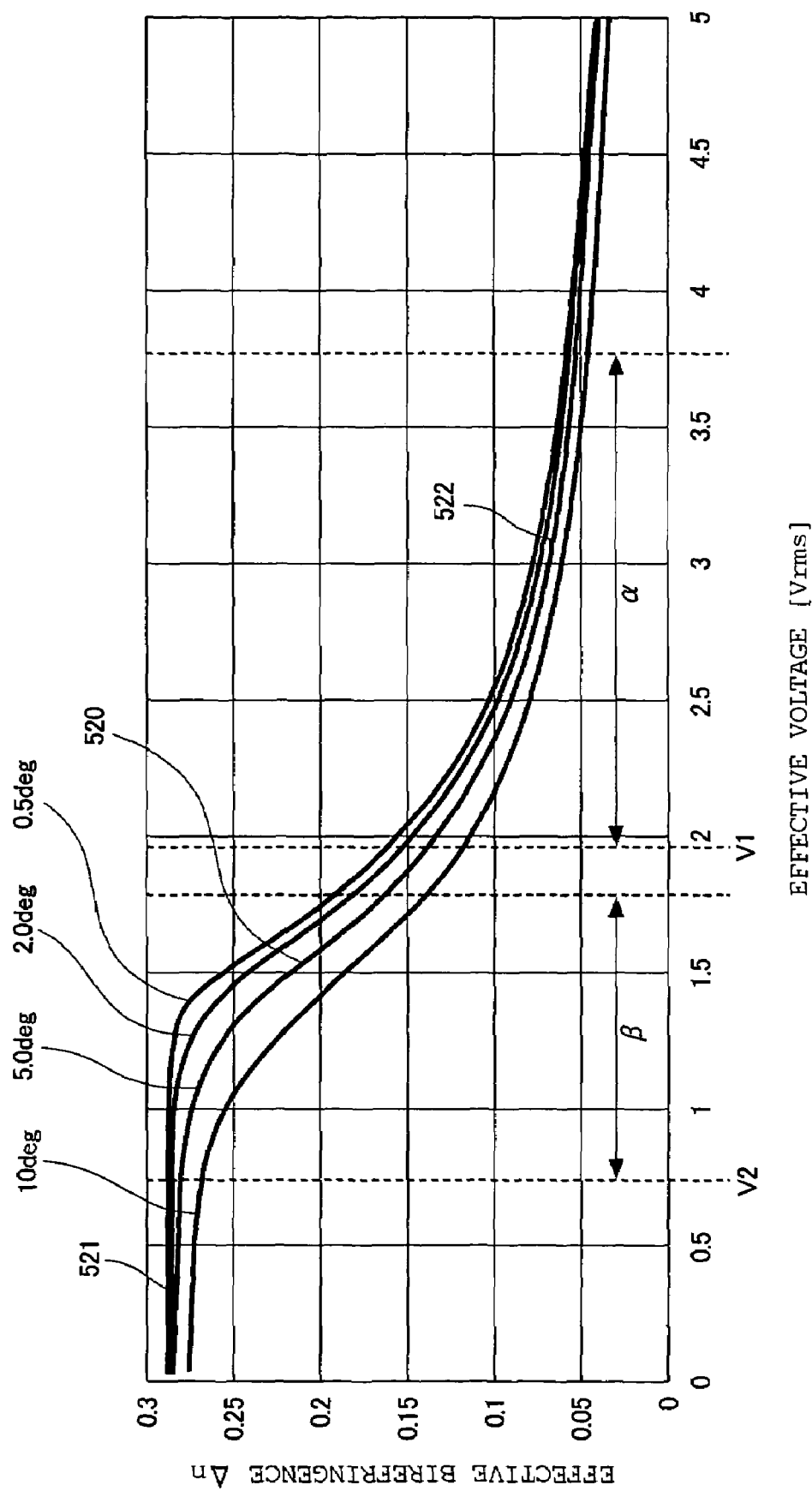
FIG. 5 is a graph showing the characteristics of applied voltages versus effective birefringences of the liquid crystal layer of the liquid crystal optical modulator of the present invention.

FIG. 5 shows the phase modulation curve of homogeneously aligned liquid crystal where the horizontal axis indicates the effective voltage V that is applied to the liquid crystal and the vertical axis indicates the effective birefringence Δn. The distribution of effective birefringence of the liquid crystal molecule layer 101 is determined by the phase modulation curve shown in FIG. 5 depending upon the distribution of voltage on the composite electrode 111 and the opposed electrode 113.

To cause the homogeneously aligned liquid crystal molecule layer 101 to function as a downwardly convex lens (concave lens), the effective voltage value during the liquid crystal drive period should be set to V1 [rms] in FIG. 5 in the vicinity of the signal electrode a 211, signal electrode b 213, and signal electrode c 215 of the liquid crystal molecule layer 101, and to the V1+α[rms] in FIG. 5 in the vicinity of the first division line 317 and second division line 319 of the liquid crystal molecule layer 101.

The following describes, more in detail, how to cause the liquid crystal optical modulator of the invention to function as a downwardly convex lens (concave lens)

Figure 6:
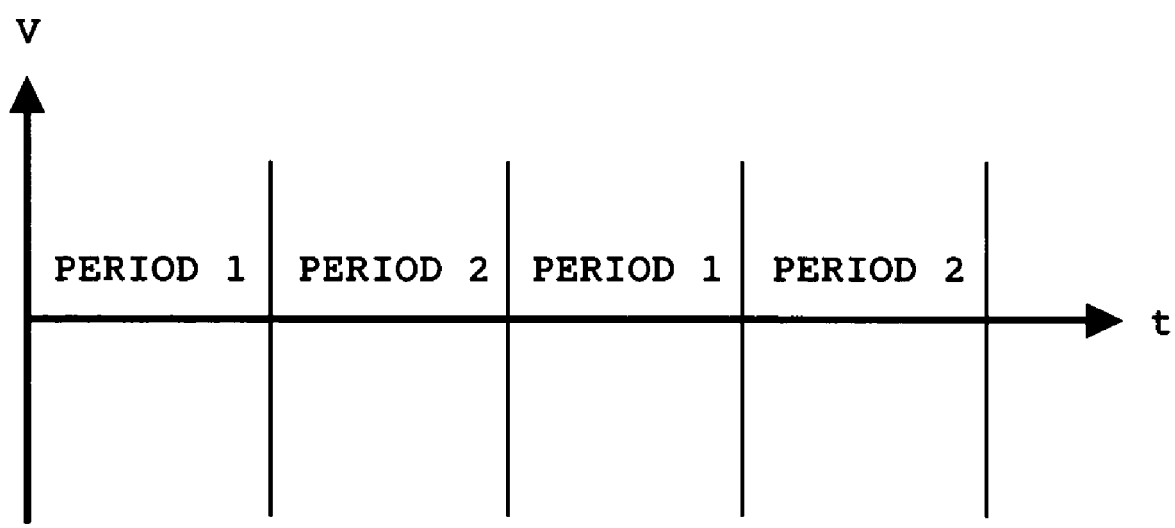
FIG. 6 is a diagram showing periods during which a signal is applied to the signal electrodes of the liquid crystal optical modulator of the present invention.

The signal voltage +α[V] is applied to the signal electrode a 211 and the signal electrode c 215 in FIG. 2, and the signal voltage −α[V] to the signal electrode b 213, in period 1 in FIG. 6 as shown in FIG. 7(a). Because the first gradient potential electrode 201 generates a linear potential distribution among the signal electrodes as indicated by the solid line, the voltage becomes 0[V] in the vicinity of the first division line 317 on the first cylindrical lens 251 and in the vicinity of the second division line 319 on the second cylindrical lens 261 as shown in FIG. 7(a).

+V1+α[V] indicated by the solid line is applied to the opposed signal electrode 381 and the opposed signal electrode 385 in FIG. 3, and −V1−α[V] indicated by the solid line to the opposed signal electrode 383, in the same period 1 in FIG. 6 as shown in FIG. 7(b). Because the distribution of potential in period 1 applied to the liquid crystal molecule layer 101 at this time is the difference between FIG. 7(a) and FIG. 7(b), the voltage is indicated by the solid line shown in FIG. 7(c).

The signal voltage −α[V] is applied to the signal electrode a 211 and the signal electrode c 215 in FIG. 2, and the signal voltage +α[V] to the signal electrode b 213, in period 2 in FIG. 6 as shown in FIG. 7(a). Because the first gradient potential electrode 201 generates a linear potential distribution among the signal electrodes as indicated by the dotted line, the voltage becomes 0[V] in the vicinity of the first division line 317 on the first cylindrical lens 251 and in the vicinity of the second division line 319 on the second cylindrical lens 261.

−V1−α[V] is applied to the opposed signal electrode 381 and the opposed signal electrode 385, and +V1+α[V] indicated by the dotted line to the opposed signal electrode 383, in the same period 2 in FIG. 6 as shown by the dotted line in FIG. 7(b). Because the distribution of potential in period 2 applied to the liquid crystal molecule layer 101 at this time is the difference between the curved lines indicated by the dotted line in FIG. 7(a) and FIG. 7(b), the voltage is indicated by the dotted line shown in FIG. 7(c).

Repeating the voltage application patterns alternately in the same cycle between period 1 and period 2 in FIG. 6 using the drive method described above sets the average voltage, applied to the liquid crystal molecule layer 101, to 0[V], thus minimizing the degradation of liquid crystal. The effective voltages applied to the liquid crystal molecule layer 101 in period 1 and period 2 in FIG. 6 are the waveforms shown in FIG. 7(d) and FIG. 8(a). Therefore, the downwardly convex (concave) refractive index distribution, such as the one shown in FIG. 8(b), is generated in the liquid crystal molecule layer and the liquid crystal optical modulator can function as a concave lens.

To implement a convex lens, the effective voltage value during the liquid crystal drive period should be set to V2+β[rms] in FIG. 5 in the vicinity of the signal electrode a 211, signal electrode b 213, and signal electrode c 215 of the liquid crystal molecule layer 101 in the configuration of the present invention, and to V2[rms] in FIG. 5 in the vicinity of the first division line 317 and the second division line 319 of the liquid crystal molecule layer 101.

The following describes, more in detail, how to cause the liquid crystal optical modulator of the invention to function as a convex lens.

The signal voltage +β[V] is applied to the signal electrode a 211 and the signal electrode c 215 in FIG. 2, and the signal voltage −β[V] to the signal electrode b 213, in period 1 in FIG. 6 as shown in FIG. 9(a). Because the gradient potential electrode 201 generates a linear potential distribution among the signal electrodes as indicated by the solid line, the voltage becomes 0[V] in the vicinity of the first division line 317 on the first cylindrical lens 251 and in the vicinity of the second division line 319 on the second cylindrical lens 261.

−V2[V] indicated by the solid line is applied to the opposed signal electrode 381 and the opposed signal electrode 385, and +V2[V] indicated by the solid line to the opposed signal electrode 383, in the same period 1 in FIG. 6 as shown in FIG. 9(b). Because the distribution of potential in period 1 applied to the liquid crystal molecule layer 101 at this time is the difference between FIG. 9(a) and FIG. 9(b), the voltage is indicated by the solid line shown in FIG. 9(c).

The signal voltage −β[V] is applied to the signal electrode a 211 and the signal electrode c 215 in FIG. 2, and the signal voltage +β[V] to the signal electrode b 213, in period 2 in FIG. 6, as shown in FIG. 9(a). Because the gradient potential electrode 201 generates a linear potential distribution among the signal electrodes as indicated by the dotted line, the voltage becomes 0[V] in the vicinity of the first division line 317 on the first cylindrical lens 251 and in the vicinity of the second division line 319 on the second cylindrical lens 261.

+V2[V] is applied to the opposed signal electrode 381 and the opposed signal electrode 385, and −V2[V] indicated by the dotted line to the opposed signal electrode 383, in the same period 2 in FIG. 6 as shown by the dotted line in FIG. 9(b). Because the distribution of potential in period 2 applied to the liquid crystal molecule layer 101 at this time is the difference between the curved lines indicated by the dotted line in FIG. 9(a) and FIG. 9(b), the voltage is indicated by the dotted line shown in FIG. 9(c).

Repeating the voltage application patterns alternately in the same cycle between period 1 and period 2 in FIG. 6 using the drive method described above sets the average voltage, applied to the liquid crystal molecule layer 101, to 0[V], thus minimizing the degradation of liquid crystal. The effective voltages applied to the liquid crystal molecule layer 101 in period 1 and period 2 in FIG. 6 are the waveforms shown in FIG. 9(d) and FIG. 10(a). Therefore, the upwardly convex refractive index distribution, such as the one shown in FIG. 10(b), is generated in the liquid crystal molecule layer and the liquid crystal optical modulator can function as a convex lens.

In this way, the liquid crystal optical modulator of the present invention can operate as a convex lens by applying the voltage value in the first quadratic curve approximation area to the signal electrodes. The above description also indicates that the liquid crystal optical modulator of the present invention can operate as a concave lens by applying the voltage value in the second quadratic curve approximation area to the signal electrodes. Therefore, a spatially cylindrical or spherical refractive index modulation distribution can be created by the potential gradient of the stripe electrodes.

Figure 7:
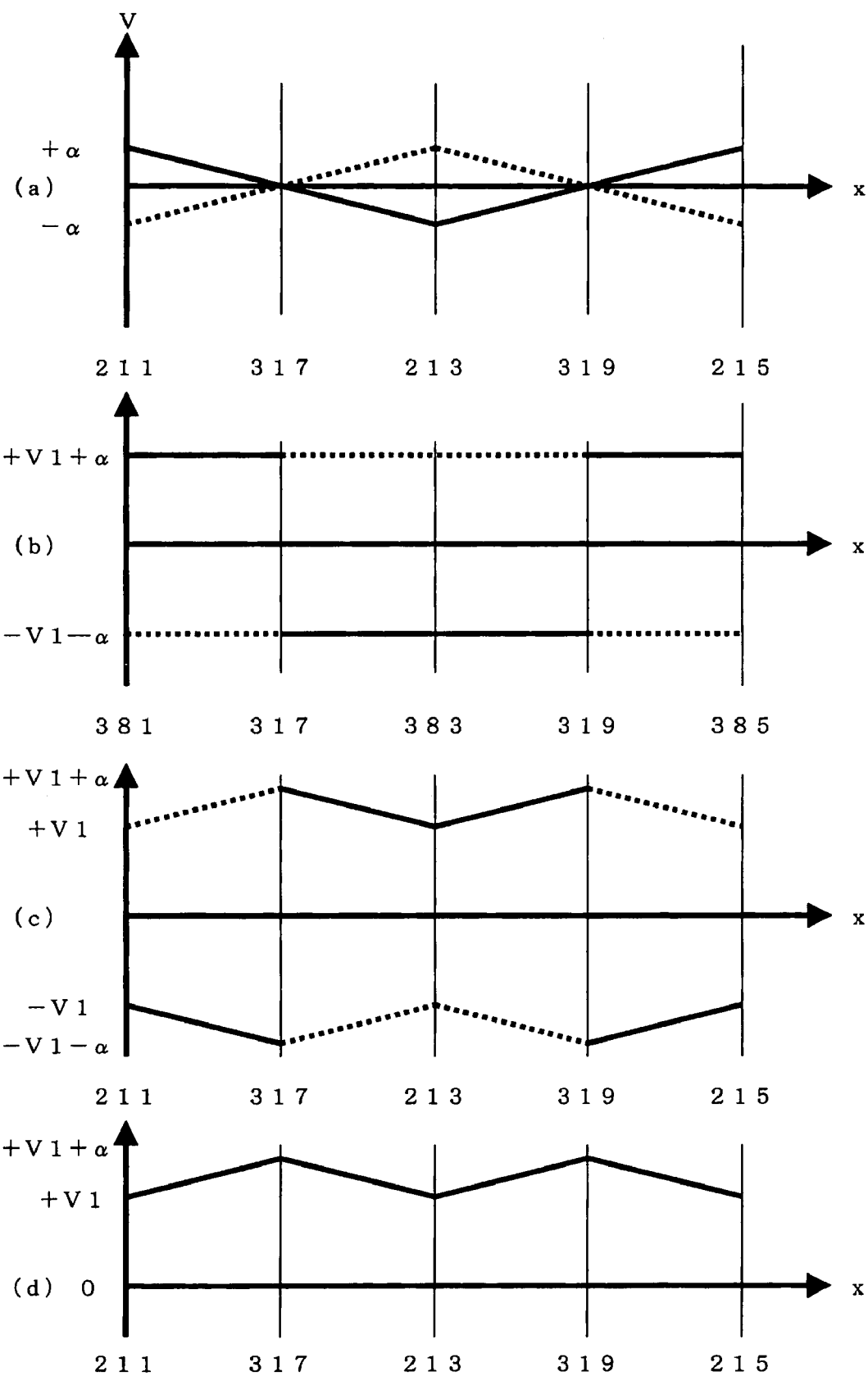
FIG. 7 is a diagram showing drive waveforms for the liquid crystal optical modulator of the present invention to perform a concave lens operation.
Figure 8:
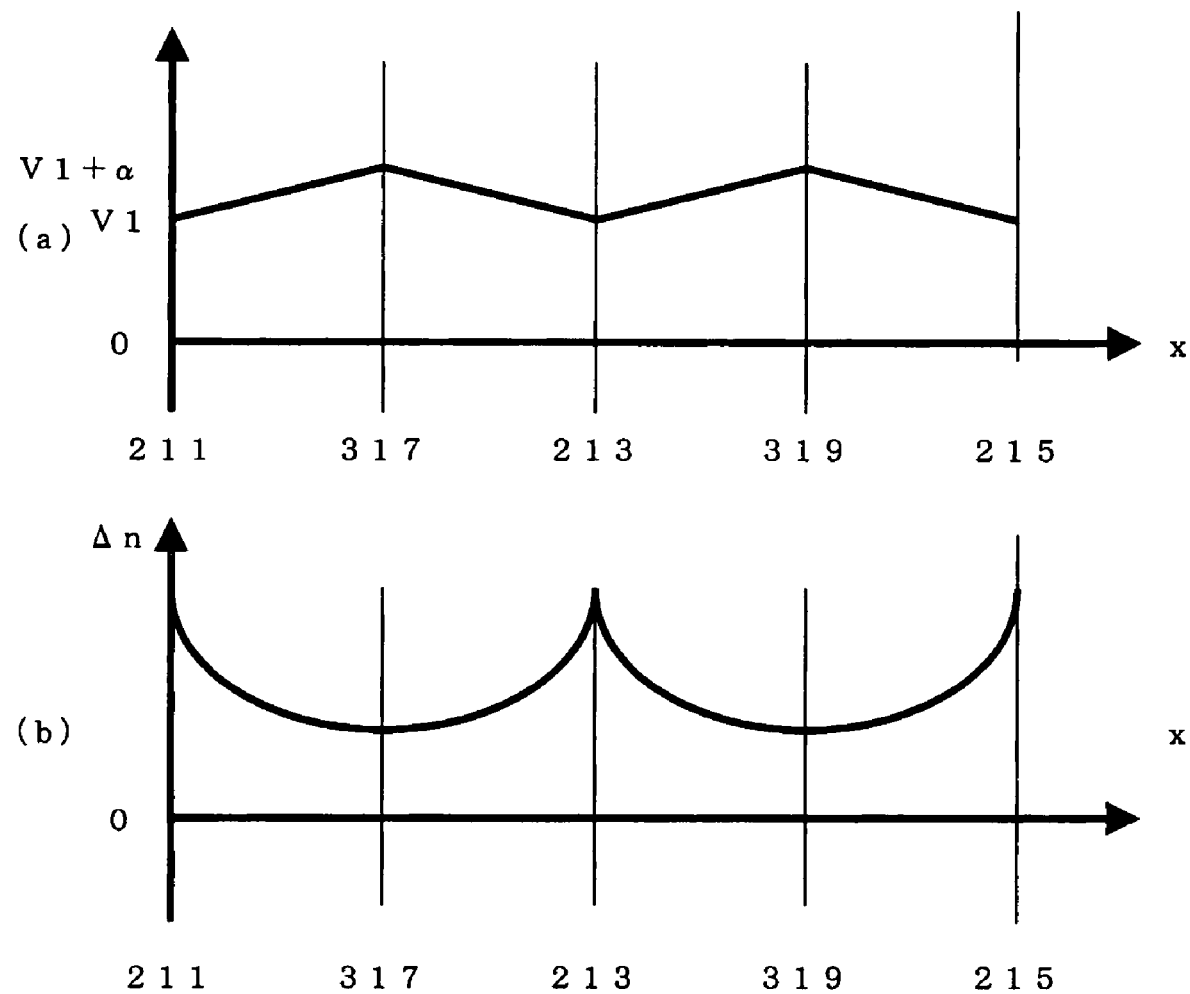
FIG. 8 is a diagram showing effective voltages applied to the liquid crystal molecule layer of the present invention.

For the convex lens operation using a homeotropic alignment liquid crystal layer, a common-mode voltage such as the one shown in FIG. 7 should be applied to the opposed electrodes, divided according to the voltage applied to the signal electrodes, in the same manner in which the voltage is applied to homogeneously aligned liquid crystal layer to cause the liquid crystal optical modulator to function as a convex lens.

Figure 9:
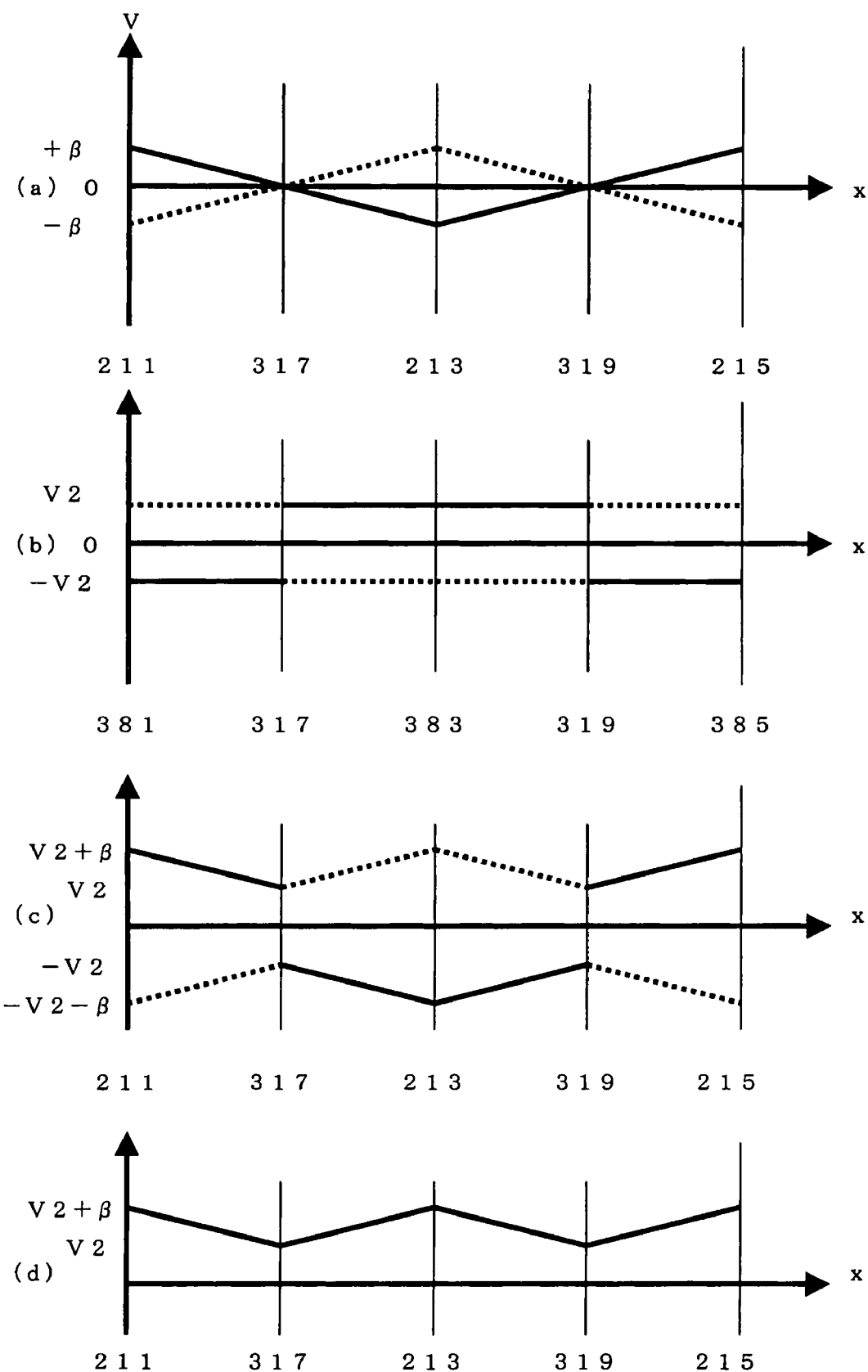
FIG. 9 is a diagram showing drive waveforms for the liquid crystal optical modulator of the present invention to perform a convex lens operation.
Figure 10:
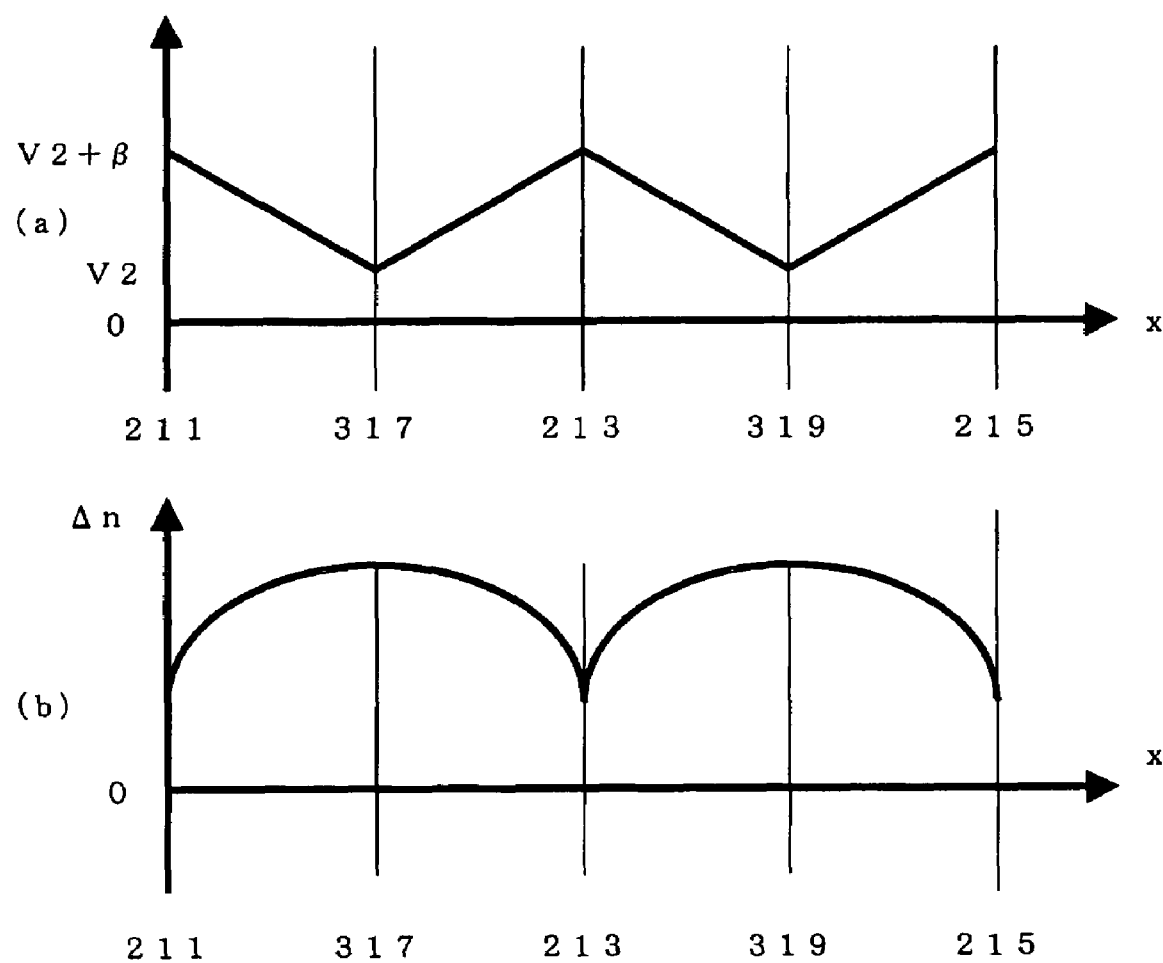
FIG. 10 is a diagram showing effective voltages applied to the liquid crystal molecule layer of the present invention.

For the concave lens operation using a homeotropic alignment liquid crystal layer, an opposite phase voltage such as the one shown in FIG. 9 should be applied to the opposed electrodes, divided according to the voltage applied to the signal electrodes, in the same manner in which the voltage is applied to homogeneously aligned liquid crystal layer to cause the liquid crystal optical modulator to function as a convex lens.

According to this method, the lens power can be controlled by a pair of two control signals connected to the signal electrodes of the composite electrode and, by dividing the opposed electrode corresponding to the composite electrode, the bias voltage can be linearly shifted to any point on the phase modulation curve by a pair of two opposite electrode signals. As in the drive method that will be described later, this can be accomplished not only by time-dividing the bias voltage that determines the operation point but also by controlling the phase of two bias signals applied to the opposed electrodes.

As a result, this method allows the focal length of a cylindrical lens or a spherical lens to be varied from positive (convex lens) to negative (concave lens). In particular, its simple structure is suitable for forming an array.

Next, another structure of the composite electrode 111 for forming an cylindrical lens will be described with reference to FIG. 4. In this configuration, signal electrodes are added to the other end across the stripe electrodes in FIG. 2. When the stripe electrodes have a resistance in the lengthwise direction, that is, when the impedance of the stripe electrodes increase with respect to the impedance of the drive frequency of the liquid crystal layer, a voltage distribution is generated along the lengthwise direction of the stripe electrodes and the refractive index varies in the lengthwise direction of the stripe electrodes. However, the configuration described above equalizes the voltage distribution along the lengthwise direction of the stripe electrodes and therefore prevents the refractive index from being distorted.

Figure 4:
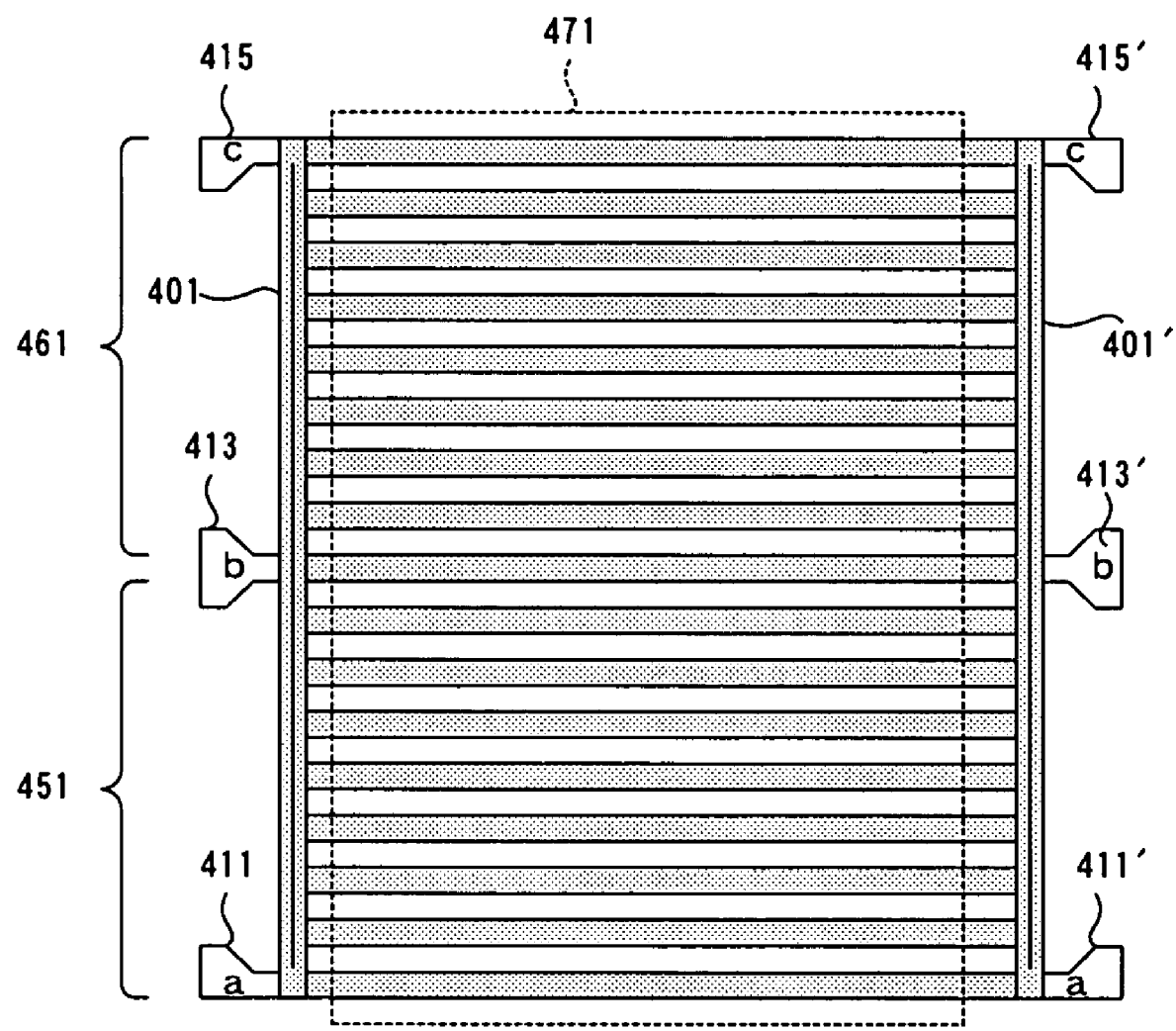
FIG. 4 is a top view of a composite electrode with another structure for forming a cylindrical lens of the present invention.

In the composite electrode structure in FIG. 4, the drive method for the liquid crystal optical modulator described above can be used by externally shorting pairs of signal electrodes a 411 and a signal electrode a' 411', signal electrode b 413 and signal electrode b' 413', and signal electrode c 415 and signal electrode c' 415'. The configuration of the opposed electrode may be the same as that shown in FIG. 3.

Figure 11:
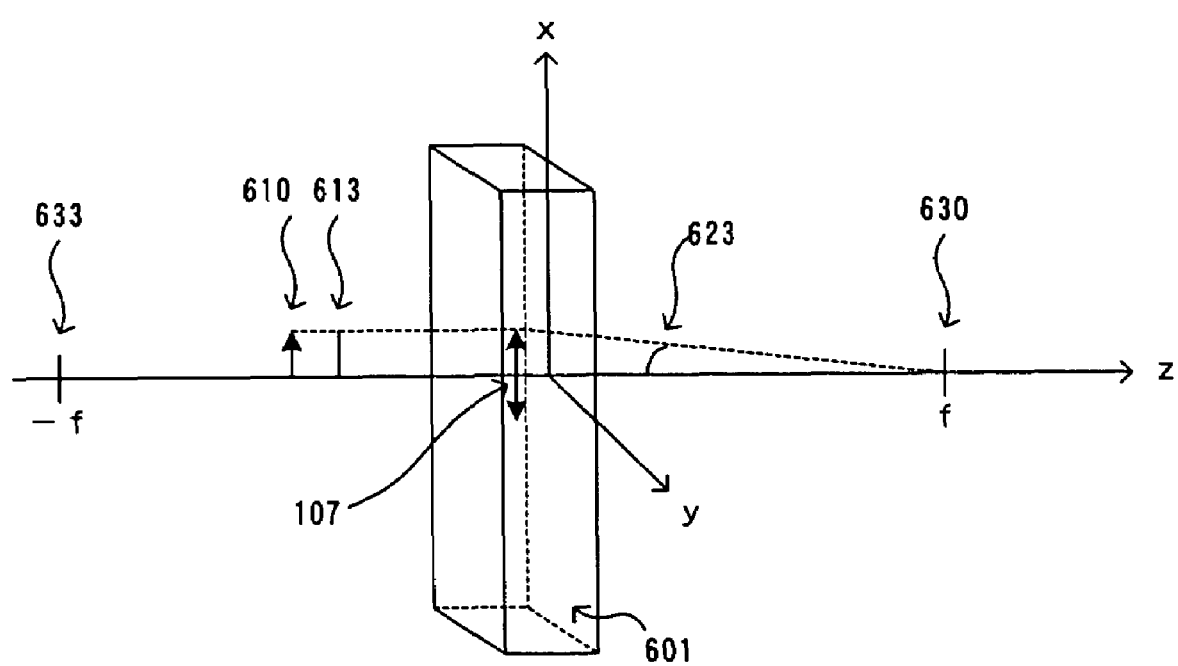
FIG. 11 is a diagram showing the principle of operation of a liquid crystal lens of the present invention.

Now, with reference to FIG. 11, the following describes the principle of operation of the liquid crystal lens, primarily the operation of a convex lens, according to the present invention using homogeneous alignment as an example.

In FIG. 11, consider that, into the z-axis direction, a linearly polarized light 610 vibrating in the direction parallel to the x-axis enters a liquid crystal lens 601 that uses the p-type nematic liquid crystal where directors 107 are homogeneously aligned in the direction parallel to the x-axis. The incoming wavefront 613 of the light before entering the liquid crystal lens 601 is a plane. When an electric field is applied to the liquid crystal lens 601 to control the in-plane distribution of the directors so that a predetermined refractive index distribution is generated, the incoming wavefront 613 can be converted to an outgoing wavefront 623 of a spherical wave converging at a focal point f 630.

A convex lens converts an incoming plane wave to a spherical wave converging at the focal point f (>0), while a concave lens converts an incoming plane wave to a spherical wave diffusing (diverging direction) from the focal point f (<0) before (incoming side) the concave lens. Therefore, the detailed description of the concave lens operation is omitted here.

With reference to FIG. 12(a), the following describes how to derive a convergence condition for a liquid crystal lens. Suppose that the x-y plane is the plane of the outgoing side of the liquid crystal layer of the liquid crystal lens 601 and that the focal point f 630 is on the z-axis that passes through the origin O of the x-y plane. Let r be the distance from the origin O to a point r 701 in the plane of outgoing side of the liquid crystal lens 601. Then, as compared with a first light path length R 710 of a light that travels along the optical axis O-z, a light going from the point r 701 to the focal point f 630 must travel an extra distance of a second optical path length t.720. As shown in FIG. 12(a), $$r^2 + R^2 = (t+R)^2 \tag{1}$$

By solving the equation for t $$t = (R^2 + r^2)^{1/2} - R \tag{2}$$

where $r^2 = x^2 + y^2$.

Therefore, if the length of the light path, along which the incoming wave in the liquid crystal lens 601 propagates until it reaches the plane of the outgoing side of the liquid crystal lens 601, can be made shorter than the length of a light passing through the origin O on the optical axis by the second optical path length t (r) 720 at the point r 701, then the incoming wavefront 613 can be converted to a spherical wave converging at the focal point f 630.

For the concave lens operation, it is considered that the an incoming plane wave is converted to a spherical wave propagating from the position of a focal point −f 633 as shown in FIG. 12(b). Therefore, if the length of the light path, along which the incoming wave in the liquid crystal lens 601 propagates until it reaches the plane of the outgoing side of the liquid crystal lens 601, is made longer than the length a light passing through the origin O on the optical axis by the second optical path length t (r) 720 at the point r 701, then the incoming wavefront 613 can be converted to a spherical wave diffusing from the focal point −f 633.

Figure 12:
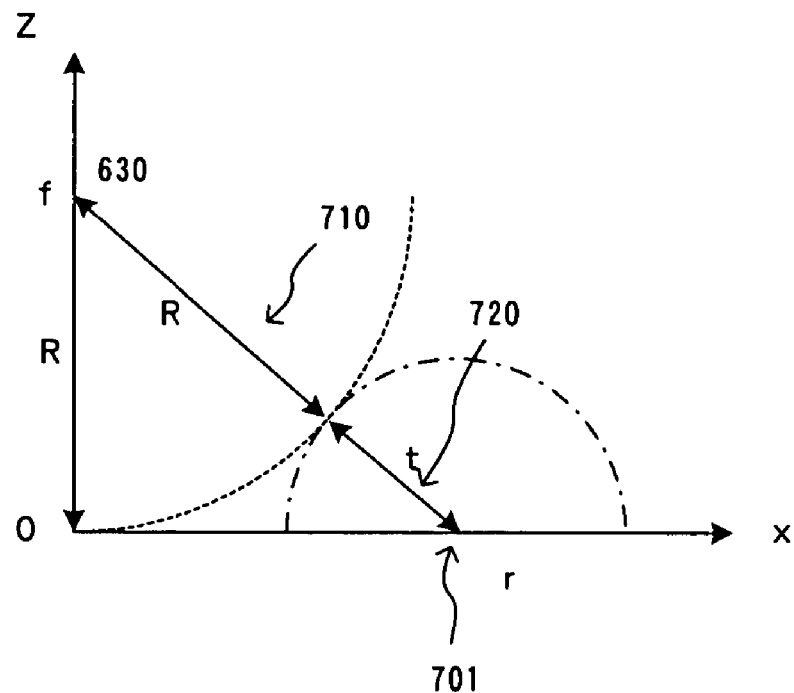
FIG. 12 is a schematic diagram showing how to derive a convergence condition for the liquid crystal lens of the present invention.
Figure 12:
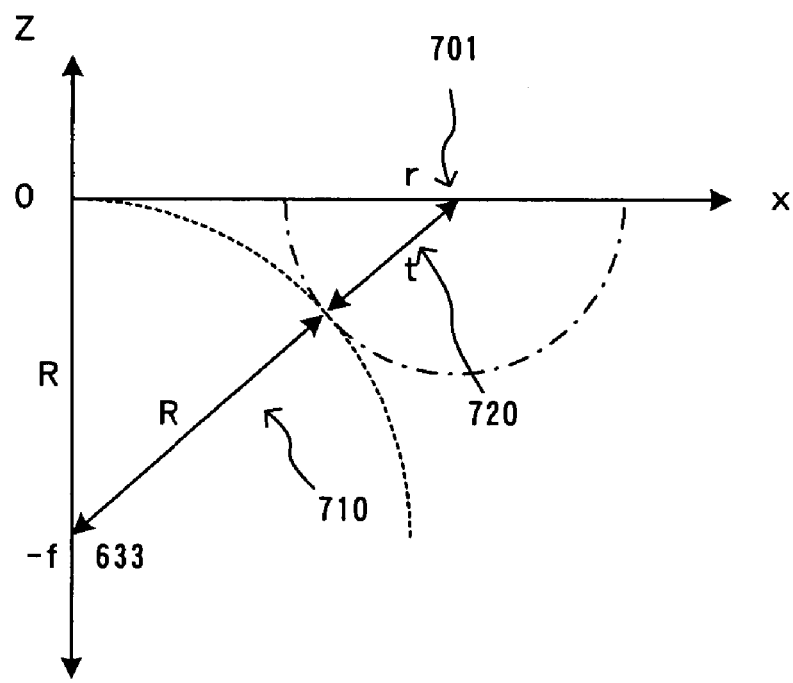
Figure 13:
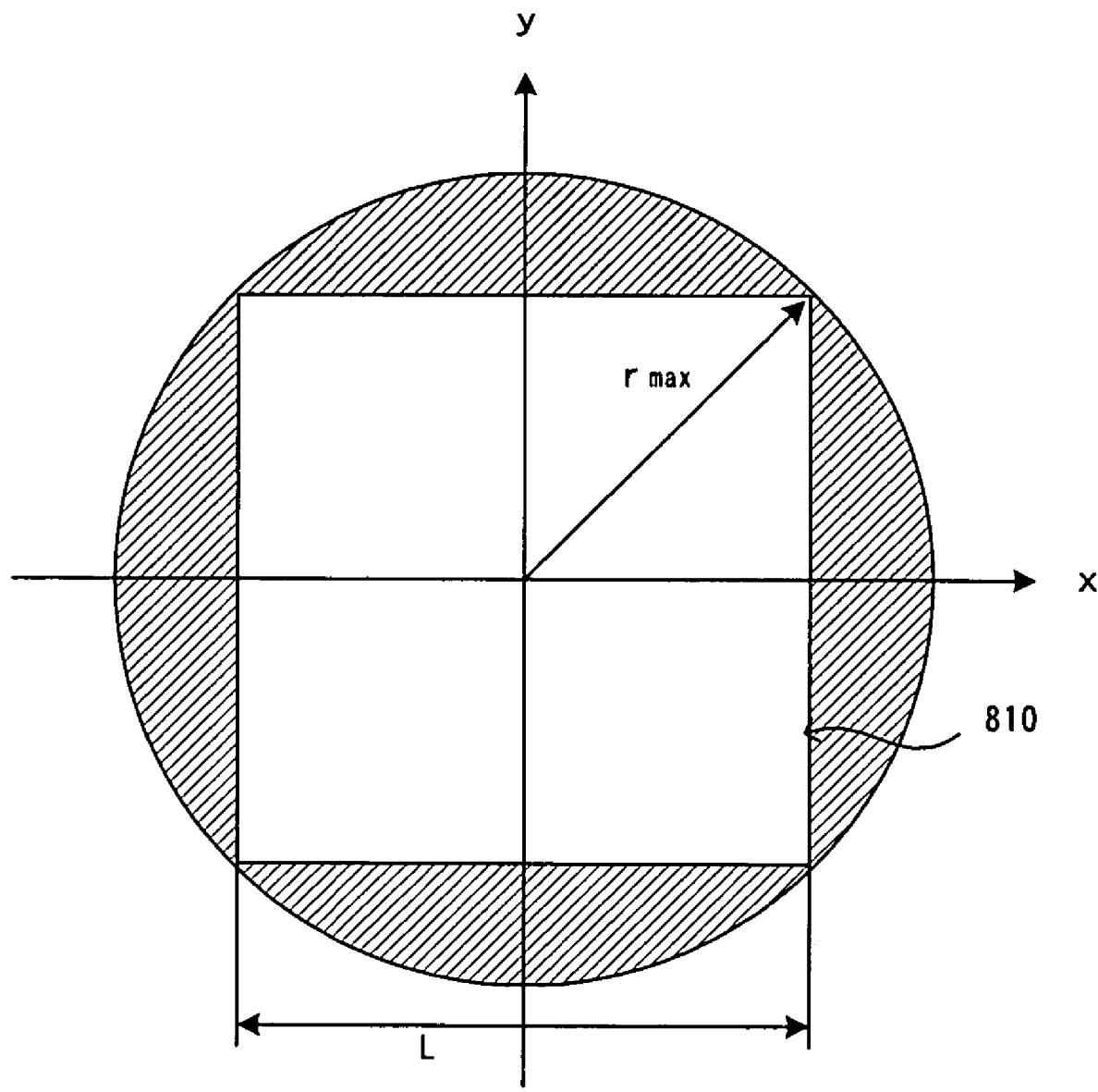
FIG. 13 is a schematic diagram showing a square-shaped liquid crystal lens of the present invention.

Assume that the liquid crystal lens 601 has a square-shaped aperture 810, such as the one shown in FIG. 13, in the x-y plane in FIG. 12. At this time, when r=rmax, the maximum value tmax of the second optical path length t(r) 720 from the plane of the outgoing side of the liquid crystal layer to the focal point f 630 during the convex lens operation of the liquid crystal lens 601 is as follows.

$$tmax = (R^2 + rmax^2)^{1/2} - R \tag{3}$$

Therefore, the above expression indicates that, when the optical path length at the rmax position is used as the reference point, the relative optical path length distribution φ(r) compensated for by the liquid crystal lens 601 can be determined as follows:

$$\phi(r) = t_{max} - t(r) \quad (4)$$

For the concave lens operation, the phase should be delayed most in the liquid crystal layer when r=rmax. Therefore, the relative optical path length distribution φ(r) compensated for by the liquid crystal lens 601 should be determined as follows:

$$\phi(r) = t(r) \quad (4)'$$

By substituting expressions (2) and (3) for expression (4), it becomes:

$$\phi(r) = (R^2 + r_{max}^2)^{1/2} - (R^2 + r^2)^{1/2} \quad (5)$$
$$= R\left[(1 + r_{max}^2/R^2)^{1/2} - (1 + r^2/R^2)^{1/2}\right]$$

If we binomially expand the first term and the second terms included in the square root in expression (5), simplify the expression using the first two expanded terms, and replace R with the focal length f, then the expression becomes expression (6).

(Paraxial Approximation)

$$\phi(r) = 1/(2f) \cdot (r_{max}^2 - r^2) \quad (6)$$

Figure 14:
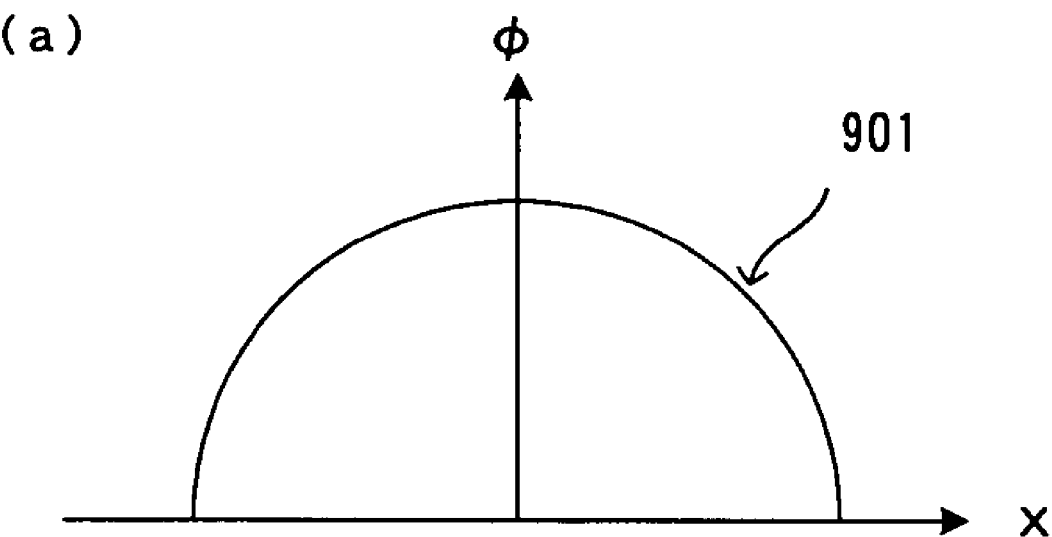
FIG. 14 is a diagram showing the relative light path length distribution $\phi$ of the present invention.
Figure 14:
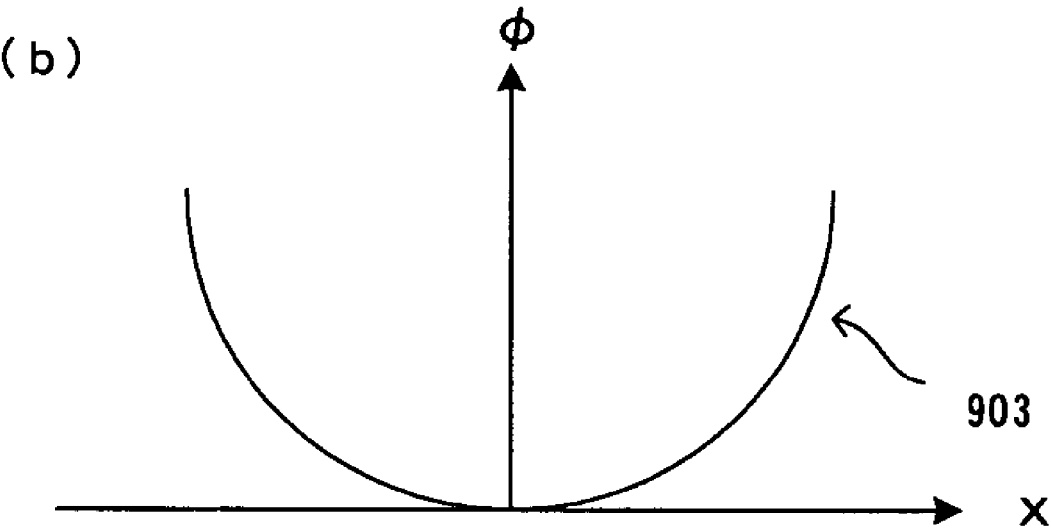

FIG. 14 is a diagram showing the relative light path length distribution φ. Therefore, if the convex lens phase curve 901 of the liquid crystal layer of the liquid crystal lens 601 becomes a quadratic curve satisfying expression (6) as shown in FIG. 14(a), the liquid crystal layer functions as a convex lens.

For a concave lens, by substituting expression (2) for expression (4)' to get the paraxial approximation, the expression becomes $$\phi(r) = 1/(2f) \cdot r^2 \quad (6)'$$

Therefore, if the concave lens phase curve 903 of the liquid crystal layer of the liquid crystal lens 601 becomes a downwardly convex quadratic curve satisfying expression (6)' as shown in FIG. 14(b), the liquid crystal layer functions as a concave lens.

The above description of the liquid crystal lens operation assumes the formation of a spherical lens and therefore, when a cylindrical lens is formed, the focal point is not a point but linear. However, because a cylindrical lens does not vary in one direction in the above description, the description of a cylindrical lens is thought of as a special example of the description of a spherical lens.

Next, the following describes the characteristics of the liquid crystal layer used in the present invention. The wavefront of an incoming linearly polarized light is modulated according to the characteristics of applied voltages versus effective birefringences such as the one shown in FIG. 5. In FIG. 5, the horizontal axis indicates the voltage V applied to the liquid crystal layer, and the vertical axis indicates the effective birefringence Δn. The shape of the electro-optic response curve depends on such factors as the elastic constant of the liquid crystal that is used, the dielectric anisotropy, and the pre-tilt angle determined by the alignment layer when no electric field is applied. In addition, because the refractive index and the birefringence of the liquid crystal layer depend on the wavelength, the electro-optic response curve also varies according to the wavelength of the light source.

The characteristics of applied voltages versus effective birefringences in FIG. 5 show theoretical curves obtained assuming that an He—Ne (Helium-Neon) laser with a wavelength near 633 nm is used as the light source, that the nematic liquid crystal material BL007 from Merck & Co. Inc. is used, and that Δnmax=0.287 and the liquid crystal layer thickness is 20 μm. The horizontal axis in FIG. 5 indicates the voltage V [Vrms] applied to the homogeneously aligned cells, and the vertical axis indicates the effective birefringence Δn of liquid crystal molecules.

When the liquid crystal optical modulator according to the present invention is used as a convex lens, it is desirable to use an area near the first quadratic curve area 520 that can be approximated by a quadratic curve. When the liquid crystal optical modulator is used as a concave lens, it is desirable to use an area near the second quadratic curve area 522. In this case, the desirable pre-tilt angle ranges from 0.5 degrees to 20 degrees.

As shown in FIG. 5, in an area where the voltage is lower than that for the first quadratic curve area 520 that is used for convex lens operation, that is, in an area near 0–1[Vrms], Δn is flat (first linear area 521) especially when the pre-tilt angle is small. Therefore, it is difficult to use the liquid crystal optical modulator as a spherical lens in this voltage range. However, as will be described later, the operation point can be shifted by applying a predetermined bias voltage and thus the liquid crystal optical modulator can be used as a spherical lens even if the pre-tilt angle is small.

Figure 15:
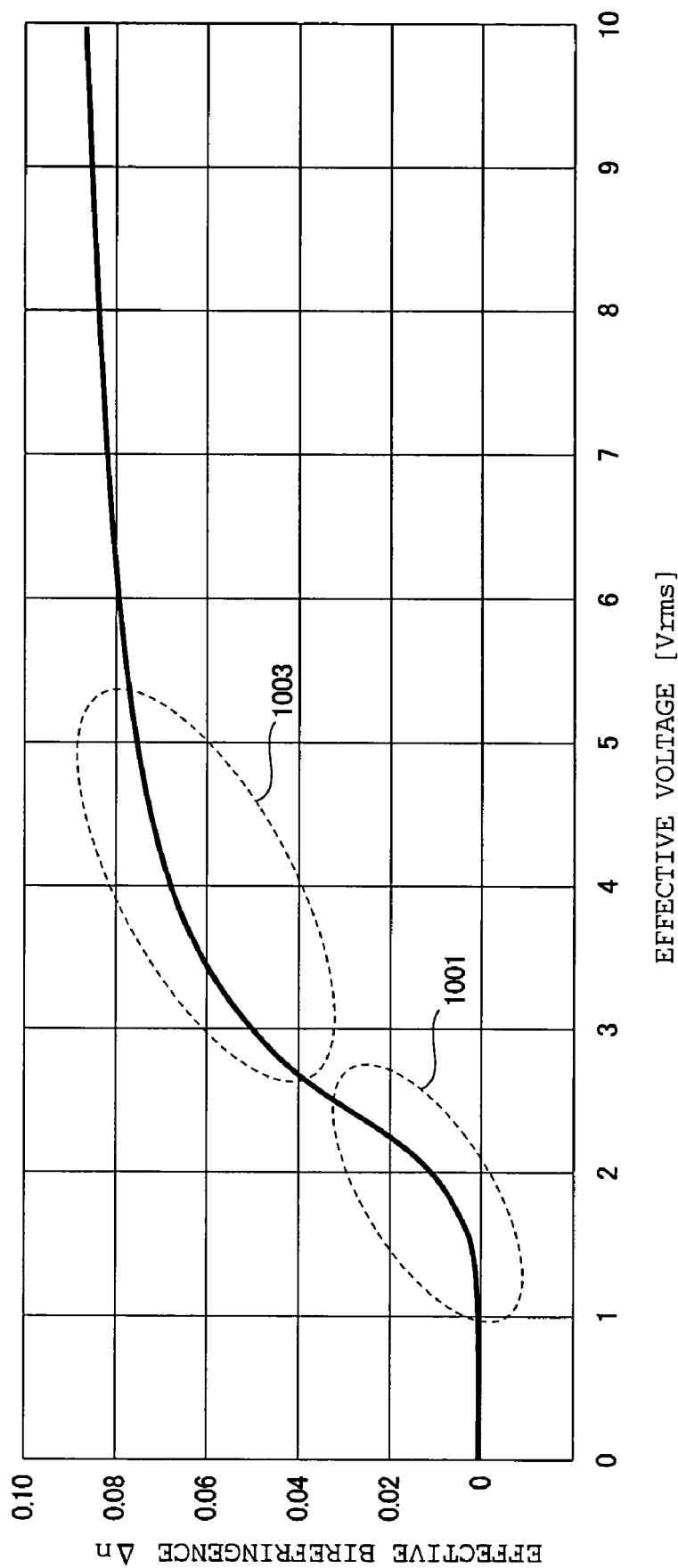
FIG. 15 is a graph showing an example of the characteristics of applied voltages versus effective birefringences for the homeotropic alignment.

Next, FIG. 15 shows an example of the characteristics of applied voltages versus effective birefringences when homeotropic alignment is used. When homeotropic alignment is used, it is necessary to select a liquid crystal material with negative dielectric anisotropy Δε. For homeotropic alignment, a first quadratic operation area 1001 occurs in the low voltage side, and a convex lens operation area 1003 occurs in the high-voltage side. Therefore, when homeotropic alignment is used instead of homogeneous alignment, the convex lens operation should be replaced with the concave lens operation, and the concave lens operation should be replaced with the convex lens operation, in the embodiments. Unless otherwise stated in the description below, homogeneous alignment is used as an example.

Next, the following describes the operation executed when the drive voltage is applied to the signal electrodes of the liquid crystal optical modulator according to the present invention that has a composite electrode composed of the stripe electrodes shown in FIG. 2.

Figure 16:
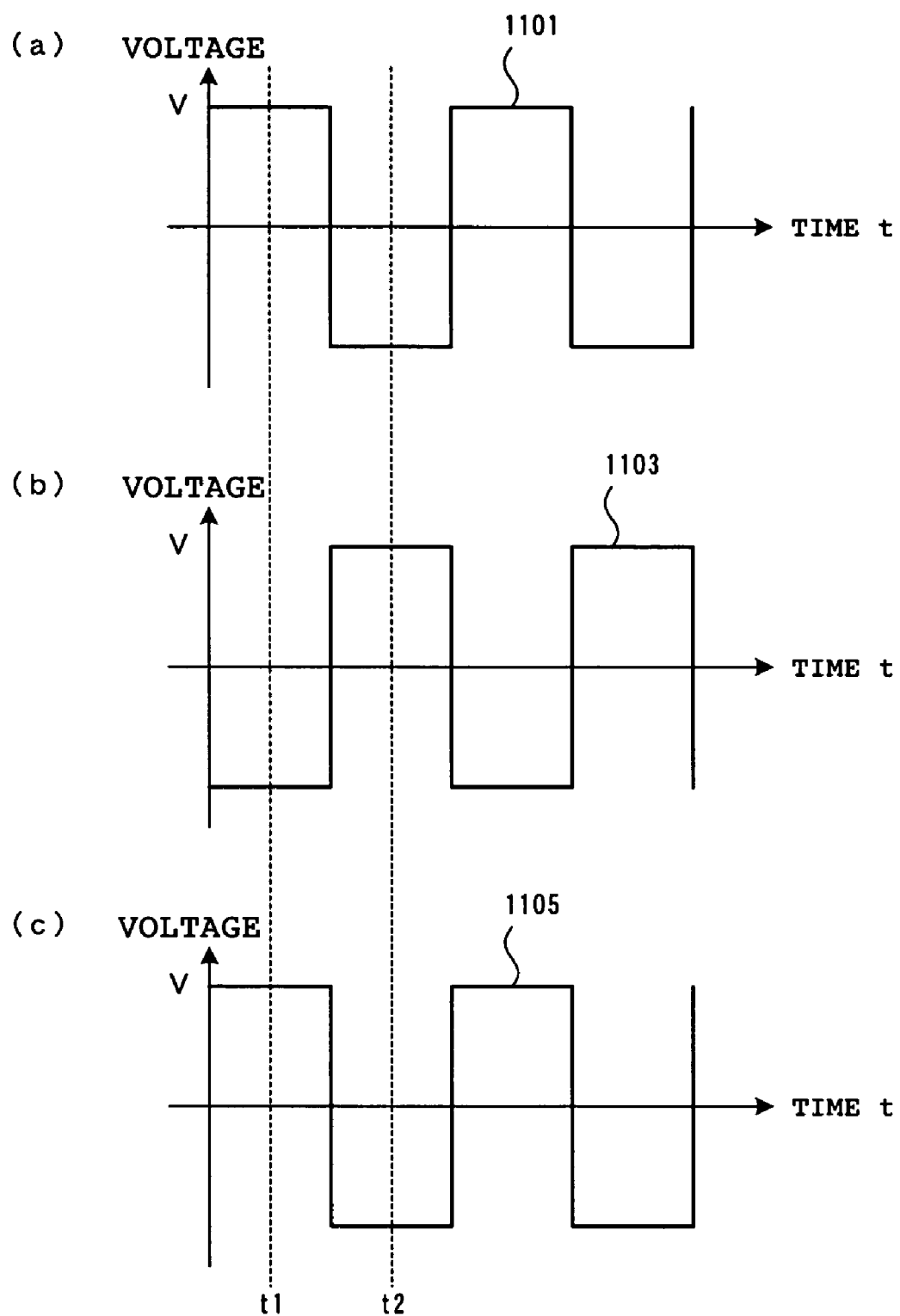
FIG. 16 is a diagram showing drive waveforms for the liquid crystal optical modulator of the present invention to perform the convex lens operation.

First, FIG. 16 shows the drive waveforms used during the convex lens operation. A drive waveform a 1101 is applied to the signal electrode a 211, and a drive waveform b 1103 is applied to a signal electrode b 213. The drive waveform a 1101 and the drive waveform b 1103 are equal in frequency and amplitude but 180 degrees out of phase. Similarly, a drive waveform c 1105 is applied to the signal electrode c 215. The drive waveform c 1105 and the drive waveform a 1101 are the same waveform. The opposed electrodes shown in FIG. 3 are at the same potential and 0[V] is applied.

In FIG. 16, the voltage of the drive waveform a 1101 and the drive waveform c 1105 is +V[V], and the voltage of the drive waveform b 1103 is −V[V], at the time t=t1. Therefore, because the potential is divided by the first gradient potential electrode 201 formed with a linear resistance material, the voltages applied to the signal electrode a 211 and the signal electrode b 213 are divided according to the positions and the potentials of the divided voltages appear at the stripe electrodes of the first cylindrical lens 251 formed in the active area 271.

The voltages applied to the signal electrode b 213 and the signal electrode c 215 are divided and the potentials of the divided voltages appear at the stripe electrodes of the second cylindrical lens 261. The potential is the same in the lengthwise direction of the stripe electrodes because the stripe electrodes are formed with a low-resistance material. Therefore, a plane-like gradient, where the voltage varies according to the arrangement direction of stripe electrodes, is formed in the active area 271 of the first cylindrical lens 251 and the second cylindrical lens 261.

Figure 17:
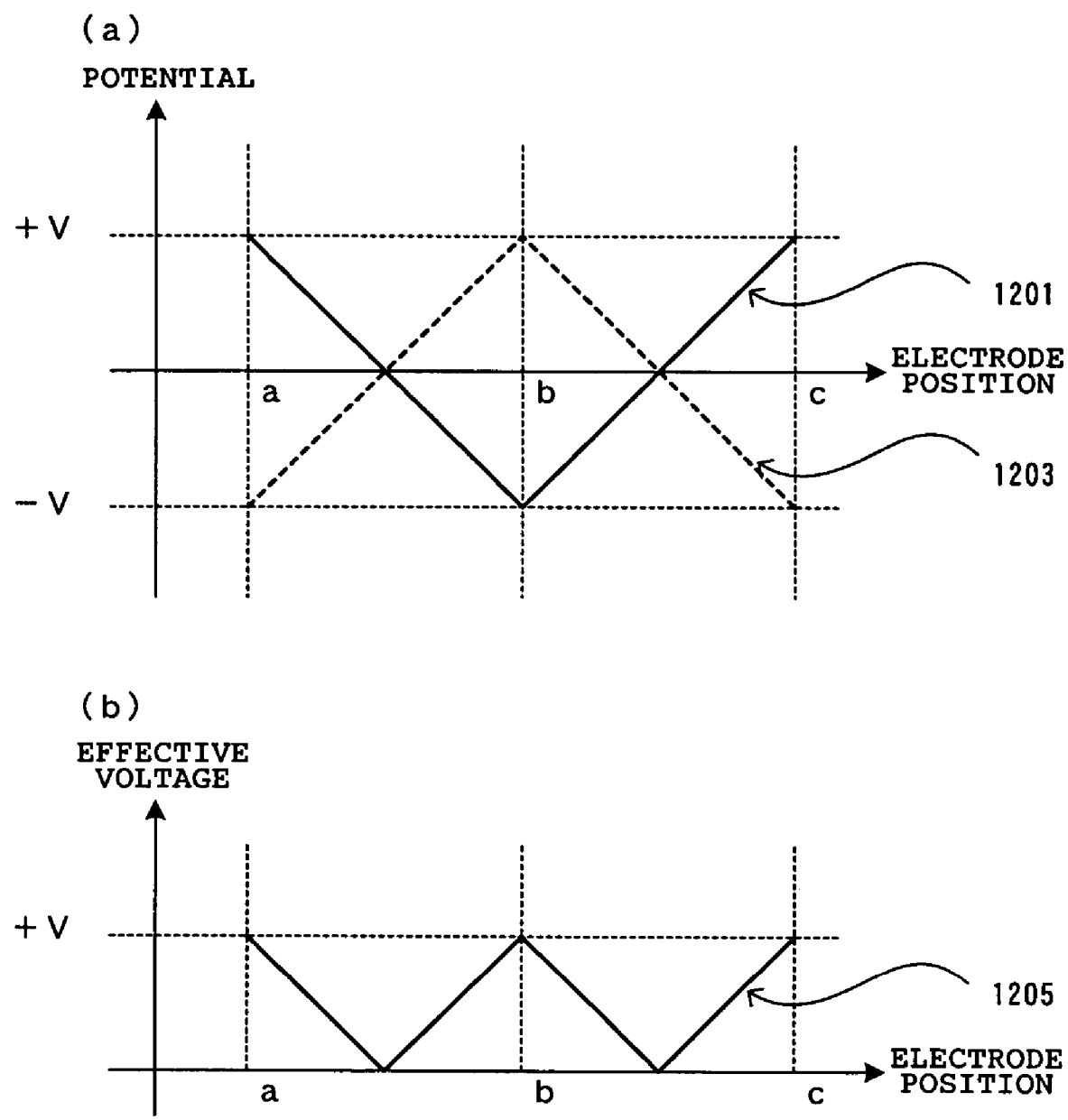
FIG. 17 is a diagram showing the electrode voltage distribution at electrode positions for the liquid crystal optical modulator of the present invention to perform the convex lens operation.

FIG. 17 shows the voltage distribution according to the electrode positions. By applying +V[V] and −V[V] to the signal electrodes at the both ends of the cylindrical lens as shown in FIG. 16, the linear potential distribution, indicated by a potential 1201 at t=t1, is generated at t=t1 in FIG. 16 as shown in FIG. 17. At t=t2 in FIG. 16, a potential distribution 1203 indicated by t=t2 in FIG. 17 is generated. Thus, if the drive waveform is a rectangular waveform at 50% duty ratio as shown in FIG. 16, the two potential distributions shown in FIG. 17 are repeated alternately, the voltage applied to the liquid crystal layer via the opposed electrode alternates at the positions of individual stripe electrodes, and therefore no dc components are added to the liquid crystal layer.

Because the nematic liquid crystal responses with an effective value, it is necessary to treat a potential, which is generated in the first gradient potential electrode 201 between the signal electrode a 211 and signal electrode c 215, as an effective value. This potential 1205 varies linearly, as shown in FIG. 17(b), by connecting the following voltage values: the voltage +V[V] applied to the signal electrode a 211, signal electrode b 213, and signal electrode c 215, and the voltage 0[V] applied to the midpoint between the signal electrode a 211 and the signal electrode b 213 and to the midpoint between the signal electrode b 213 and the signal electrode c 215.

Next, the effective birefringence distribution and the phase modulation amount of the nematic liquid crystal layer in the active area will be described with reference to FIG. 18 and FIG. 19.

Figure 18:
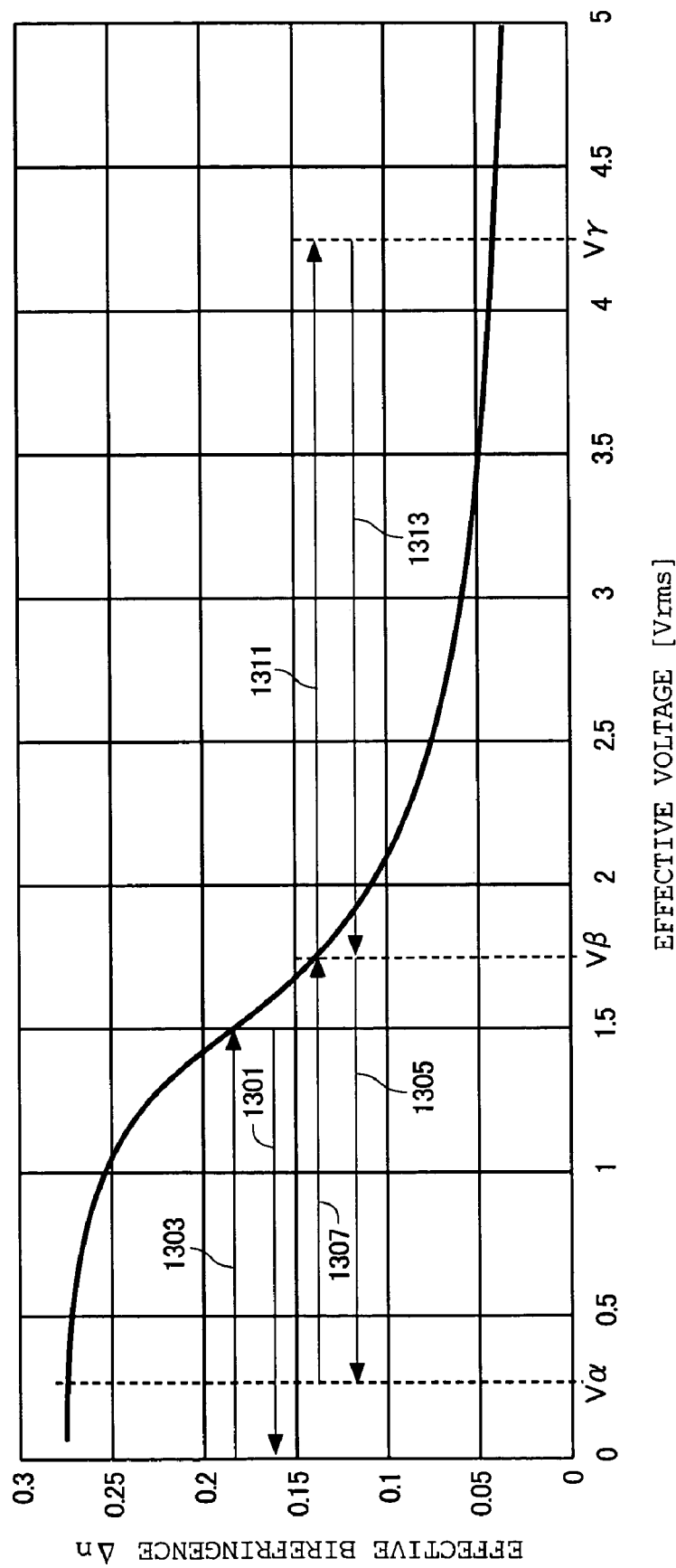
FIG. 18 is a diagram showing the distribution of effective birefringences of the nematic liquid crystal layer in an active area.

In the effective birefringence graph shown in FIG. 18, the horizontal axis indicates the effective voltage V applied to the liquid crystal layer and the vertical axis indicates the effective birefringence Δn. First, consider a case in which 0[V] is applied to the opposed electrodes 391, 393, and 395 shown in FIG. 3. For the first cylindrical lens 251 in FIG. 2, the effective voltage V[Vrms] is applied across the signal electrode a 211 and the first opposed electrode 391 as described above. The effective value becomes 0 at the midpoint between the signal electrode a 211 and the signal electrode b 213. For the interval from the signal electrode a 211 to the midpoint between the signal electrode a 211 and the signal electrode b 213, the voltage between the signal electrode and the opposed electrode 391 changes linearly and continuously from V[V] to 0[V]. Therefore, the effective voltage distribution becomes a distribution indicated by the numeral 1413 in FIG. 19(b), and the effective birefringence Δn changes in the direction indicated by the arrow in a first lens area 1301 in FIG. 18.

Next, for the interval from the midpoint between the signal electrode a 211 and the signal electrode b 213 to the signal electrode b 213, the effective voltage between the signal electrode and the opposed electrode 393 changes from 0[Vrms] to V[Vrms]. Therefore, the effective voltage distribution becomes a distribution indicated by the numeral 1415 in FIG. 19(b), and the effective birefringence Δn changes continuously in the direction of the arrow indicated by a second lens area 1303 in FIG. 18.

Similarly, for the part of the second cylindrical lens 261 shown in FIG. 2, the effective voltage V[Vrms] is applied between the signal electrode b 213 and the second opposed electrode 393. The effective value is 0[Vrms] at the midpoint between the signal electrode b 213 and the signal electrode c 215. For the interval from the signal electrode b 213 to the midpoint between the signal electrode b 213 and the signal electrode c 215, the voltage between the signal electrode and the opposed electrode 393 changes from V[Vrms] to 0[Vrms] linearly and continuously. Therefore, the effective birefringence Δn changes in the direction of the arrow indicated by the first lens area 1301 in FIG. 18.

Next, for the interval from the midpoint between the signal electrode b 213 and the signal electrode c 215 to the signal electrode c 215, the effective voltage between the signal electrode and the opposed electrode 395 changes from 0[Vrms] to V[Vrms]. Therefore, the effective birefringence Δn changes continuously in the direction of the arrow indicated by the second lens area 1303 in FIG. 18.

Figure 19:
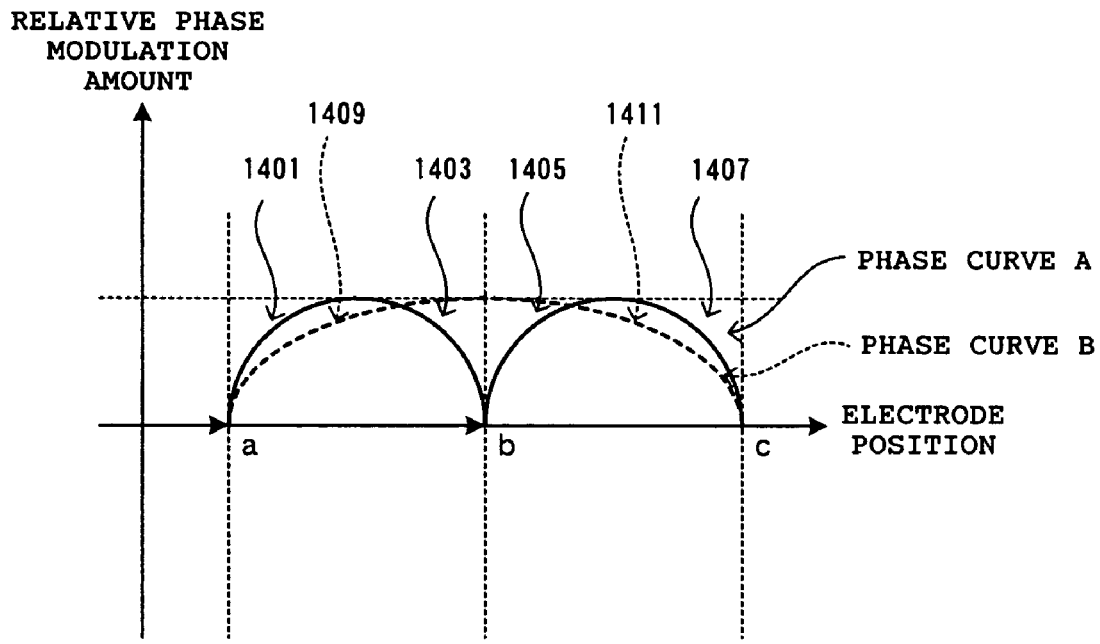
FIG. 19 is a diagram showing the phase modulation amount of the nematic liquid crystal layer in the active area.
Figure 19:
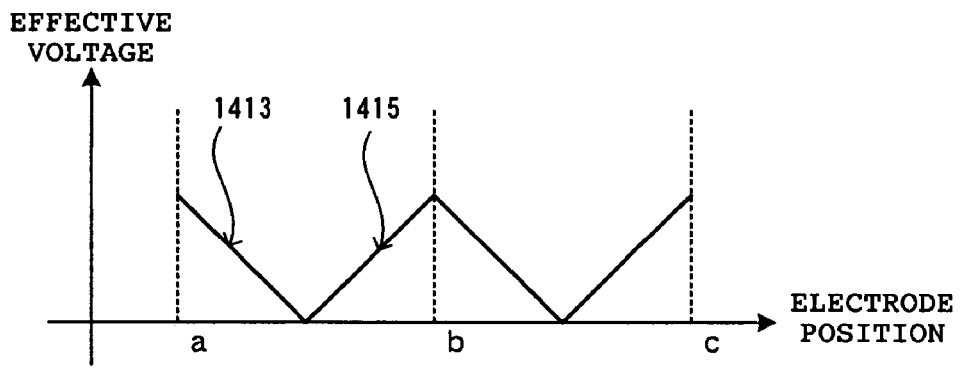
Figure 19:
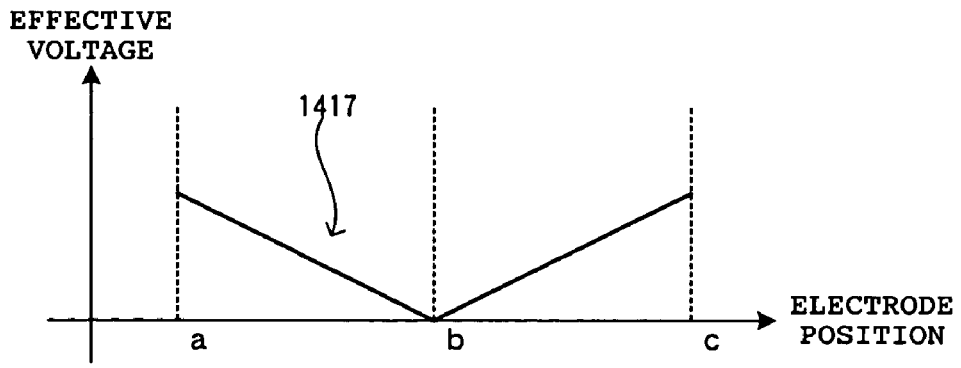

As a result, in the first cylindrical lens 251 and the second cylindrical lens 261 where the phase modulation amount is as indicated by phase curve A composed of phase curves 1401, 1403, 1405, and 1407 of the areas in FIG. 19, the liquid crystal optical modulator functions as a cylindrical lens whose refractive index changes in one dimension. In FIG. 19, the horizontal axis indicates the electrode positions in the direction of the first gradient potential electrode 201 shown in FIG. 2, and the vertical axis indicates the relative phase modulation amount of the liquid crystal at each electrode position. The relative phase modulation amount corresponds to the relative birefringence Δn multiplied by the liquid crystal layer thickness d.

As described above, a curvature change in the refractive index distribution of the liquid crystal can be made by changing the amplitude V of the drive waveform, and the focal length can be changed by changing the refractive index distribution of the liquid crystal.

Now, consider a case in which the drive waveform a 1101 in FIG. 16 is applied to the signal electrode a 211 and in which the drive waveform b 1103 in FIG. 16 is applied to the signal electrode c 215 while keeping the signal electrode b 213 in the high impedance state. Applying those drive waveforms causes an effective voltage 1417 in FIG. 19(c) to be applied. In this case, as shown in FIG. 19, the relative phase modulation amount distribution is as indicated by phase curve B (indicated by broken line) composed of a phase curve 1409 (indicated by broken line) of the area between the signal electrode a 211 and the signal electrode b 213 and a phase curve 1411 (indicated by broken line) of the area between the signal electrode b 213 and the signal electrode c 215. Comparison between phase curve A and phase curve B indicates that the lens diameter of phase curve B is two times larger than that of phase curve A.

Therefore, for the liquid crystal optical modulator according to the present invention that forms a cylindrical lens, the lens diameter can be easily changed simply by changing the drive waveform application point even when the same pattern is used.

Next, a drive method for shifting the operation point in the characteristics of applied voltages versus effective birefringences will be described.

In the characteristics of applied voltages versus effective birefringences shown in FIG. 5, the convex lens operation can be performed by setting the operation point in the first quadratic curve approximation area 520 indicating the upwardly convex characteristics, and the concave lens operation can be performed by setting the operation point in the second quadratic curve approximation area 522 indicating the downwardly convex characteristics, as described above. The lens operation cannot be performed when the operation point is set in the first linear area 521 indicating the linear characteristics.

For a liquid crystal layer of a low pre-tilt angle, a drive method in which the first linear area 521 is wide and the application voltage of 0 is the operation point, the refractive index is skewed by the first linear area 521. In such a case, the skew in the refractive index can be prevented by moving the operation point to an area not affected by the first linear area 521.

The following describes operation point shifting in a low pre-tilt-angle liquid crystal layer and operation point shifting for a concave lens using the second quadratic curve area.

Figure 20:
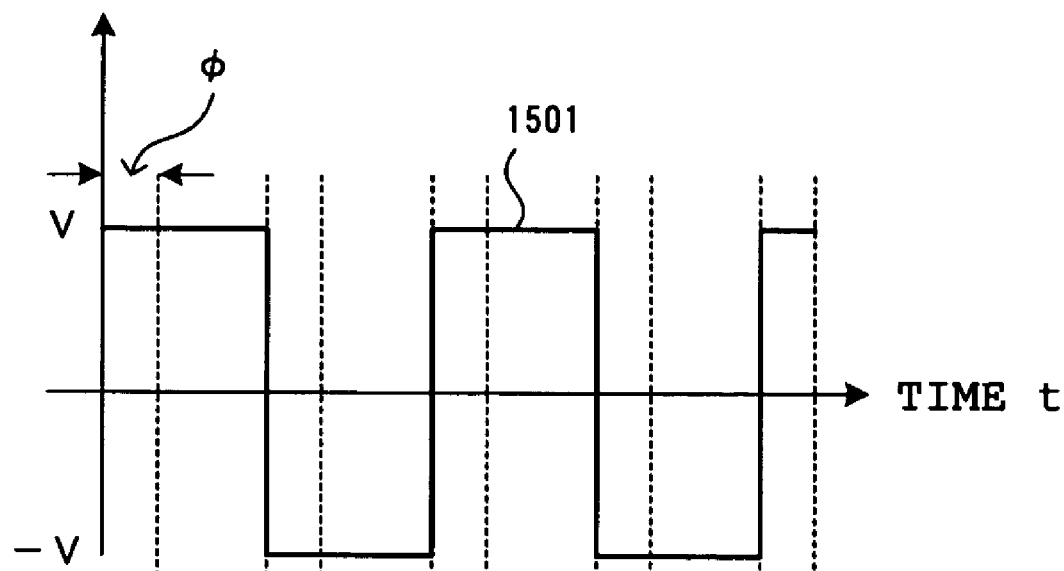
FIG. 20 is a diagram showing drive waveforms when the operation point is moved for the lens operation of the liquid crystal optical modulator of the present invention.
Figure 20:
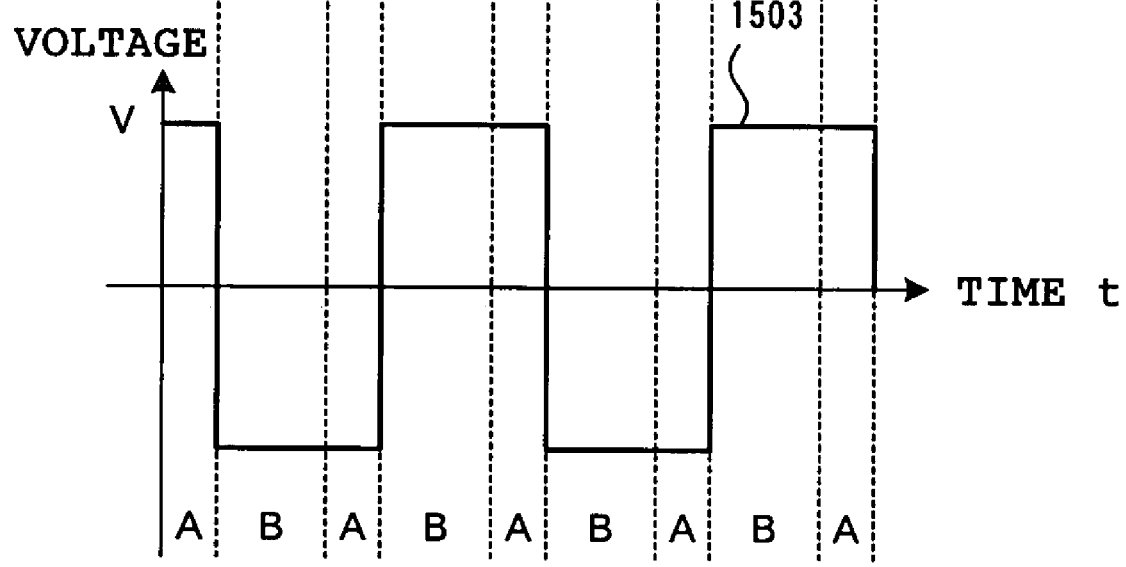

First, operation point shifting in a low pre-tilt-angle liquid crystal layer will be described. In the description below, the first cylindrical lens 251 in FIG. 2 is used. A drive waveform d 1501 shown in FIG. 20 is applied to the signal electrode a 211, and a drive waveform e 1503 with an amplitude and a frequency equal to those of the drive waveform d 1501, but 180+φ degrees out of phase with the drive waveform d 1501, is applied to the signal electrode b 213. In FIG. 20, the in-phase voltage ±V[V] is applied to the signal electrode a 211 and the signal electrode b 213 in period A but a reversed phase voltage is applied to the signal electrode a 211 and the signal electrode b 213 in period B. Therefore, as shown in the potential distribution in period A shown in FIG. 21(*a*), the potential distribution in period A in any electrode position from the signal electrode a 211 to the signal electrode b 213 is either a positive potential distribution 1601 or a negative potential distribution 1603 with no gradient voltage generated in the first gradient potential electrode 201. On the other hand, a constant voltage is applied in period A between the first and second opposed electrodes 391 and 393 and the composite electrode of the first cylindrical lens 251.

As shown in the potential distribution in period B shown in 21(*b*), a gradient potential indicated by a first gradient potential 1605 or a second gradient potential 1607 is generated in the first gradient potential electrode 201 between the signal electrode a 211 and the signal electrode b 213 in period B.

Because period A is provided for the liquid crystal optical modulator according to the present invention to allow an in-phase voltage to be applied to predetermined signal electrodes during that period, an ac bias voltage can be applied to the liquid crystal layer. Therefore, the ac bias voltage can be controlled in period A and the gradient voltage for the lens operation can be controlled independently in period B. Because an alternating electric field is established by the voltages applied in periods A and B for one period of the drive waveform d 1501, no dc components are continuously applied to the liquid crystal layer.

Figure 22:
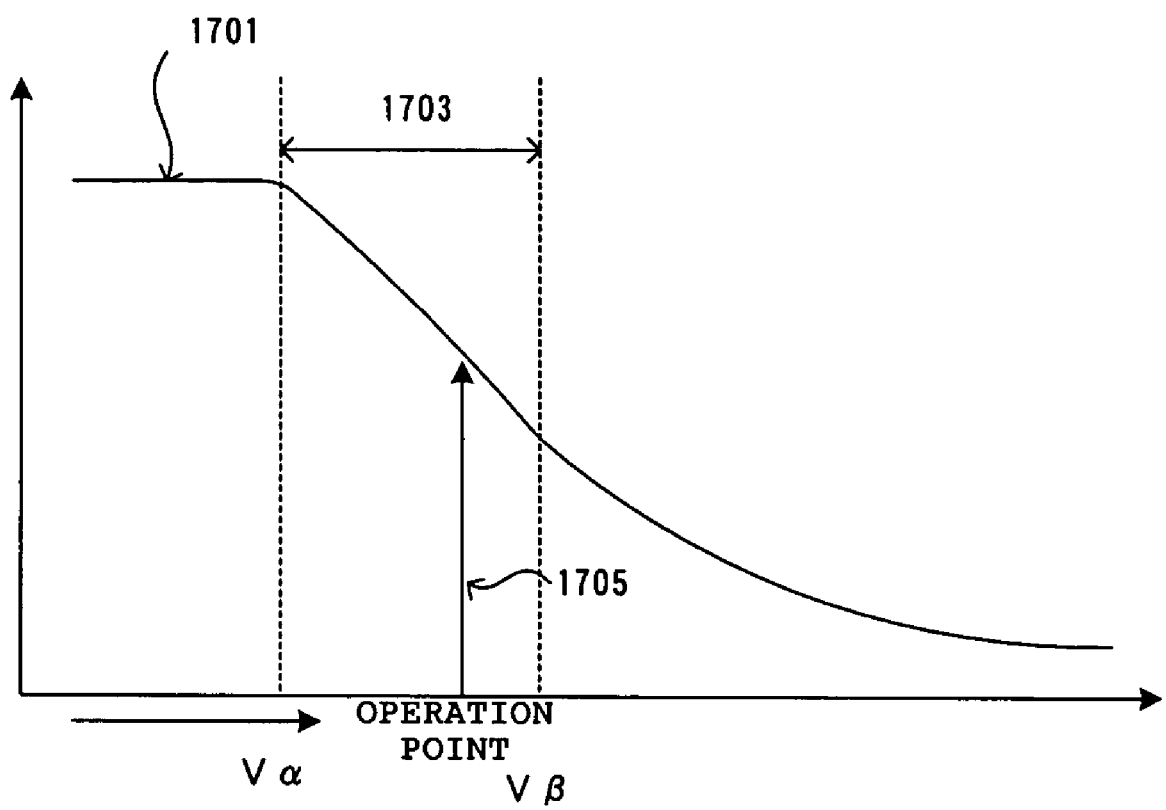
FIG. 22 is a diagram showing operation point shifting in the liquid crystal optical modulator of the present invention.

As described above, the ac bias voltage applied in period A can be set to a predetermined value. Therefore, for a low pre-tilt-angle liquid crystal layer having a wide first linear area, the operation point can be shifted to the curve operation area for lens operation as shown in FIG. 22.

Next, operation point shifting in a low pre-tilt-angle liquid crystal layer will be described in detail with reference to the effective birefringence Δn characteristics in FIG. 18.

Figure 21:
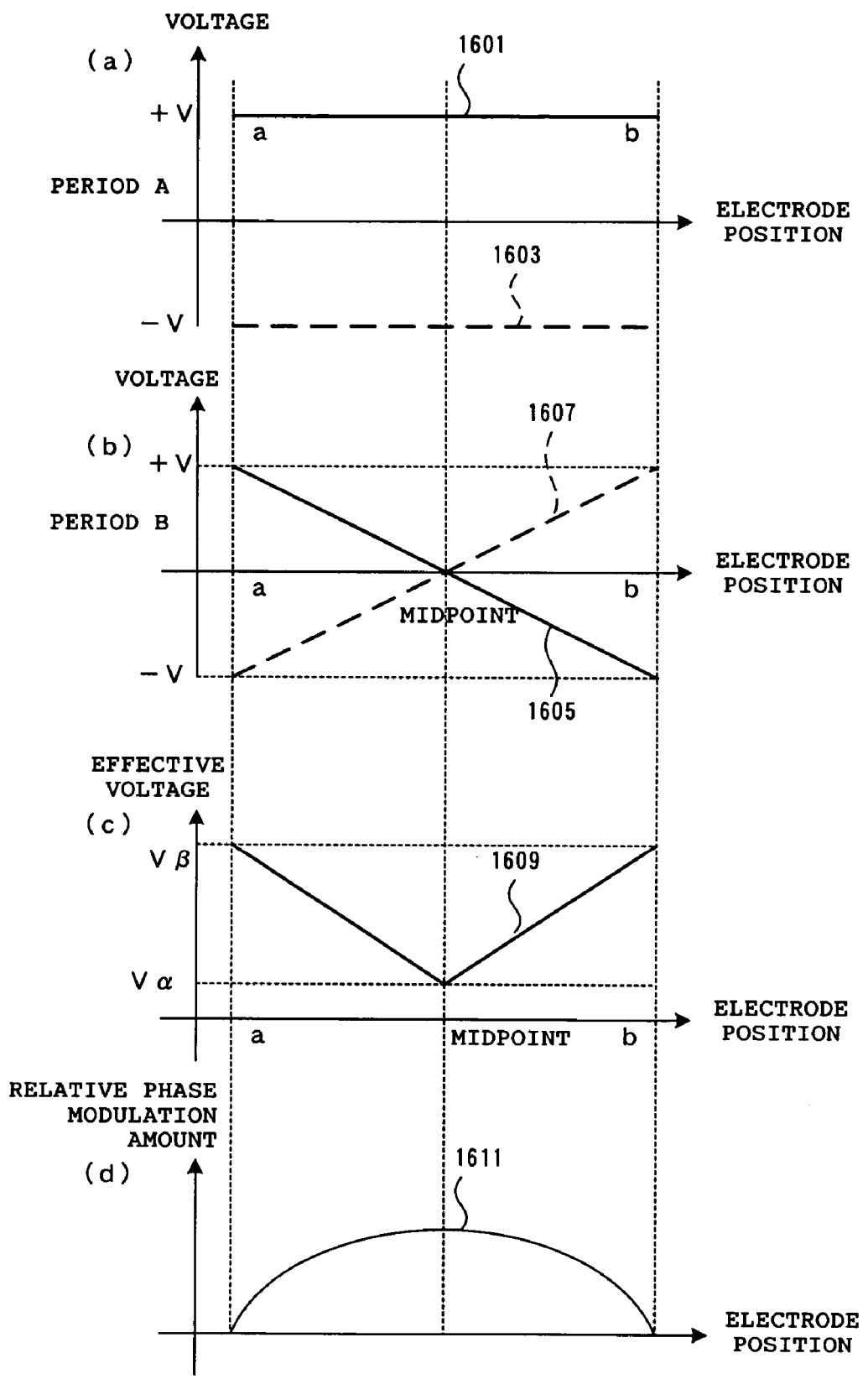
FIG. 21 is a diagram showing the voltage distribution at electrode positions when the operation point is moved for the lens operation of the liquid crystal optical modulator of the present invention.

The drive waveforms d and e, which are out of phase to one another as in FIG. 20, are applied to the signal electrodes a and b to form the voltage distribution shown in FIG. 21(*a*) in period A and to form the voltage distribution shown in FIG. 21(*b*) in period B. The effective voltage shown in FIG. 21(*c*) is applied to the liquid crystal layer according to this voltage distribution. In FIG. 21(*c*), the vertical axis indicates the effective voltage of the signal applied to the liquid crystal layer in period A and period B, and the horizontal axis indicates the electrode positions in the lengthwise direction of the gradient potential electrode.

The effective voltage created by combining period A and period B shown in FIG. 21(*c*) is the effective value of Vα[Vrms] at the midpoint between the signal electrode a 211 and the signal electrode b 213, and the effective value of Vβ[Vrms] at the both ends, that is, at the signal electrode a 211 and the signal electrode b 213. Vα and Vβ are determined by the voltage in period A and the duty ratio between period A and period B. This duty ratio may be determined by the phase shift φ.

The following describes operation point shifting according to this voltage distribution by referring to the effective birefringence distribution of the nematic liquid crystal layer in the liquid crystal lens active area shown in FIG. 18. Suppose that the maximum effective value of the voltage distribution 1609 at this time is Vβ[Vrms].

First, consider that 0[V] is applied to the first to third opposed electrodes 391, 393, and 395 shown in FIG. 3.

For the first cylindrical lens 251 in FIG. 2, the effective voltage Vβ[Vrms] is applied between the signal electrode a 211 and the opposed electrode 391 as described above. The effective value of the voltage is Vα[Vrms] at the midpoint between the signal electrode a 211 and the signal electrode b 213. For the interval from the signal electrode a 211 to the midpoint between the signal electrode a 211 and the signal electrode b 213, the voltage between the signal electrode and the opposed electrode 391 is changed linearly and continuously from Vβ[Vrms] to Vα[Vrms] by the gradient potential electrode made of a linear resistance material. Therefore, the effective birefringence Δn can be changed in the direction indicated by the arrow in a first shift lens area 1305 in FIG. 18.

Next, for the interval from the midpoint between the signal electrode a 211 and the signal electrode b 213 to the signal electrode b 213, the effective voltage between the signal electrode and the opposed electrode 393 is changed from Vα[Vrms] to Vβ[Vrms]. Therefore, the effective birefringence Δn is changed continuously in the direction of the arrow indicated in a second shift lens area 1307 in FIG. 18.

FIG. 21(*d*) shows the distribution of a relative phase modulation amount 1611 of the electrode positions that is set by the effective voltages Vα[Vrms] and Vβ[Vrms]. When no ac bias is applied, the operation is performed in a range including an operation range 1701 between 0 and Vα as shown in FIG. 22. Because this range includes the first linear area and the first curve area, a skew occurs in the refractive index and the convex lens function cannot be performed.

On the other hand, because the operation is performed in an operation range 1703 between Vα and Vβ as shown in FIG. 22 when an ac bias is applied, the operation can be performed in the range of the second curve area and the convex lens operation can be performed.

As described above, the lens are a ranges from 0[Vrms] to Vα[Vrms] when an ac bias voltage is not applied while the lens area ranges from Vα[Vrms] to Vβ[Vrms] when an ac voltage is applied and the convex lens operation can be performed. The voltage values Vα[Vrms] and Vβ[Vrms] can be determined by the ac bias voltage applied in period A and the duty ratio between period A and period B.

Figure 23:
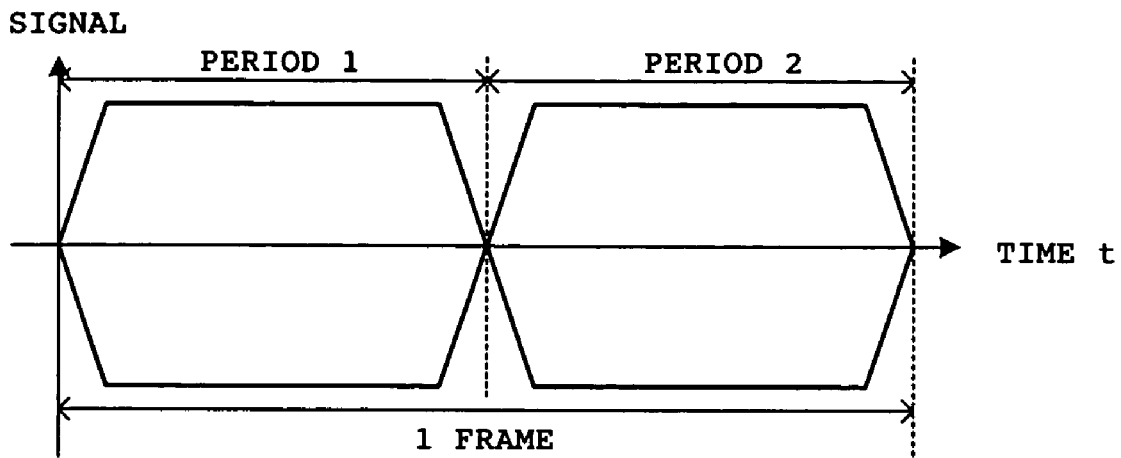
FIG. 23 is a diagram showing drive waveforms used in another drive method of the present invention.
Figure 23:
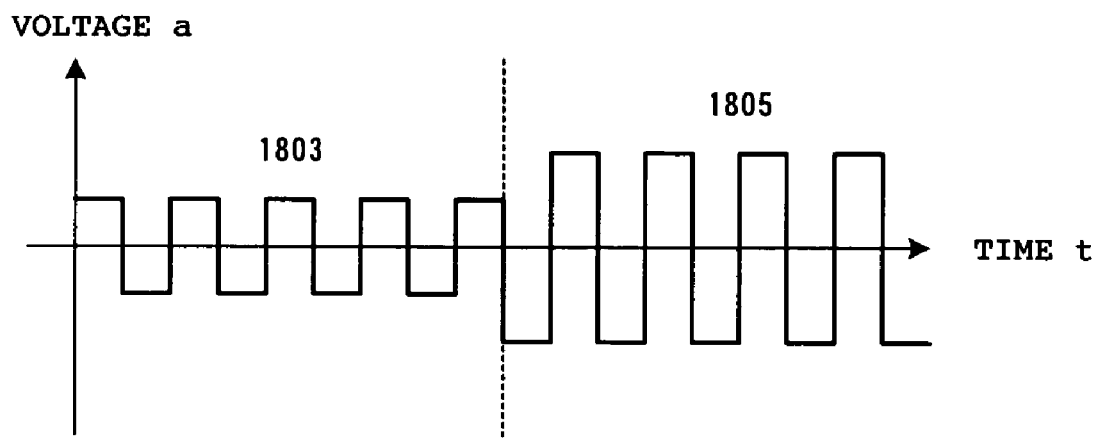
Figure 23:
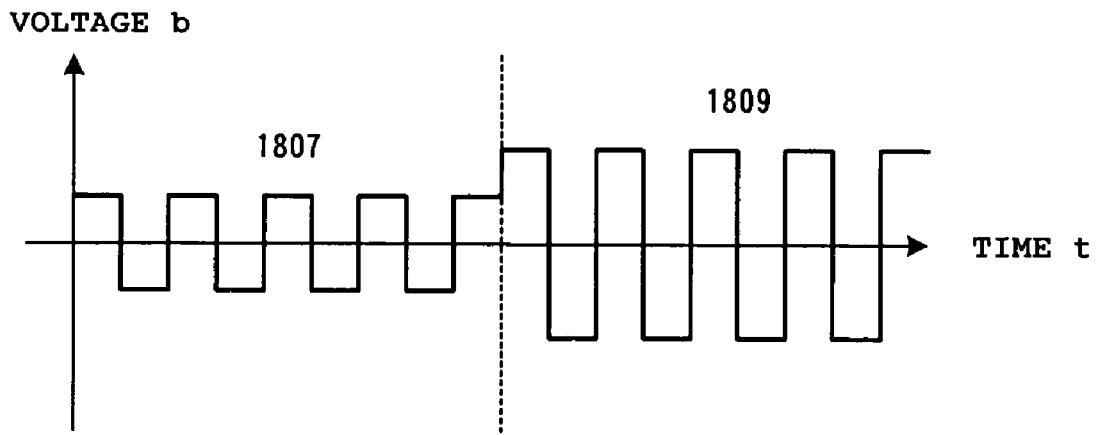

Another drive method according to the present invention is that the signals are applied to the liquid crystal optical modulator with the drive signal divided into frames each composed of period 1 and period 2 as shown in FIG. 23. In this case, the in-phase signal voltages are applied to the signal electrode a 211 and the signal electrode b 213 in period 1 to shift the operation point at the low-voltage application time and, in period 2, reversed phase voltages are applied to signal electrode a 211 and the signal electrode b 213 to perform the lens operation. The drive signals applied in period 1 and period 2 are alternating voltages so that the average of the applied voltages becomes 0 to prevent degradation in the liquid crystal layer. The following describes this drive method for the convex lens.

By using the drive method like this, the liquid crystal potential distribution, which is generated for the first cylindrical lens 251 in FIG. 2, is set equal to a value close to the sum of the effective values of the periods of one frame composed of period 1 and period 2.

The waveform applied in period 1 and period 2 may be any waveform as long as the operation point can be adjusted to a predetermined value: for example, two rectangular waveforms at different voltage levels may be applied. For example, in period 1 in which a bias voltage for operation point shifting is applied, a voltage a 1803 (FIG. 23(b)) is applied to the signal electrode a 211 and a in-phase voltage b 1807 (FIG. 23(c)) is applied to the signal electrode b 213. In period 2 in which a gradient potential is added, a voltage a 1805 (FIG. 23(b)) is applied to the signal electrode a 211 and a reversed phase voltage b 1809 (FIG. 23(c)) is applied to the signal electrode b 213. In this case, the liquid crystal distribution takes a value close to the sum of an effective voltage 1811 in period 1 and an effective voltage 1813 in period 2. It is also possible to use a waveform whose effective value is controlled through pulse width modulation.

Next, using the first cylindrical lens 251 as an example, the following describes the concave lens operation performed by applying the drive voltage to the signal electrodes of the liquid crystal optical modulator according to the present invention that has the composite electrode shown in FIG. 2.

As shown in FIG. 23, the drive signal is composed of frames each composed of period 1 that is the bias drive period in which the operation bias point of period is determined and period 2 that is the drive period in which the concave lens operation is executed. For brevity, period 1 and period 2 are assumed to have an equal duration in the description below.

Figure 24:
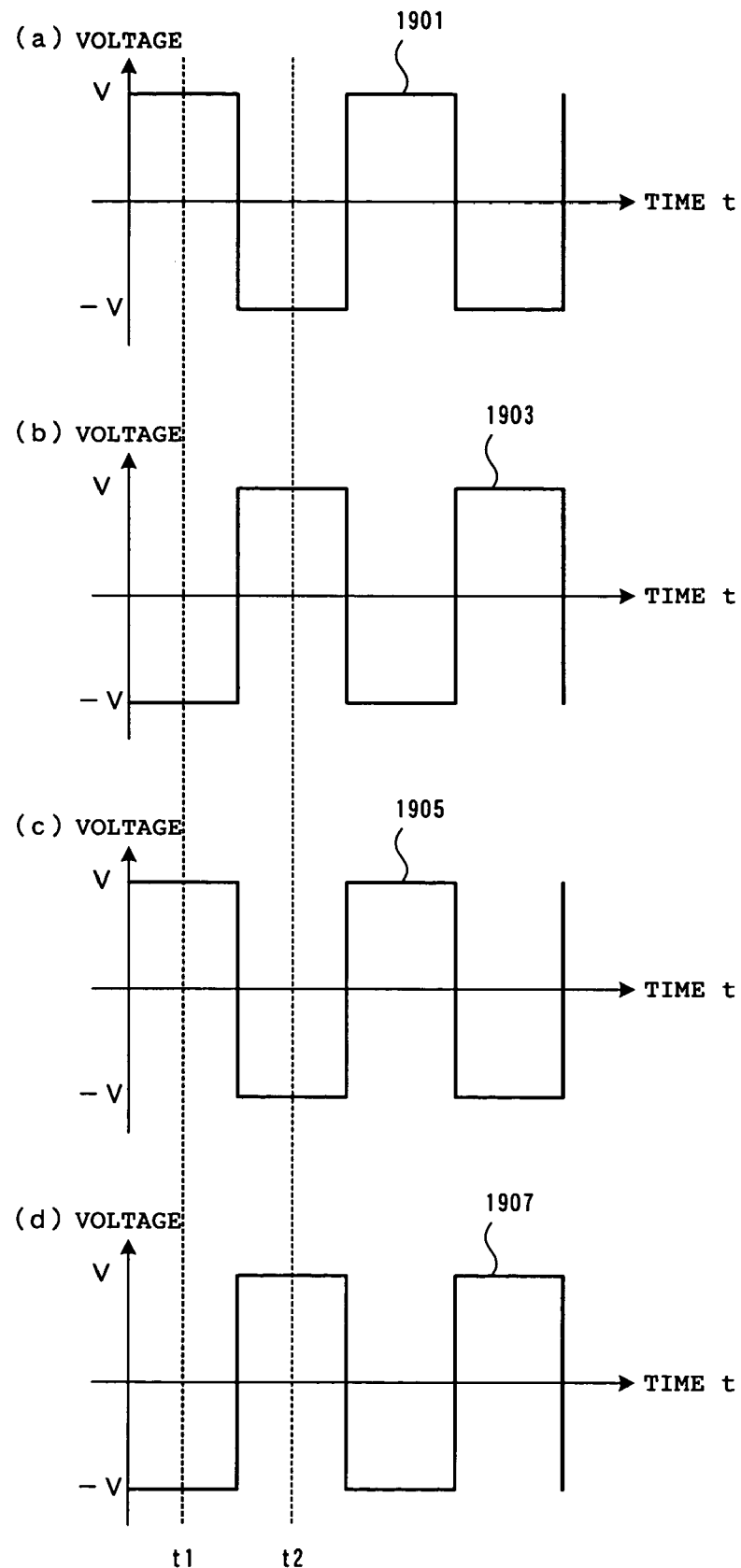
FIG. 24 is a diagram showing drive waveforms in a drive period for performing the concave lens operation of the liquid crystal optical modulator of the present invention.

Next, with reference of FIG. 23 and FIG. 24, the drive waveform in the drive period, in which the concave lens operation is executed, will be described. A drive waveform 1901 shown in FIG. 24 is applied to the signal electrode a 211, and a drive waveform 1903 is applied to the signal electrode b 213. The drive waveform 1901 and the drive waveform 1903 are equal in frequency and amplitude but 180 degrees out of phase. Similarly, an opposed drive waveform 1905 is applied to the first opposed signal electrode 381, and an opposed drive waveform 1907 is applied to the second opposed signal electrode 383. The drive waveform 1901 and the opposed drive waveform 1905 are the same waveform, and the drive waveform 1903 and the opposed drive waveform 1907 are the same waveform.

FIG. 24 shows the drive waveforms in period 2 shown in FIG. 23. At time t=t1, the drive waveform 1901 is +V[V] and the drive waveform 1903 is −V[V]. Therefore, because the potential is divided by the first gradient potential electrode 201 made of a linear resistance material, the voltages applied to the signal electrode a 211 and signal electrode b 213 are divided and are applied to the stripe electrodes of the first cylindrical lens 251, formed in the active area 271, according to their positions. Because the stripe electrodes are formed with a low resistance material, the stripe electrodes have the same potential in their lengthwise direction. For the stripe electrodes with a potential gradient in the lengthwise direction, the potentials may be set equal by constructing the stripe electrodes in the configuration shown in FIG. 4.

Figure 25:
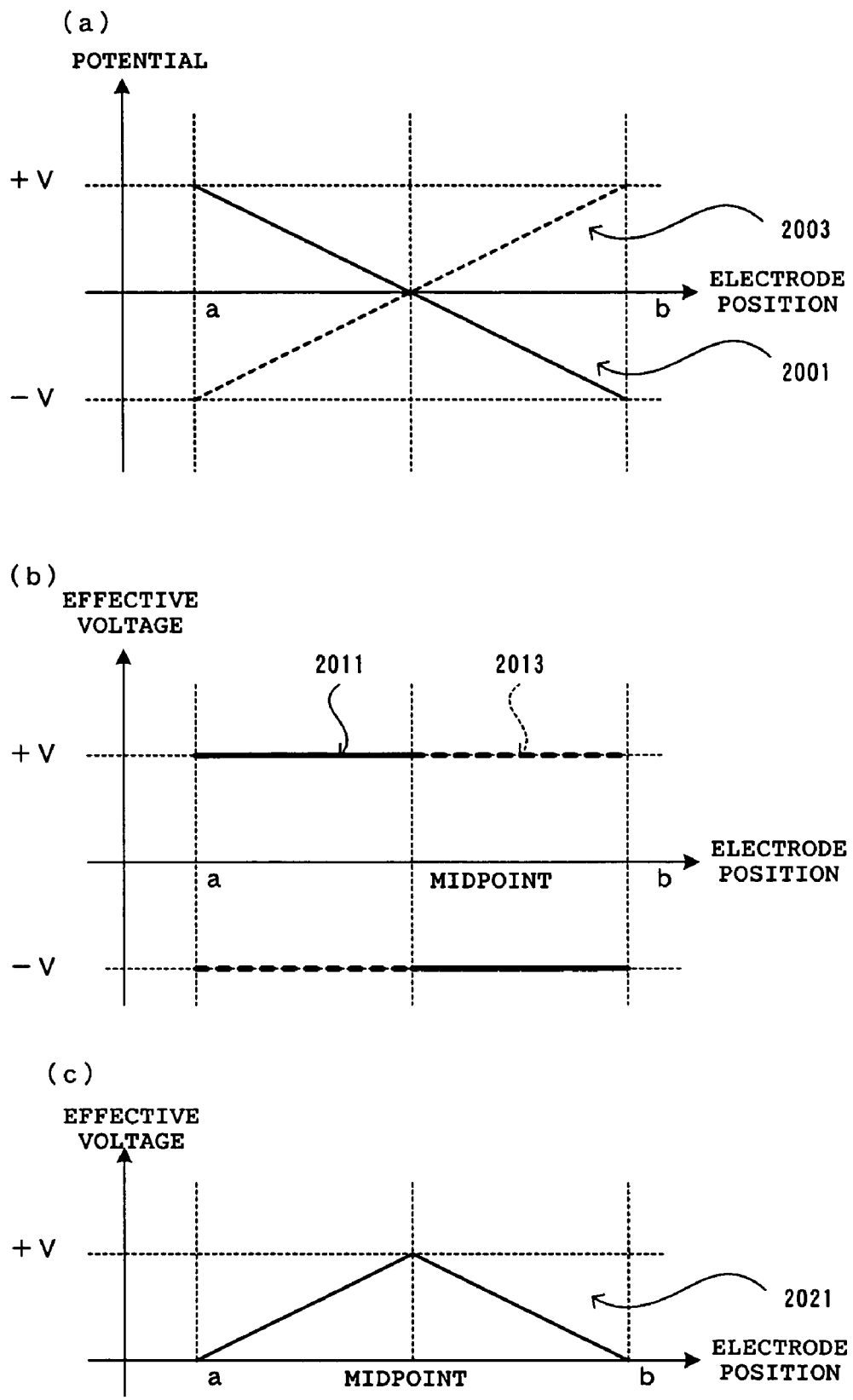
FIG. 25 is a diagram showing the voltage distribution at electrode positions for the liquid crystal optical modulator of the present invention to perform the concave lens operation.

By applying the drive waveforms described above to the signal electrodes, the potentials of the stripe electrodes in the composite electrode side at t=t1 form the linear potential distribution (t=t1) indicated by a potential 2001, as shown in FIG. 25(a), according to the electrode positions in the direction of the gradient potential electrode in the composite electrode 111. Also, as shown in FIG. 25(a), the potentials at t=t2 form the potential distribution (t=t2) indicated by a potential 2003.

When the rectangular waveforms at 50% duty ratio shown in FIG. 24 are applied to the signal electrodes, the potential distribution in the electrode positions in the direction of the gradient potential electrode in the composite electrode alternates repeatedly between the two potential distributions shown in FIG. 25(a).

In the opposed electrode side, because the potential of the first opposed electrode 391 connected to the first opposed signal electrode 381 is at the same potential level on the opposed electrode 391 as shown in FIG. 25(b) at t=t1 shown in FIG. 24, the opposed potential at t=t1 forms the linear potential distribution indicated by 2011. The potential of the second opposed electrode 393 connected to the second opposed signal electrode 383 at t=t2 shown in FIG. 24 forms the potential distribution indicated by 2013. Therefore, for the rectangular waveforms at 50% duty ratio shown in FIG. 24, the potential on the opposed electrode repeats the two potential distributions shown in FIG. 25(b). In this way, the voltage applied to the liquid crystal layer via the opposed electrode is an alternating voltage at any stripe electrode with no DC components added to the liquid crystal layer.

Next, FIG. 25(c) shows an effective voltage waveform 2021 applied to the liquid crystal layer. The figure shows that, because the response of a nematic liquid crystal responses with an effective value, the potential generated in the first gradient potential electrode 201 between the signal electrode a 211 and the signal electrode c 215 changes linearly in such a way that the effective value is 0[Vrms] at the signal electrode a 211 and the signal electrode b 213 and V[Vrms] at the midpoint between the signal electrode a 211 and the signal electrode b 213. In addition, if the drive waveform is applied, in period 1 in FIG. 23, to the liquid crystal layer of the whole of the first cylindrical lens 251 in FIG. 2 so that effective voltage V=V'β[Vrms], then $((O^2+V'^2\beta^2)/2)^{1/2}=0+V'\beta/2^{1/2} \rightarrow V\beta[Vrms]$ is applied, in one frame in FIG. 23, to the liquid crystal layer on the side adjacent to the signal electrode a 211 and the signal electrode b 213 of the first cylindrical lens 251, and the effective voltage of $((V^2+V'^2\beta^2)/2)^{1/2}[Vrms]$ is applied, in one frame, to the liquid crystal layer on the side adjacent to the midpoint between the signal electrode a 211 and the signal electrode b 213. Here, $((V^2+V'^2\beta^2)/2)^{1/2}$ is replaced by Vγ in the description below. V is the effective voltage value of the drive voltage.

Next, the distribution of the effective birefringences of the nematic liquid crystal layer in the active area 271 in FIG. 2 will be described with reference to FIG. 18. For the first cylindrical lens 251 in FIG. 2, the effective voltage of Vβ[Vrms] is applied across the signal electrodes a 211 and b 213 and the opposed electrode 391 in one frame shown in FIG. 23 as described above. The effective voltage is Vγ[Vrms] at the midpoint between the signal electrode a 211 and the signal electrode b 213. Because the voltage between the signal electrodes and the opposed electrode 391 changes from Vβ[Vrms] to Vγ[Vrms] almost linearly and continuously in the interval from the signal electrode a 211 to the midpoint between the signal electrode a 211 and the signal electrode b 213, the effective birefringence Δn changes in the direction indicated by the arrow in a first concave lens area 1311 in FIG. 18.

Next, because the effective voltage across the signal electrodes and the opposed electrode 393 changes from Vγ[Vrms] to Vβ[Vrms] in the interval from the midpoint between the signal electrode a 211 and the signal electrode b 213 to the signal electrode b 213, the effective birefringence Δn changes continuously in the direction of the arrow indicated in a second concave lens area 1313 in FIG. 13.

Figure 26:
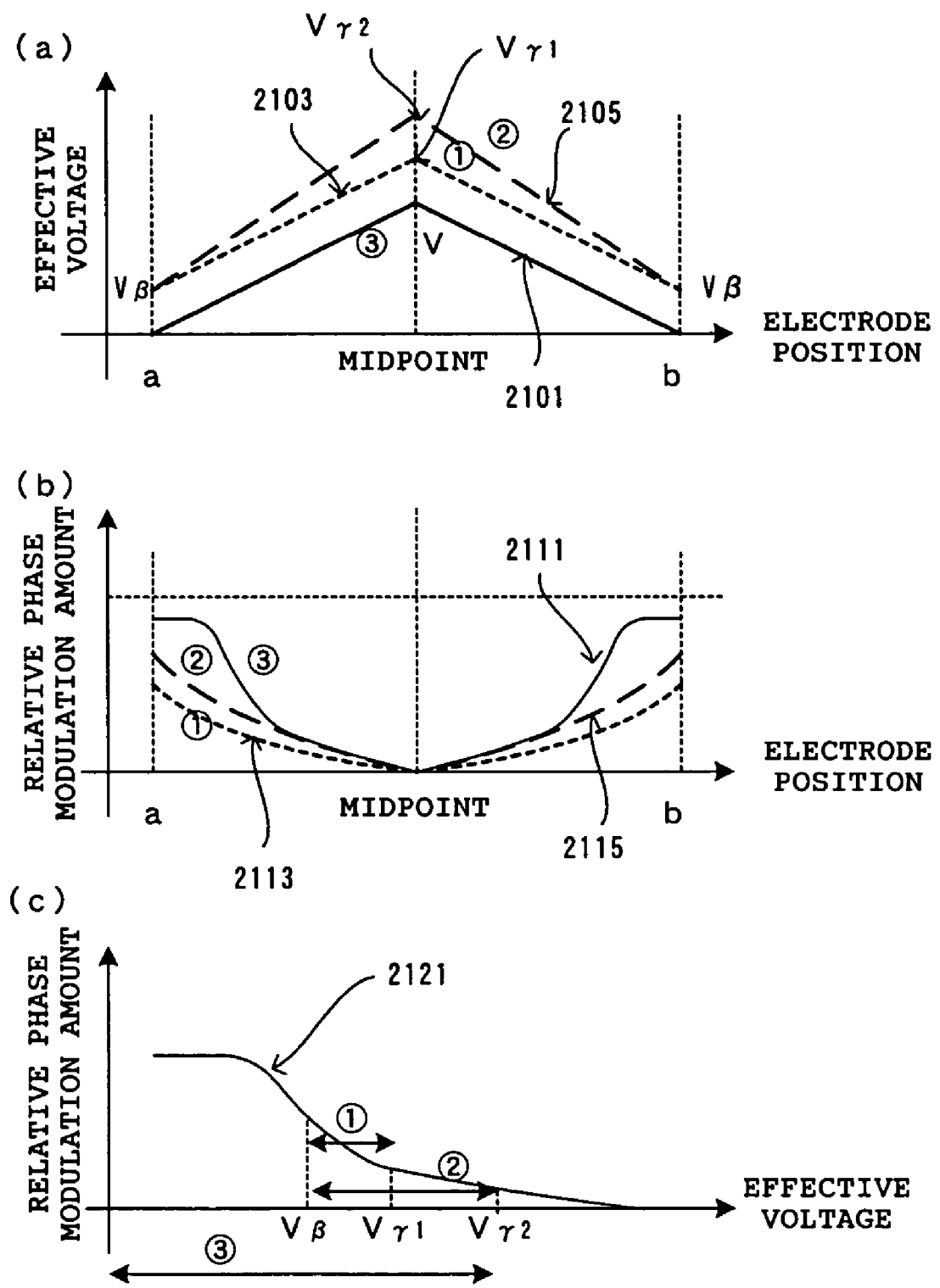
FIG. 26 is a diagram showing how the focal length is changed during the concave lens operation of the liquid crystal optical modulator of the present invention.

As a result, the phase modulation amount in the first cylindrical lens 251 is as indicated by a phase curve 2103 or 2105 in FIG. 26(a) and the liquid crystal optical modulator functions as a cylindrical concave lens whose refractive index changes in one dimension. In FIG. 26(b), the horizontal axis indicates the lengthwise electrode positions of the gradient potential electrode in FIG. 2, and the vertical axis indicates the relative phase modulation amount of the liquid crystal at the electrode positions. This relative phase modulation amount corresponds to the relative birefringence Δn multiplied by the liquid crystal layer thickness d. The relative phase modulation amount between the signal electrode a 211 and the signal electrode b 213 is reduced at the midpoint, indicating that the liquid crystal optical modulator functions a concave lens.

Note that the refractive index of a concave lens area and the focal length of a concave lens can be changed by adjusting the amount of Vγ. Because Vγ is $((V^2+V'\beta^2)/2)^{1/2}$, the focal length of the concave lens can be changed by adjusting the voltage V of the drive waveform.

For example, in a first mode, the potential at the midpoint is adjusted. In FIG. 26(a), the effective voltage is represented by a broken line ① when the voltage at the midpoint is set to Vγ1, and by a broken line ② when the voltage is set to Vγ2. The relative phase modulation amount according to the potential distribution established by Vγ1 is as indicated by the broken line ① in FIG. 26(b), and the relative phase modulation amount according to the potential distribution established by Vγ2 is as indicated by the broken line ② in FIG. 26(b). This means that the focal length of a concave lens can be changed. In this case, for the effective birefringence characteristics, the operation range is represented by a range from Vβ to Vγ1 indicated by ①, and by a range from Vβ to Vγ2 indicated by ②.

When the bias of Vβ is not included, the characteristics curve is the one indicated by ③ in each figure and, as indicated by the characteristics ③ of the relative phase modulation amount in FIG. 26(b), it is difficult for the liquid crystal optical modulator to perform the concave lens operation.

Figure 27:
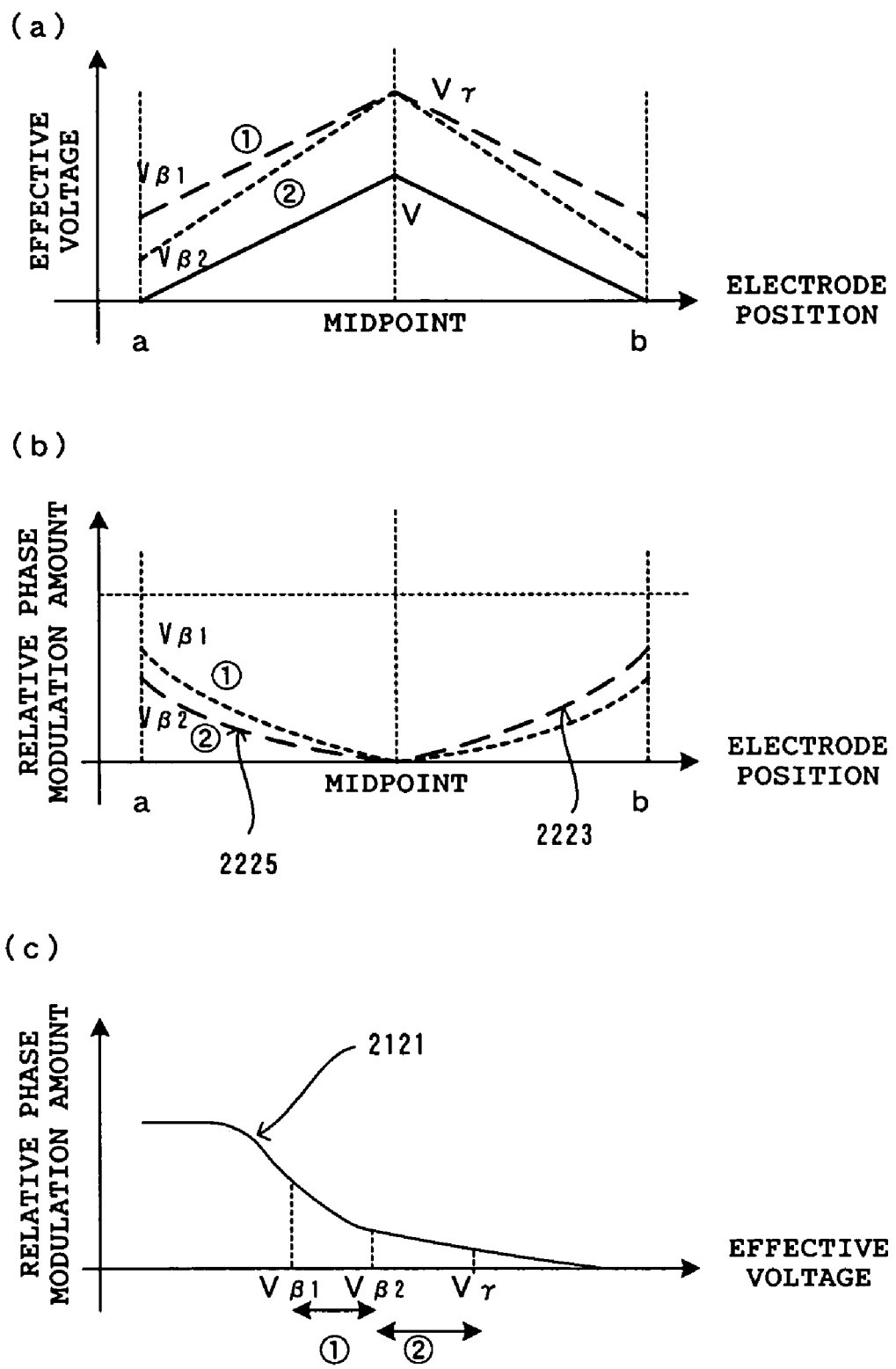
FIG. 27 is a diagram showing how the focal length is changed during the concave lens operation of the liquid crystal optical modulator of the present invention.

In a second mode, the potential at the ends is adjusted. In FIG. 27(a), the effective voltage is represented by the broken line ① when the voltage at both ends is set to Vβ1, and by broken line ② when the voltage is set to Vβ2. The relative phase modulation amount according to the potential distribution established by Vβ1 is as indicated by the broken line ① in FIG. 27(b), and the relative phase modulation amount according to the potential distribution established by Vβ2 is as indicated by the broken line ② in FIG. 27(b). This means that the focal length of a concave lens can be changed. In this case, for the effective birefringence characteristics, the operation range is represented by a range form Vβ1 to Vγ indicated by ①, and by a range from Vβ2 to Vγ indicated by ②.

As described above, a curvature change in the refractive index distribution of the liquid crystal, that is, a change in the focal length, can be made by changing the amplitude V of the drive waveform.

Although a one-dimensional liquid crystal optical modulator operating as a cylindrical lens capable of performing concave lens operation and convex lens operation is described in the first embodiment of the present invention, the cylindrical lens can be easily arranged in an array (multiple elements) in this configuration.

Figure 28:
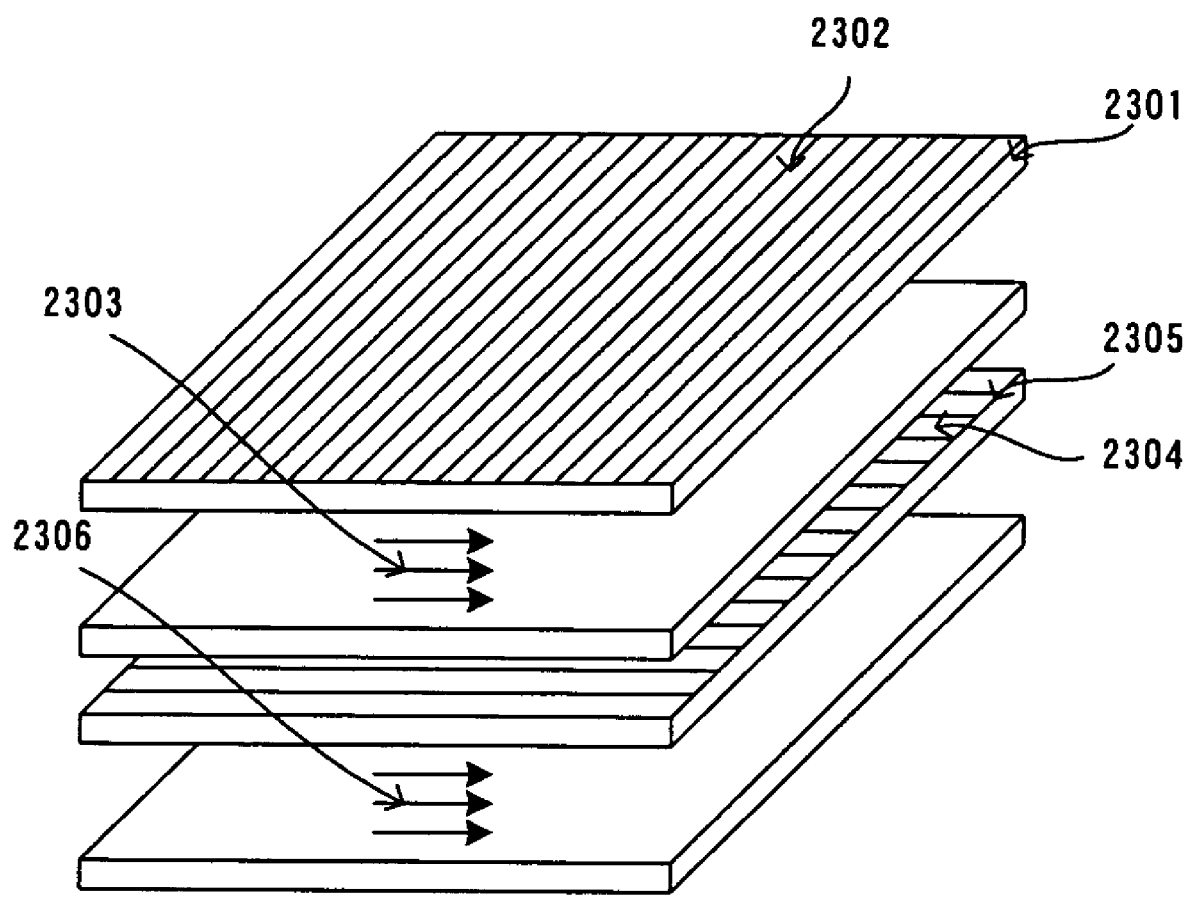
FIG. 28 is a diagram showing an example of configuring a spherical lens array by placing two cylindrical lenses, one on top of the other, in the liquid crystal optical modulator of the present invention.

In addition, a spherical lens array can be implemented by placing two cylindrical lenses, one on top of the other, with the stripe electrodes of the composite electrodes crossed at right angles and with the director direction of liquid crystal molecules in parallel. FIG. 28 is a schematic view showing one example of the configuration. In FIG. 28, two cylindrical lenses are placed, one on top of the other, in such a way that the direction of stripe electrodes 2302 of a composite electrode provided on a first cylindrical lens 2301 is crossed at right angles to the direction of stripe electrodes 2305 of a composite electrode provided on a second cylindrical lens 2304 and, in addition, the director directions 2303 and 2306 of liquid crystal molecules on the cylindrical lenses are parallel. A spherical lens array is formed by the two cylindrical lenses 2301 and 2304 placed one on top of the other.

Figure 29:
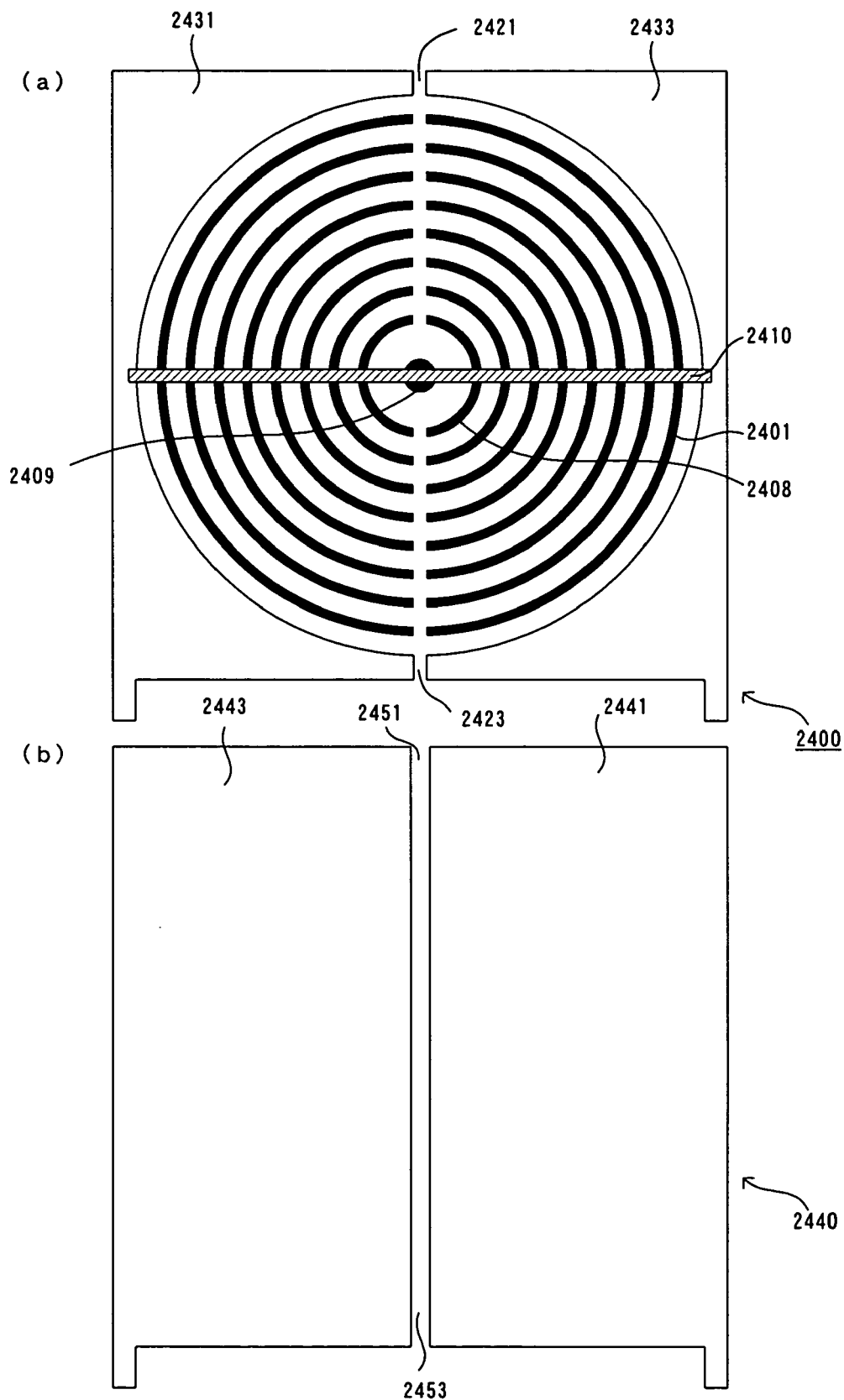
FIG. 29 is a diagram showing the spherical lens configuration in which two-dimensional refractive index modulation is performed by the nematic liquid crystal layer.

Next, a second embodiment of the present invention will be described with reference to FIG. 29. The first embodiment has a cylindrical lens configuration in which one-dimensional refractive index modulation is performed while the second embodiment has a spherical lens configuration in which two-dimensional refractive index modulation is performed in the nematic liquid crystal layer 101.

In the second embodiment, the configuration of a complex electrode for forming a spherical lens is the same as that used in the prior art. FIG. 29(a) is a top view showing the configuration of a composite electrode 2400. In the composite electrode 2400 of a spherical lens with a circular aperture, a plurality of semicircular stripe electrodes 2401–2408 around a central electrode 2409 are electrically connected by one gradient potential electrode 2410. The both ends of the gradient potential electrode 2410 are connected to a first signal electrode 2431 and to a second signal electrode 2433 which also function as the circular aperture. The stripe electrodes and the signal electrodes are separated into two areas by a first slit 2421 and a second slit 2423.

The central electrode 2409 and the stripe electrodes each forming a semicircular shape are formed by a polycrystalline ITO transparent conductive film, and the gradient potential electrode 2410 is formed by an amorphous transparent conductive film created by doping several types of impurities with $In_2O_3$ as the main component. For the sheet resistor of the gradient potential electrode 2410, a material with a resistance higher than that of the stripe electrodes and the central electrode 2409 should be used. A low-resistance metal film of Mo or Ag alloy is used for the first signal electrode 2431 and the second signal electrode 2433.

FIG. 29(b) is a top view showing the configuration of an opposed electrode. An opposed electrode 2440 that is opposed to the composite electrode 2400 comprises two opposed electrodes separated by a division line 2451: a first opposed electrode 2441 overlapping with the first signal electrode 2431 and a second opposed electrode 2443 overlapping with the second signal electrode 2433. The composite electrode 2400 and the opposed electrode 2440 are overlapped and opposed each other to form a liquid crystal spherical lens.

Figure 30:
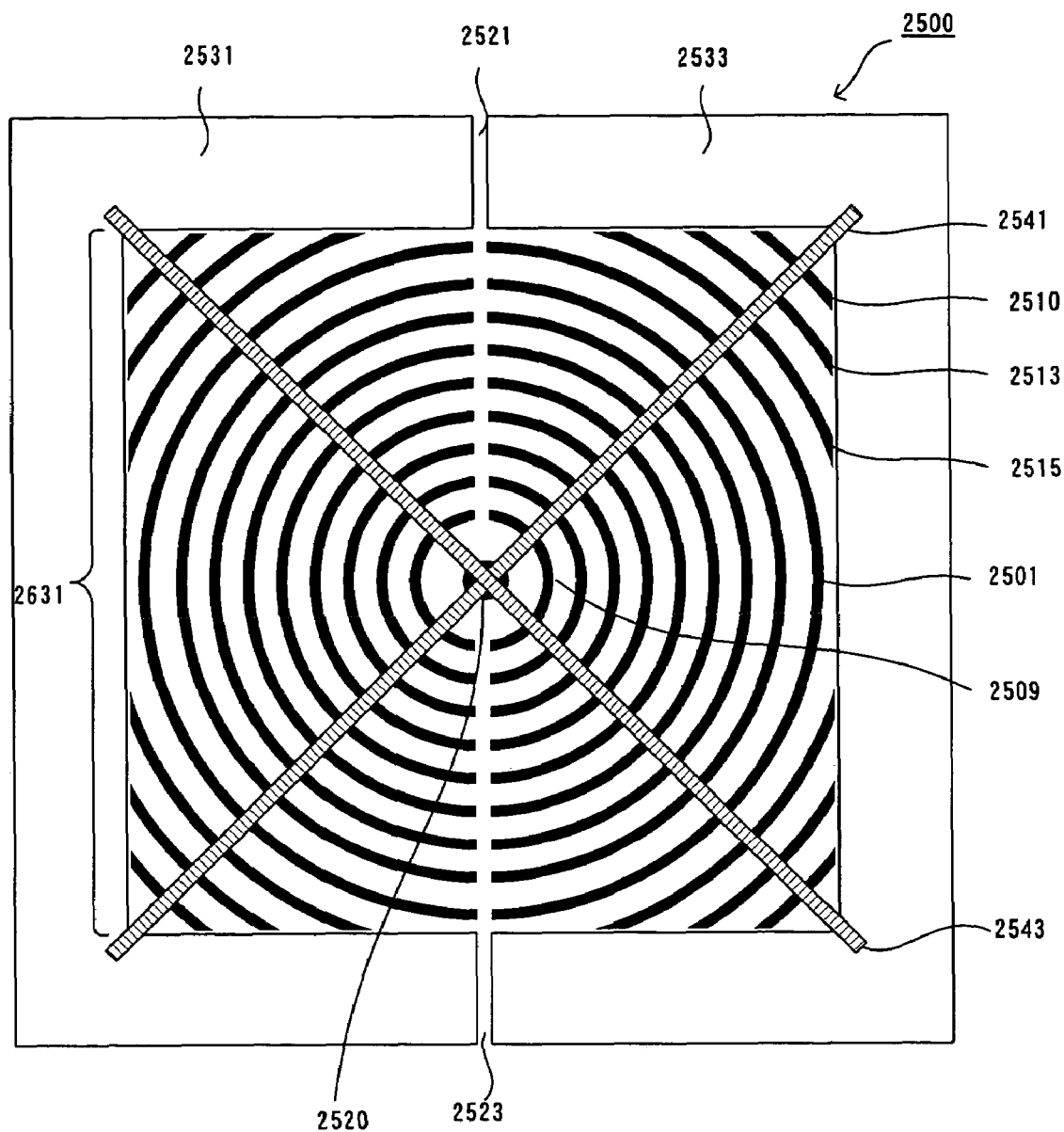
FIG. 30 is a diagram showing an example of a spherical lens having a square aperture.

An example of a spherical lens having a rectangular aperture will be described with reference to FIG. 30. Referring to FIG. 30, in a composite electrode 2500 of a spherical lens having a rectangular aperture, the semicircular stripe electrodes 2501–2509 and the segment stripe electrodes 2510, 2513, and 2515 around a central electrode 2520 are electrically connected by a first diagonal gradient potential electrode 2541 and a second diagonal gradient potential electrode 2543. The both ends of the first diagonal gradient potential electrode 2541 and the second diagonal gradient potential electrode 2543 are connected to a first signal electrode 2531 and a second signal electrode 2533 that also function as a rectangular aperture. The stripe electrodes and the signal electrodes are separated into two areas by a first slit 2521 and a second slit 2523.

The central electrode 2520 and the stripe electrodes constituting the semicircles and segments are formed by a polycrystalline ITO transparent conductive film, and the gradient potential electrode is formed by an amorphous transparent conductive film created by doping several impurity elements with the $In_2O_3$ as the main component. For the sheet resistor of the gradient potential electrode, a material with a resistance higher than that of the stripe electrodes and the central electrode 2520 should be used. A low-resistance metal film of Mo or Ag alloy is used for the first signal electrode 2531 and the second signal electrode 2533.

Although there is a difference between a cylindrical lens and a spherical lens, the second embodiment of the present invention is similar to the first embodiment in the principle of operation and the characteristics of the liquid crystal layer.

The drive method for the spherical lens in the second embodiment of the present invention is the same as that for the first embodiment. The spherical lens may be set up for a spherical convex lens or a spherical concave lens and, in addition, the spherical concave/convex lens may be changed in any way.

The configuration of arrayed composite electrodes, each of which is the composite electrode shown in FIG. 30, will be described with reference to FIG. 31.

Figure 31:
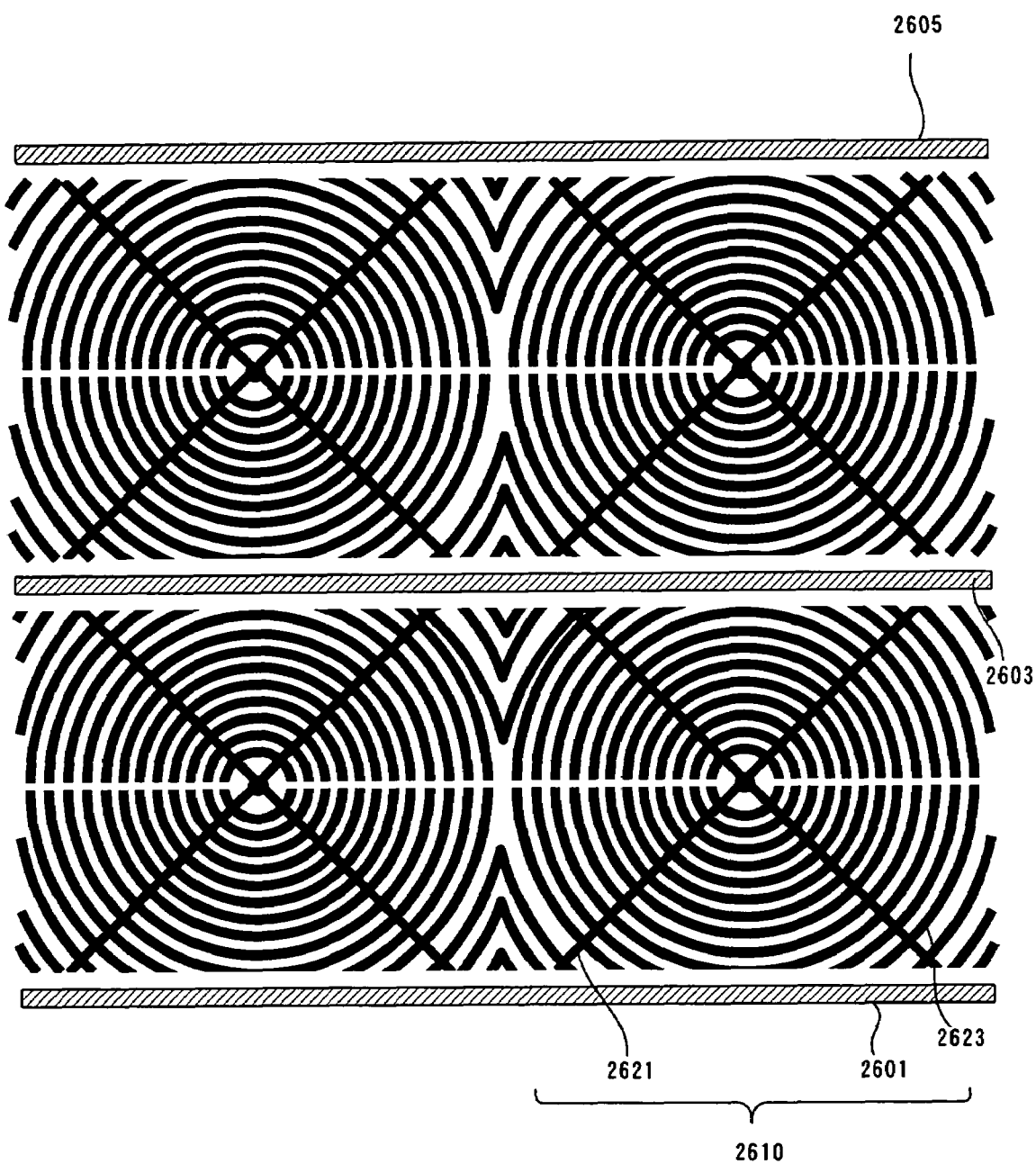
FIG. 31 is a diagram showing the configuration of arrayed composite electrodes.
Figure 32:
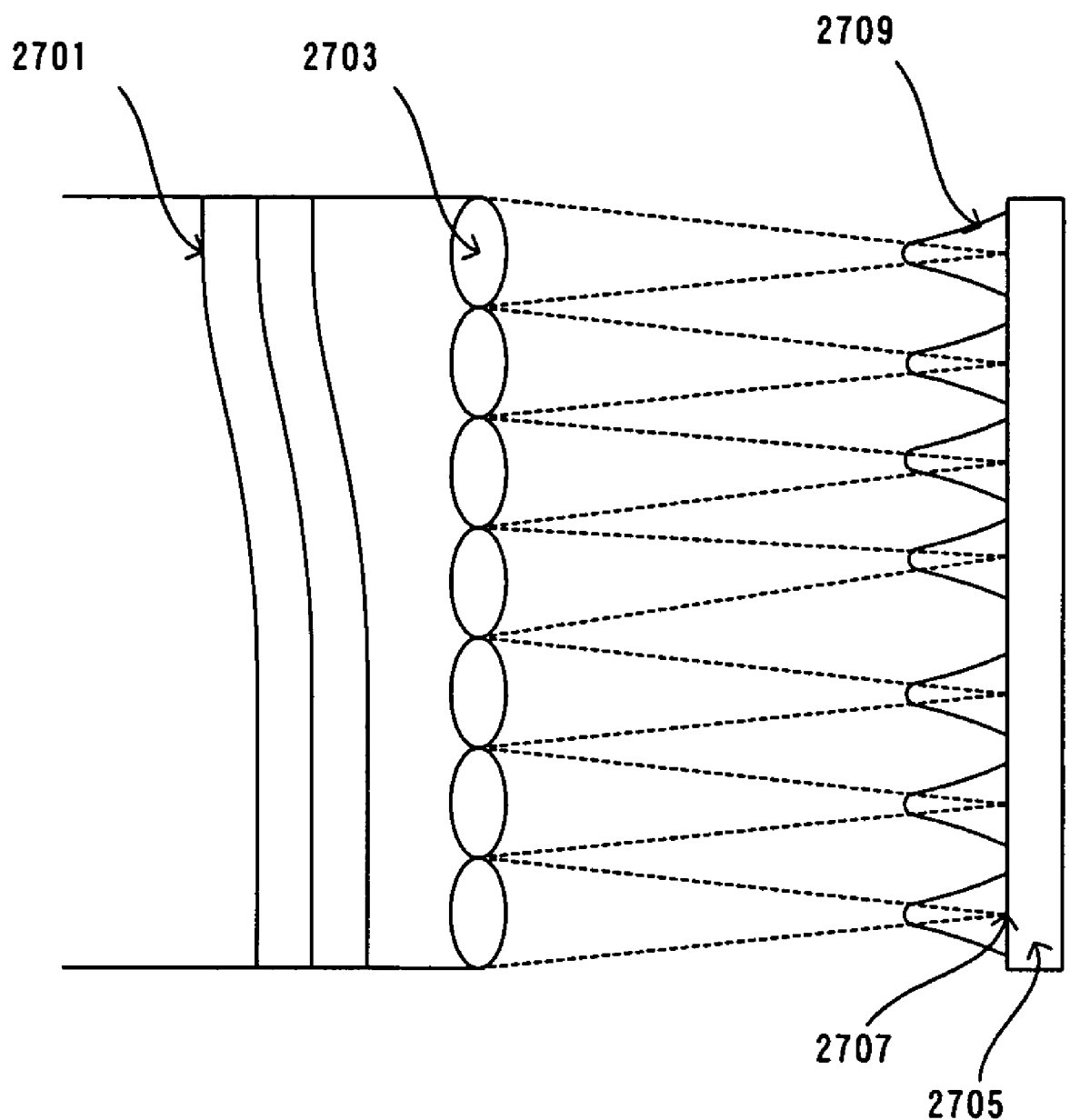
FIG. 32 is a diagram showing the principle of a Shack Hertmann sensor.
Figure 33:
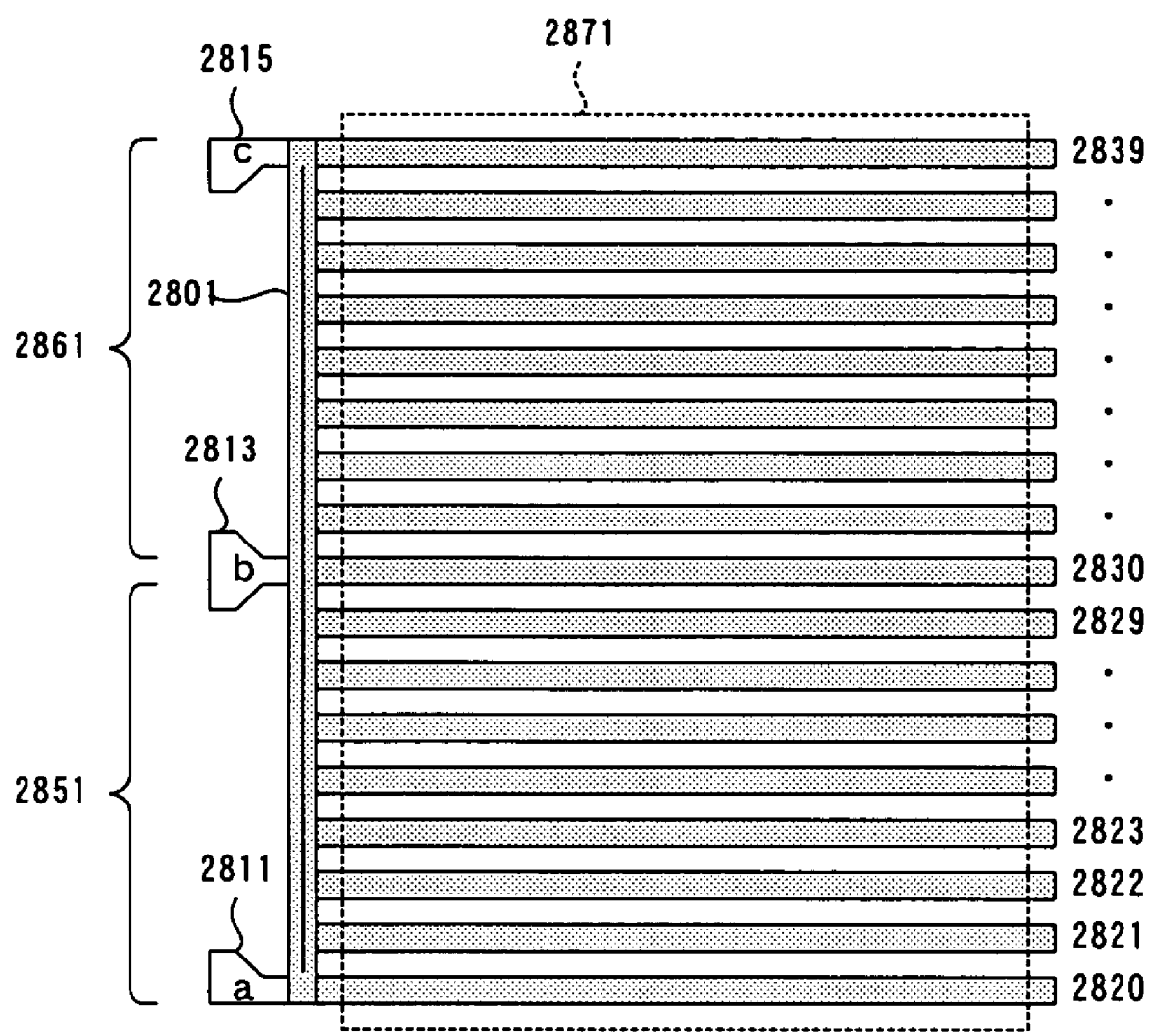
FIG. 33 is a top view of the structure of a composite electrode forming a cylindrical lens using a liquid crystal optical modulator.

The configuration shown in FIG. 31 is an example of the configuration of a 2×2 square array of spherical lenses each of which is a unit lens 2610 that is a lens part with the configuration shown in FIG. 30. The drive waveform can be applied to each lens by connecting a first diagonal gradient potential electrode 2621 and a second diagonal gradient potential electrode 2623 of the unit lens 2610 to a signal line a 2601, signal line b 2603, and signal line c 2605. A signal line, formed by a low resistance metal material such as Mo or Ag alloy, is an inactive area in the lens array but, because the peripheral area of the signal line can be minimized, the aperture rate can be made close to 100%.

The drive method for the array configuration will be described briefly. By applying drive waveforms, with equal amplitude and frequency but 180 degrees out of phase to one another, to the adjacent signal lines, the convex lens drive is possible as for a single lens. In addition, by providing a period in which the in-phase signal is applied to the adjacent signal lines, an ac bias drive is also possible as for a single lens.

Although not explicitly stated here, the concave lens operation is also possible as for a single lens by applying a predetermined opposed electrode drive signal to the divided opposed electrodes.

In the second embodiment of the present invention, the direction of the director in the nematic liquid crystal layer 101 held between the composite electrode 111 and the opposed electrode 113 should be set in the direction at right angles to the direction of a slit line in the composite electrode. This is because, while the drive waveform is applied to the composite electrode, a strong electric field is always applied in the direction at right angles to a slit line near a slit. In this case, if there are liquid crystal molecules parallel to the slit line, a rotating torque generated in the plane tends to extend a disclination near the slit and, as a result, affects the phase modulation characteristics.

For the potentials −V[V] and +V[V] shown in the embodiments, ac pulse sources such as the one with 5–30 [V] at 1–10000 [Hz] can be used as an actual voltage source.

One of applications of a variable-focal micro-lens is a lens for controlling a sending or receiving beam angle in a transmitter/receiver for optical wireless communication between buildings. In this case, because it is difficult for one variable-focal lens to establish a predetermined focal length, a variable-focal length lens and a fixed focus lens are combined.

The liquid crystal optical modulator according to the present invention can be applied to the variable-focal micro-lens described above. The liquid crystal optical modulator, if applied, can control the variable-focal lens, make the beam width variable, and slightly control the diffusion angle of a sending or receiving beam as necessary even when a laser beam fluctuates because a building expands or contracts or quakes.

The invention claimed is:

1. A method for driving an optical modulator using liquid crystal, said liquid crystal optical modulator comprising:
    a first substrate having thereon a composite electrode in which a plurality of parallel stripe conductive electrodes are arranged and said plurality of parallel stripe conductive electrodes are electrically connected by one or more connection stripe electrodes;
    a second substrate having thereon divided opposed electrodes each corresponding to a predetermined area on said composite electrode; and
    an optical element including a liquid crystal molecule layer held between said first substrate and said second substrate,
    said liquid crystal optical modulator configured in such a way
    that said connection stripe electrode has signal electrodes at a predetermined interval to which a control signal is applied;
    that, by applying a predetermined voltage to the signal electrodes, a linear potential gradient is generated in the connection stripe electrode between the signal electrodes;
    that a predetermined opposed voltage is applied to said divided opposed electrodes; and
    that the applied voltages cause a modulation in a refractive index of the liquid crystal molecule layer via a curve modulation area of electro-optical characteristics of homogeneously aligned or homeotropically aligned liquid crystal,
    wherein there are a period in which two drive waveforms, with equal amplitude and equal frequency but 180 degrees out of phase to one another, are applied to the predetermined signal electrodes that receive drive waveforms and a period in which an ac (alternate current) bias is applied to the liquid crystal molecule layer.

2. A method for driving an optical modulator using liquid crystal, said liquid crystal optical modulator comprising:

a first substrate having thereon a composite electrode in which a plurality of semicircular conductive electrodes are concentrically arranged and said plurality of concentrically-arranged conductive electrodes are electrically connected by one or more connection conductive electrodes;

a second substrate having thereon divided opposed electrodes each corresponding to a predetermined area on said composite electrode; and an optical element including a liquid crystal molecule layer held between said first substrate and said second substrate, said liquid crystal optical modulator configured in such a way that said connection stripe electrode has signal electrodes at ends thereof to which a control signal is applied;

that, by applying a predetermined voltage to the signal electrodes, a linear potential gradient is generated in the connection stripe electrode between the signal electrodes;

that a predetermined opposed voltage is applied to said divided opposed electrodes; and that the applied voltages cause a modulation in a refractive index of the liquid crystal molecule layer via a curve modulation area of electro-optical characteristics of homogeneously aligned or homeotropically aligned liquid crystal, wherein there are a period in which two drive waveforms, with equal amplitude and equal frequency but 180 degrees out of phase to one another, are applied to the predetermined signal electrodes that receive drive waveforms and a period in which an ac bias is applied to the liquid crystal molecule layer.

3. A method for driving an optical modulator using liquid crystal, said liquid crystal optical modulator comprising:

a first substrate having thereon a composite electrode in which a plurality of parallel stripe conductive electrodes are arranged and plurality of parallel stripe conductive electrodes are electrically connected by one or more connection stripe electrodes;

a second substrate having thereon divided opposed electrodes each corresponding to a predetermined area on said composite electrode; and an optical element including a liquid crystal molecule layer held between said first substrate and said second substrate, said liquid crystal optical modulator configured in such a way that said connection stripe electrode has signal electrodes at a predetermined interval to which a control signal is applied;

that, by applying a predetermined voltage to the signal electrodes, a linear potential gradient is generated in the connection stripe electrode between the signal electrodes;

that a predetermined opposed voltage is applied to said divided opposed electrodes; and that the applied voltages cause a modulation in a refractive index of the liquid crystal molecule layer via a curve modulation area of electro-optical characteristics of homogeneously aligned or homeotropically aligned liquid crystal, wherein two drive waveforms, with equal amplitude and equal frequency but 180 degrees out of phase to one another, are applied to the predetermined signal electrodes that receive drive waveforms.

4. A method for driving an optical modulator using liquid crystal, said liquid crystal optical modulator comprising:

a first substrate having thereon a composite electrode in which a plurality of semicircular conductive electrodes are concentrically arranged and said plurality of concentrically-arranged conductive electrodes are electrically connected by one or more connection conductive electrodes;

a second substrate having thereon divided opposed electrodes each corresponding to a predetermined area on said composite electrode; and an optical element including a liquid crystal molecule layer held between said first substrate and said second substrate, said liquid crystal optical modulator configured in such a way that said connection stripe electrode has signal electrodes at ends thereof to which a control signal is applied;

that, by applying a predetermined voltage to the signal electrodes, a linear potential gradient is generated in the connection stripe electrode between the signal electrodes;

that a predetermined opposed voltage is applied to said divided opposed electrodes; and that the applied voltages cause a modulation in a refractive index of the liquid crystal molecule layer via a curve modulation area of electro-optical characteristics of homogeneously aligned or homeotropically aligned liquid crystal, wherein two drive waveforms, with equal amplitude and equal frequency but 180 degrees out of phase to one another, are applied to the predetermined signal electrodes that receive drive waveforms.

5. A liquid crystal optical modulator that has a liquid crystal molecule layer between a first substrate having thereon a plurality of stripe electrodes arranged in a stripe pattern and a second substrate having thereon opposed electrodes and that is capable of causing a modulation in a refractive index of said liquid crystal molecule layer by applying different voltages to both ends of said stripe electrodes, wherein said second substrate has divided opposed electrodes each corresponding to a predetermined area on said stripe electrodes and wherein the voltages are applied to said stripe electrodes and said opposed electrodes to cause said liquid crystal optical modulator to operate as a concave lens or as a convex lens, using a curve modulation area indicating characteristics that a birefringence for the voltage applied to the liquid crystal molecule layer is downwardly convex, or a curve modulation area indicating characteristics that the birefringence is upwardly convex, as a modulation area of the refractive index of said liquid crystal molecule layer.

6. A liquid crystal optical modulator that has a liquid crystal molecule layer between a first substrate having thereon a plurality of stripe electrodes arranged in a stripe pattern and a second substrate having thereon opposed electrodes and that is capable of causing a modulation in a refractive index of said liquid crystal molecule layer by applying different voltages to both ends of said stripe electrodes,
- wherein said second substrate has divided opposed electrodes each corresponding to a predetermined area on said stripe electrodes and
- wherein an operation point on a phase modulation curve of the refractive index of said liquid crystal molecule layer is shifted under a phase control of a bias signal applied to said divided opposed electrodes and, at the same time, a focal length of a lens operation of said liquid crystal optical modulator is made variable by a control signal controlling said plurality of stripe electrodes.

7. The liquid crystal optical modulator according to claim 5 or 6 wherein said stripe electrodes are composed of a plurality of transparent electrodes arranged in parallel stripes.

8. The liquid crystal optical modulator according to claim 5 or 6, further comprising a connection stripe electrode for connecting said plurality of stripe electrodes
- wherein said connection stripe electrode has a sheet resistance equal to or higher than that of said stripe electrodes.

9. The liquid crystal optical modulator according to claim 8 wherein said connection stripe electrode is composed of a transparent conductive electrode.

10. The liquid crystal optical modulator according to claim 5 or 6 wherein the opposed electrodes provided on said second substrate are optically transparent.

11. An optical modulator using liquid crystal comprising:
- a first substrate having thereon a composite electrode in which a plurality of semicircular conductive electrodes are concentrically arranged and said plurality of concentrically-arranged conductive electrodes are electrically connected by one or more connection stripe electrodes;
- a second substrate having thereon divided opposed electrodes each corresponding to a predetermined area on said composite electrode; and
- an optical element including a liquid crystal molecule layer held between said first substrate and said second substrate,
- wherein said connection stripe electrode has signal electrodes at ends thereof to which a control signal is applied and, by applying a predetermined voltage to the signal electrodes, a linear potential gradient is generated in the connection stripe electrode between the signal electrodes,
- wherein a predetermined opposed voltage is applied to said divided opposed electrodes,
- wherein, in a curve modulation area of electro-optical characteristics of homogeneously aligned or homeotropically aligned liquid crystal, the voltages are applied to cause a modulation in a refractive index of the liquid crystal molecule layer and
- wherein the voltages are applied to said stripe electrodes and said opposed electrodes to cause said liquid crystal optical modulator to operate as a concave lens or as a convex lens, using a curve modulation area indicating characteristics that a birefringence for the voltage applied to the liquid crystal molecule layer is downwardly convex, or a curve modulation area indicating characteristics that the birefringence is upwardly convex, as a modulation area of the refractive index of said liquid crystal molecule layer.

12. An optical modulator using liquid crystal comprising:
- a first substrate having thereon a composite electrode in which a plurality of semicircular conductive electrodes are concentrically arranged and said plurality of concentrically-arranged conductive electrodes are electrically connected by one or more connection conductive electrodes;
- a second substrate having thereon divided opposed electrodes each corresponding to a predetermined area on said composite electrode; and
- an optical element including a liquid crystal molecule layer held between said first substrate and said second substrate,
- wherein said connection stripe electrode has signal electrodes at ends thereof to which a control signal is applied and, by applying a predetermined voltage to the signal electrodes, a linear potential gradient is generated in the connection stripe electrode between the signal electrodes,
- wherein a predetermined opposed voltage is applied to said divided opposed electrodes,
- wherein, in a curve modulation area of electro-optical characteristics of homogeneously aligned or homeotropically aligned liquid crystal, the voltages are applied to cause a modulation in a refractive index of the liquid crystal molecule layer and
- wherein an operation point on a phase modulation curve of the refractive index of said liquid crystal molecule layer is shifted under a phase control of a bias signal applied to said divided opposed electrodes and, at the same time, a focal length of a lens operation of said liquid crystal optical modulator is made variable by a control signal controlling said plurality of stripe electrodes.

13. The liquid crystal optical modulator according to claim 11 or 12 wherein said plurality of semicircular conductive electrodes are composed of transparent conductive electrodes.

14. The liquid crystal optical modulator according to claim 11 or 12,
- wherein said connection stripe electrode has a sheet resistance equal to or higher than that of said conductive electrodes.

15. The liquid crystal optical modulator according to claim 11 or 12 wherein said connection stripe electrode is composed of a transparent conductive electrode.

16. The liquid crystal optical modulator according to claim 11 or 12 wherein the opposed electrodes provided on said second substrate are optically transparent.

17. The liquid crystal optical modulator according to claim 11 or 12 wherein two connection conductive electrodes are formed along diagonal lines of a square aperture.

18. The liquid crystal optical modulator according to claim 11 or 12 wherein said plurality of concentrically-arranged semicircular conductive electrodes have a slit part therein and are divided by said slit part into at least two groups.

19. The liquid crystal optical modulator according to claim 11 or 12 wherein a conductive electrode group composed of said plurality of concentrically-arranged semicircular conductive electrodes further includes a plurality of segment stripe conductive electrodes.

20. The liquid crystal optical modulator according to claim 5 or 6 wherein, for homogeneous alignment, a pre-tilt angle of the liquid crystal molecule layer is a predetermined value from 0.5 degrees to 20 degrees.

21. The liquid crystal optical modulator according to claim 11 or 12 wherein, for homogeneous alignment, a pre-tilt angle of the liquid crystal molecule layer is a predetermined value from 0.5 degrees to 20 degrees.

22. The liquid crystal optical modulator according to claim 11 or 12 wherein a director direction of the liquid crystal molecule layer is established in a direction at right angles to the slit part.

23. The liquid crystal optical modulator according to claim 11 or 12 wherein a plurality of liquid crystal optical modulators are arranged adjacently in a two-dimensional form.

* * * * *